(12) United States Patent
Chipara et al.

(10) Patent No.: US 11,174,418 B2
(45) Date of Patent: Nov. 16, 2021

(54) FLUORINE AND HYDROGEN-BASED ADHESIVE COMPOSITIONS AND METHODS OF MAKING THE SAME

(71) Applicants: William Marsh Rice University, Houston, TX (US); The Board of Regents of The University Of Texas System, Austin, TX (US)

(72) Inventors: Alin C. Chipara, McAllen, TX (US); Mircea Chipara, McAllen, TX (US); Chandra S. Tiwary, Houston, TX (US); Pulickel M. Ajayan, Houston, TX (US)

(73) Assignees: William Marsh Rice University, Houston, TX (US); Board of Regents of the University of Texas System, Austin, TX (US)

( * ) Notice: Subject to any disclaimer, the term of this patent is extended or adjusted under 35 U.S.C. 154(b) by 80 days.

(21) Appl. No.: 16/312,801

(22) PCT Filed: Jun. 27, 2017

(86) PCT No.: PCT/US2017/039558
§ 371 (c)(1),
(2) Date: Dec. 21, 2018

(87) PCT Pub. No.: WO2018/005535
PCT Pub. Date: Jan. 4, 2018

(65) Prior Publication Data
US 2019/0218431 A1    Jul. 18, 2019

Related U.S. Application Data

(60) Provisional application No. 62/355,108, filed on Jun. 27, 2016.

(51) Int. Cl.
C09J 11/00 (2006.01)
C09J 127/18 (2006.01)
(Continued)

(52) U.S. Cl.
CPC ............. C09J 127/18 (2013.01); C08L 83/04 (2013.01); C09J 11/00 (2013.01); C09J 127/16 (2013.01); C09J 183/04 (2013.01); C09J 201/04 (2013.01)

(58) Field of Classification Search
None
See application file for complete search history.

(56) References Cited

U.S. PATENT DOCUMENTS 3,108,086 A * 10/1963 Russell ............... C08L 2666/34
524/285
4,387,168 A * 6/1983 Morita .................. C09J 127/16
521/54

(Continued)

FOREIGN PATENT DOCUMENTS

WO    WO-2013162404 A1    10/2013

OTHER PUBLICATIONS

Datasheet fo Zonyl MP 1100 by DuPont, 2 pages, datasheet retrieved from the internet on Feb. 2021. (Year: 2021).*

(Continued)

Primary Examiner — Robert S Loewe
(74) Attorney, Agent, or Firm — Winstead PC

(57) ABSTRACT

Embodiments of the present disclosure pertain to adhesive compositions that include a fluorinated molecule and a hydrogen-containing molecule that are non-covalently associated with one another. The molecules may be non-covalently associated with one another through dipole-dipole interactions that create a fluorine-hydrogen electronegativity difference between at least some of the fluorine atoms of the (Continued)

fluorinated molecule and at least some of the hydrogen atoms of the hydrogen-containing molecule. The fluorinated molecule and the hydrogen-containing molecule may be in different phases, such as a liquid phase for one molecule and a solid phase for the other molecule. Additional embodiments pertain to methods of enhancing an adhesiveness of a surface by applying an adhesive composition of the present disclosure to the surface. Further embodiments pertain to methods of making the adhesive compositions by mixing a fluorinated molecule with a hydrogen-containing molecule such that the molecules become non-covalently associated with one another.

19 Claims, 36 Drawing Sheets

(51) Int. Cl.
  *C09J 183/04* (2006.01)
  *C09J 201/04* (2006.01)
  *C08L 83/04* (2006.01)
  *C09J 127/16* (2006.01)

(56) References Cited

U.S. PATENT DOCUMENTS

| | | | | |
|---|---|---|---|---|
| 4,544,692 | A * | 10/1985 | Kuziemka | A47J 36/02 524/361 |
| 4,764,560 | A * | 8/1988 | Mitchell | B29C 55/005 210/500.42 |
| 4,784,795 | A * | 11/1988 | Fahl | C10M 169/00 508/201 |
| 5,082,706 | A * | 1/1992 | Tangney | C09J 7/38 428/40.7 |
| 5,656,279 | A * | 8/1997 | Dillon | A61P 17/02 424/402 |
| 5,755,913 | A * | 5/1998 | Liaw | B32B 37/0038 156/272.6 |
| 6,114,448 | A * | 9/2000 | Derbes | C08L 27/18 428/421 |
| 6,777,136 | B2 | 8/2004 | Morigaki et al. | |
| 7,799,387 | B2 | 9/2010 | Drake et al. | |
| 7,858,197 | B2 * | 12/2010 | Ahn | C08L 83/04 428/447 |
| 8,795,464 | B2 * | 8/2014 | Xie | B29C 61/0608 156/308.2 |
| 2002/0102410 | A1 * | 8/2002 | Gervasi | G03G 15/2057 428/421 |
| 2005/0106327 | A1 * | 5/2005 | Dillon | A61L 15/26 427/399 |
| 2008/0057251 | A1 * | 3/2008 | Griswold | C09J 183/08 428/40.1 |
| 2010/0159223 | A1 * | 6/2010 | Keese | B32B 5/022 428/219 |
| 2012/0225228 | A1 | 9/2012 | Barth et al. | |
| 2015/0152270 | A1 * | 6/2015 | Aizenberg | B08B 17/065 210/500.27 |
| 2015/0284613 | A1 | 10/2015 | Mayers et al. | |
| 2016/0200953 | A1 * | 7/2016 | Constantinou | C09D 163/00 428/355 EP |
| 2017/0036241 | A1 * | 2/2017 | Constantinou | C25D 1/20 |

OTHER PUBLICATIONS

Christian et al. "Polytetrafluoroethylene and Fluorinated Ethylene-Propylene Grease Lubricants" Lubrication Engineering, 30(2), 136-143, 1974. (Year: 1974).*
International Preliminary Report on Patentability for PCT/US2017/039558, dated Jan. 10, 2019.
International Search Report and Written Opinion for PCT/US2017/039558, dated Sep. 29, 2017.
Appel, E. A. & Scherman, O. A. Gluing gels: A nanoparticle solution. *Nat. Mater.* 13, 231-23 (2014).
Cao, Z. & Dobrynin, A. V. Nanoparticles as Adhesives for Soft Polymeric Materials. *Macromolecules* 49, 3586-3592 (2016).
Cole, P. J., Cook, R. F. & Macosko, C. W. Adhesion between Immiscible Polymers Correlated with Interfacial Entanglements. *Macromolecules* 36, 2808-2815 (2003).
Matos-Pérez, C. R., White, J. D. & Wilker, J. J. Polymer composition and substrate influences on the adhesive bonding of a biomimetic, cross-linking polymer. *J. Am. Chem. Soc.* 134, 9498-9505 (2012).
Yuk, H., Zhang, T., Lin, S., Parada, G. A. & Zhao, X. Tough bonding of hydrogels to diverse non-porous surfaces. *Nat. Mater.* 15, 190-196 (2015).
Pesika, N. S. et al. Gecko adhesion pad: a smart surface? *J. Phys. Condens. Matter* 21, 464132 (2009).
Lee, H., Lee, B. P. & Messersmith, P. B. A reversible wet/dry adhesive inspired by mussels and geckos. *Nature* 448, 338-341 (2007).
Waite, J. H. Surface chemistry: Mussel power. *Nat Mater* 7, 8-9 (2008).
Zhong, C. et al. Strong underwater adhesives made by self-assembling multi-protein nanofibres. *Nat Nano* 9, 858-866 (2014).
Drotlef, D. M. et al. Insights into the adhesive mechanisms of tree frogs using artificial mimics. *Adv. Funct. Mater.* 23, 1137-1146 (2013).
Kim, W.-S., Yun, L-H., Lee, J.-J. & Jung, H.-T. Evaluation of mechanical interlock effect on adhesion strength of polymer-metal interfaces using micro-patterned surface topography. *Int. J. Adhes. Adhes.* 30, 408-417 (2010).
Ping, J., Gao, F., Chen, J. L., Webster, R. D. & Steele, T. W. J. Adhesive curing through low-voltage activation. *Nat. Commun.* 6, 8050 (2015).
Lawrence, P. G. & Lapitsky, Y. Ionically cross-linked poly(allylamine) as a stimulus-responsive underwater adhesive: Ionic strength and pH effects. *Langmuir* 31, 1564-1574 (2015).
Shinbrot, T. Granular matter: The movable and the jammed. *Nat. Phys.* 9, 263-264 (2013).
Luding, S. Granular matter: So much for the jamming point. *Nat. Phys.* (2016). doi:10.1038/nphys3680.
Goodrich, C. P., Liu, A. J. & Nagel, S. R. Solids between the mechanical extremes of order and disorder. *Nat. Phys.* 10, 578-581 (2014).
Biroli, G. Disordered solids: In search of the perfect glass. *Nat. Phys.* 10, 555-556 (2014).
Jaszewski, R. W., Schift, H., Schnyder, B., Schneuwly, A. & Gröning, P. The deposition of anti-adhesive ultra-thin teflon-like films and their interaction with polymers during hot embossing. *Appl. Surf. Sci.* 143, 301-308 (1999).
Mitchinson, A. Surface chemistry: Repellent legs. *Nature* 445, 373-373 (2007).
Clark, J. A chemical conspiracy? *Nature* 434, 275-275 (2005).
Vinters, H. V, Galil, K. a, Lundie, M. J. & Kaufmann, J. C. The histotoxicity of cyanoacrylates. A selective review. *Neuroradioiogy* 27, 279-291 (1985).
Montanaro, L. et al. Cytotoxicity, blood compatibility and antimicrobial activity of two cyanoacrylate glues for surgical use. *Biomaterials* 22, 59-66 (2000).
Kendall, K. Adhesion: molecules and mechanics. *Science* 263, 1720-5 (1994).
Banigan, E. J., Illich, M. K., Stace-Naughton, D. J. & Egolf, D. A. The chaotic dynamics of jamming. *Nat. Phys.* 9, 288-292 (2013).
Aguiar, K. R. et al. Efficient green synthesis of bis(cyclic carbonate)poly(dimethylsiloxane) derivative using $CO_2$ addition: a novel precursor for synthesis of urethanes. *RSC Adv.* 4, 24334 (2014).
Ennis, C. P. et al. Mechanistical studies on the electron-induced degradation of polymers: polyethylene, polytetrafluoroethylene, and polystyrene. *Phys. Chem. Chem. Phys.* 12, 14884 (2010).
Fazullin, D. D., Mavrin, G. V., Sokolov, M. P., Ildar, & & Shaikhiev, G. Infrared Spectroscopic Studies of the PTFE and Nylon Membranes Modified Polyaniline. *Mod. Appl. Sci.* 9, (2015).

(56) References Cited

OTHER PUBLICATIONS

Zhang, Q. et al. In-situ synthesis of poly(dimethylsiloxane)-gold nanoparticles composite films and its application in microfluidic systems. *Lab Chip* 8, 352-357 (2008).
Uemura, T. et al. Mixing of immiscible polymers using nanoporous coordination templates. *Nat. Commom.* 6, 7473 (2015).
Mofokeng, J. P. & Luyt, A. S. Morphology and thermal degradation studies of melt-mixed poly(hydroxybutyrate-co-valerate) (PHBV)/poly(??-caprolactone) (PCL) biodegradable polymer blend nanocomposites with TiO2 as filler. *J. Mater. Sci.* 50, 3812-3824 (2015).
Ahn, Y., Jang, Y., Selvapalam, N., Yun, G. & Kim, K. Angewandte Supramolecular Velcro for Reversible Underwater Adhesion **. 3222-3226 (2013). doi:10.1002/ange.201209382.
Geim, A. K. et al. Microfabricated adhesive mimicking gecko foot-hair. *Nat. Mater.* 2, 461-463 (2003).
Del Campo, A. & Arzt, E. Design parameters and current fabrication approaches for developing bioinspired dry adhesives. *Macromol. Biosci.* 7, 118-127 (2007).
Kaur, S., Weerasekare, G. M. & Stewart, R. J. Multiphase adhesive coacervates inspired by the sandcastle worm. *ACS Appl. Mater. Interfaces* 3, 941-944 (2011).
Sever, M. J., Weisser, J. T., Monahan, J., Srinivasan, S. & Wilker, J. J. Metal-Mediated Cross-Linking in the Generation of a Marine-Mussel Adhesive. *Angew. Chemie Int. Ed.*, 447-450 (2004).
Plimpton, S. Fast Parallel Algorithms for Short-Range Molecular Dynamics. *J. Comput. Phys.* 117, 1-19 (1995).
Hanwell, M. D. et al. Avogadro: An advanced semantic chemical editor, visualization, and analysis platform. *J. Cheminform.* 4, (2012).
R. J. Stewart, Protein-based underwater adhesives and the prospects for their biotechnological production. *Appl. Microbiol. Biotechnol.* 89, 27-33 (2011).
A. Li et al., A mussel-inspired adhesive with stronger bonding strength under underwater conditions than under dry conditions. *Chem. Commun.* 51, 9117-9120 (2015).
Y. Ahn, Y. Jang, N. Selvapalam, G. Yun, K. Kim, Supramolecular Velcro for Reversible Underwater Adhesion. *Angew. Chemie.* 52, 3140-3144 (2013).
A. Majumder, A. Sharma, A. Ghatak, in *Microfluidics and Microfabrication* (2010), pp. 283-307.
S. Goverapet Srinivasan, A. C. T. van Duin, Molecular-Dynamics-Based Study of the Collisions of Hyperthermal Atomic Oxygen with Graphene Using the ReaxFF Reactive Force Field. *J. Phys. Chem. A.* 115, 13269-13280 (2011).
K. Chenoweth, A. C. T. van Duin, W. A. Goddard, ReaxFF Reactive Force Field for Molecular Dynamics Simulations of Hydrocarbon Oxidation. *J. Phys. Chem. A.* 112, 1040-1053(2008).
K. Chenoweth, S. Cheung, A. C. T. van Duin, W. A. Goddard, E. M. Kober, Simulations on the Thermal Decomposition of a Poly(dimethylsiloxane) Polymer Using the ReaxFF Reactive Force Field. *J. Am. Chem. Soc.* 127, 7192-7202 (2005).
Munch E, et al. (2008) Tough, Bio-Inspired Hybrid Materials. *Sci* 322 (5907 ):1516-1520.
Bonderer LJ, Studart AR, Gauckler LJ (2008) Bioinspired Design and Assembly of Platelet Reinforced Polymer Films. *Sci* 319 (5866):1069-1073.
Li Y, Moon K, Wong CP (2005) Electronics Without Lead. *Sci* 308 (5727 ):1419-1420.
Shazly TM, et al. (2010) Augmentation of postswelling surgical sealant potential of adhesive hydrogels. *J Biomed Mater Res—Part A* 95(4):1159-1169.

Jones PR, et al. (2015) Sustaining dry surfaces under water. *Sci Rep* 5:12311.
Cranford SW, Tarakanova A, Pugno NM, Buehler MJ Nonlinear material behaviour of spider silk yields robust webs. *Nature* 482(7383)72-76.
Tuteja A, et al. (2007) Designing Superoleophobic Surfaces. *Sci* 318 (5856 ):1618-1622.
Lee S-M, et al. (2009) Greatly Increased Toughness of Infiltrated Spider Silk. *Sci* 324 (5926 ):488-492.
Qu L, Dai L, Stone M, Xia Z, Wang ZL (2008) Carbon Nanotube Arrays with Strong Shear Binding-On and Easy Normal Lifting-Off. *Sci* 322 (5899 ):238-242.
Scott AR (2015) Polymers: Secrets from the deep sea. *Nature* 519(7544):S12-S13.
Iturri J, et al. (2015) Torrent Frog-Inspired Adhesives: Attachment to Flooded Surfaces. *Adv Funct Mater* 25(10): 1499-1505.
D. M. Drotlef, Biomimetics: Insights into the Adhesive Mechanisms of Tree Frogs using Artificial Mimics. (2013) *Adv Funct Mater* 23 SRC—GoogleScholar FG—0:1094.
Endlein T, et al. (2013) Sticking under Wet Conditions: The Remarkable Attachment Abilities of the Torrent Frog, Staurois guttatus. *PLoS One* 8(9). doi:10.1371/journal.pone.0073810.
Drotlef DM, et al. (2015) Morphological studies of the toe pads of the rock frog, Staurois parvus (family: Ranidae) and their relevance to the development of new biomimetically inspired reversible adhesives.
Hanna G, Barnes WJ (1991) Adhesion and detachment of the toe pads of tree frogs. *J Exp . . .* 125:103-125.
Cheung M, Sitti Enhancing (2011) E. of Biologically Inspired Polymer Microfibers with a Viscous Oil Coating. *J Adhes* 87 SRC—GoogleScholar FG—0:547-557.
Patil S, Mangai R, Malasi A, Sharma A (2012) Biomimetic Wet Adhesion of Viscoelastic Liquid Films Anchored on Micropatterned Elastic Substrates. *Langmuir* 28(41):14784-14791.
Otero R, et al. (2004) Lock-and-key effect in the surface diffusion of large organic molecules probed by STM. *Nat Mater* 3(11):779-782.
Wesolowski TA (2004) Hydrogen-bonding-induced shifts of the excitation energies in nucleic acid bases: An interplay between electrostatic and electron density overlap effects. *J Am Chem Soc* 126(37):11444-11445.
Zhao J, Buldum A, Han J, Lu JP Gas molecule adsorption in carbon nanotubes and nanotube bundles. 195.
Larson JW, McMahon TB (1984) Gas-Phase Bihalide and Pseudobihalide Ions. An Ion Cyclotron Resonance Determination of Hydrogen Bond Energies in XHY—Species (X, Y =F, Cl. Br. Cn). *Inorg Chem* 10(12):2029-2033.
Emsley J (1980) Very strong hydrogen bonding. *Chem Soc Rev* 9(1):91.
Vanommeslaeghe K, et al. CHARMM general force field: A force field for drug-like molecules compatible with the CHARMM all-atom additive biological force fields. *J Comput Chem* 31 (4):671-690.
Buckingham The, Society A (1938) R. A. Equation of State of Gaseous Helium, Neon and Argon. *Proc R Math Phys Eng Sci* 168 SRC—GoogleScholar FG—0:264-283.
Sun C (1998) H. An ab Initio Force-Field Optimized for Condensed-Phase ApplicationsOverview with Details on Alkane and Benzene Compounds. *J Phys Chem B* 102:7338-7364.
Watkins WL (2001) E. K. Jorgensen, Perfluoroalkanes: Conformational Analysis and Liquid-State Properties from ab Initio and Monte Carlo Calculations. *J Phys Chem A* 105:4118-4125.

\* cited by examiner

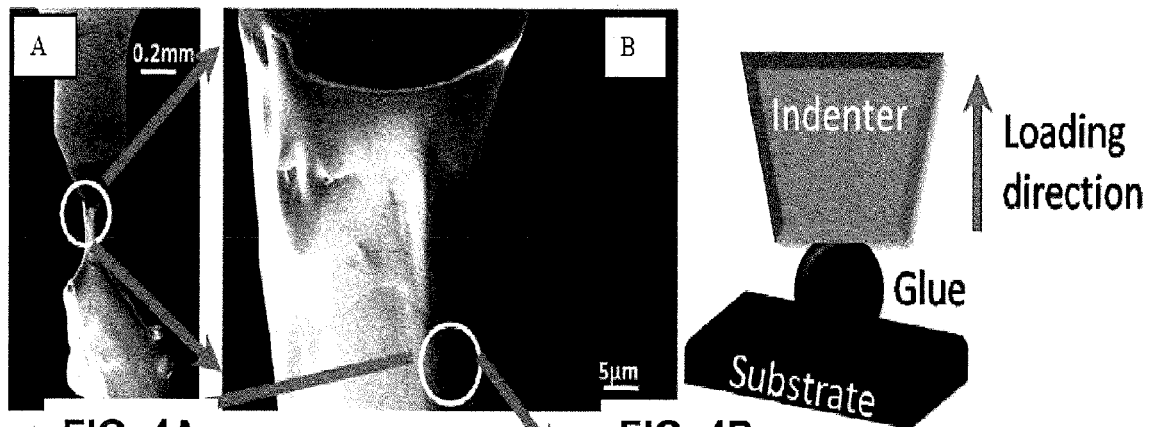
FIG. 4A  FIG. 4B
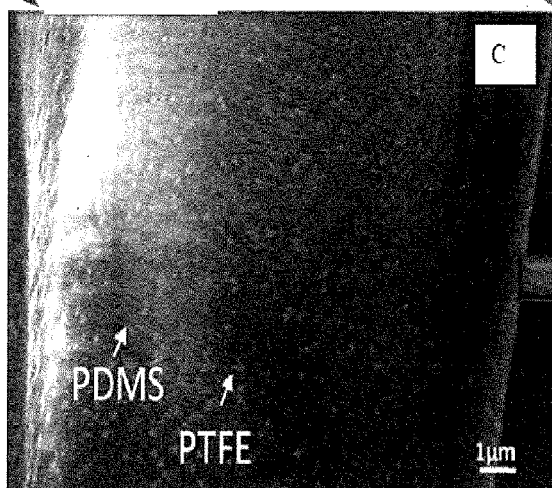
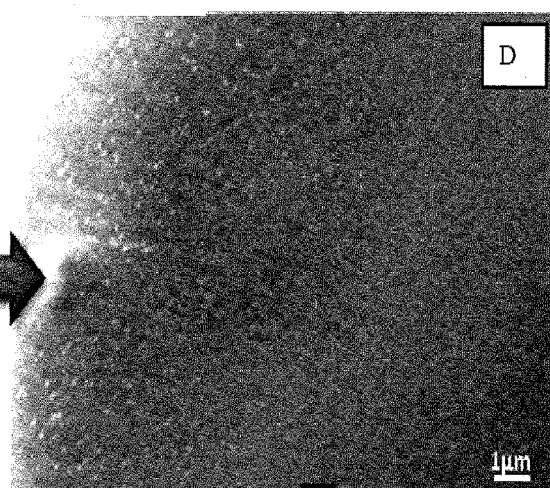
FIG. 4C  FIG. 4D
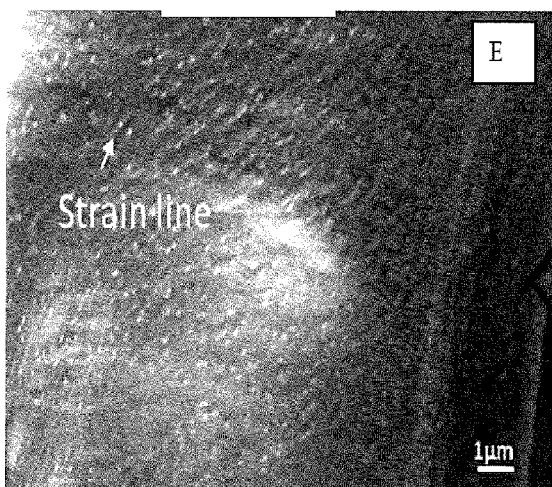
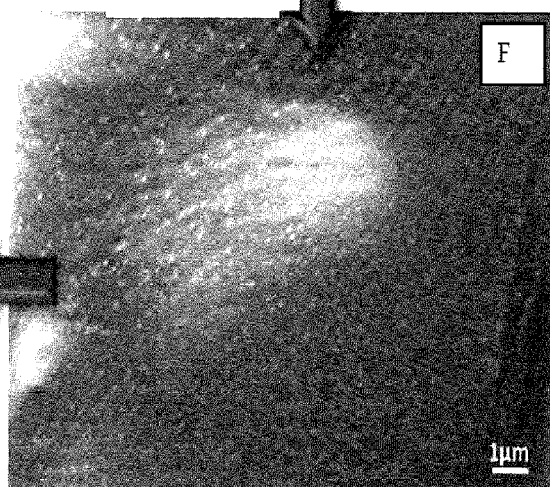
FIG. 4E  FIG. 4F

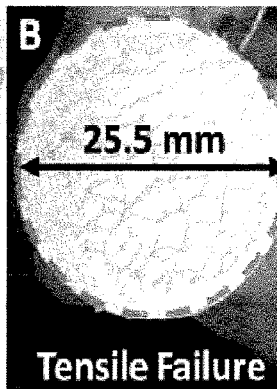
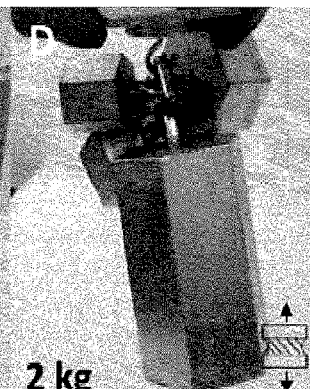
FIG. 9A  FIG. 9B  FIG. 9C  FIG. 9D
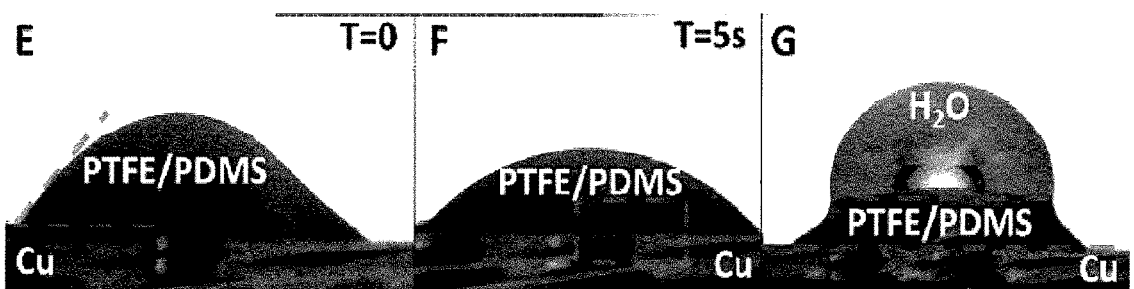
FIG. 9E  FIG. 9F  FIG. 9G
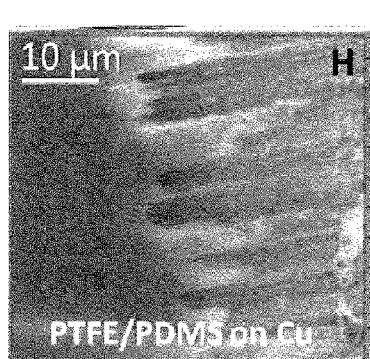
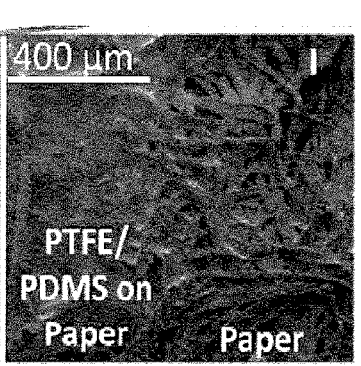
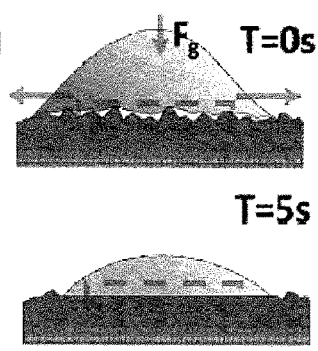
FIG. 9H  FIG. 9I  FIG. 9J

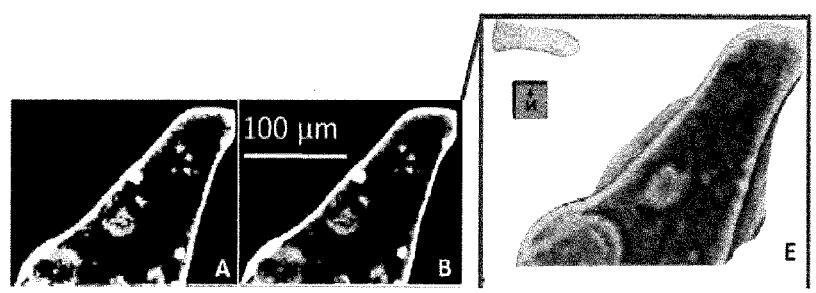
FIG. 10A   FIG. 10B        FIG. 10E
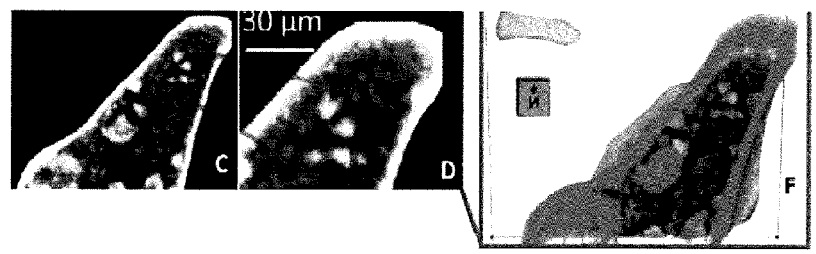
FIG. 10C   FIG. 10D
              FIG. 10F

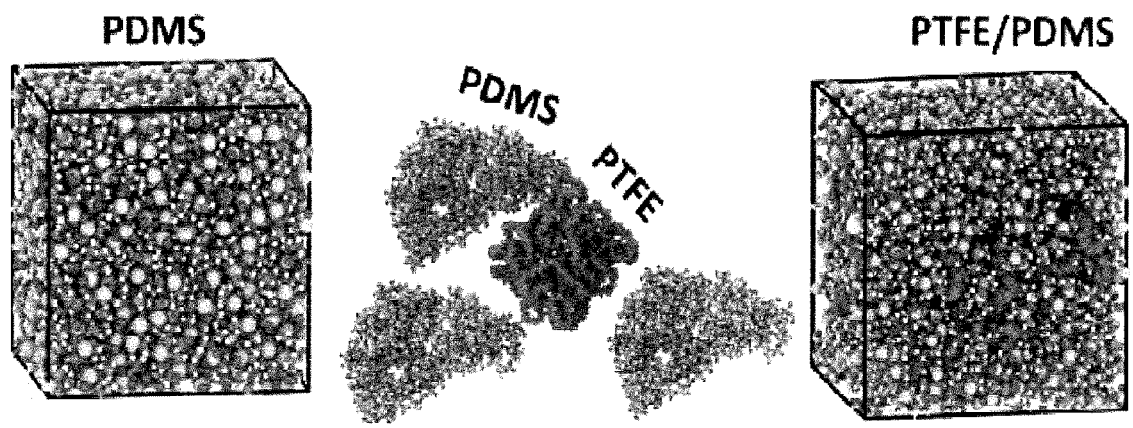
FIG. 15A
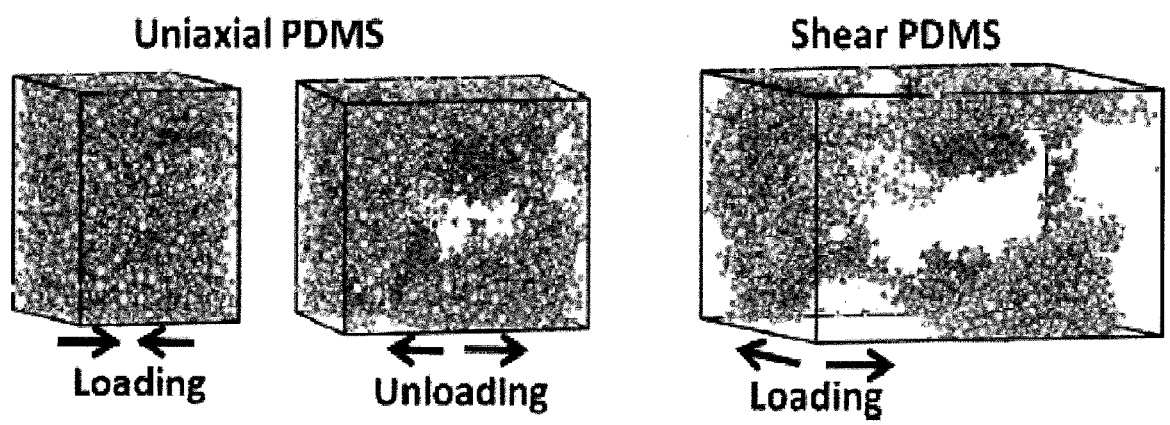
FIG. 15B
FIG. 15C

CONFIGURATION 6

FLUORINE AND HYDROGEN-BASED ADHESIVE COMPOSITIONS AND METHODS OF MAKING THE SAME

CROSS-REFERENCE TO RELATED APPLICATIONS

This application claims priority to U.S. Provisional Patent Application No. 62/355,108, filed on Jun. 27, 2016. The entirety of the aforementioned application is incorporated herein by reference.

STATEMENT REGARDING FEDERALLY SPONSORED RESEARCH

This invention was made with government support under Grant No. FA9550-13-1-0084, awarded by the U.S. Department of Defense. The government has certain rights in the invention.

BACKGROUND

Current adhesives suffer from numerous limitations, including limited adhesion under uniaxial and shear loading conditions, residual strain, erratic cyclic behavior, low adhesive strengths, toxicity, non-biodegradability, non-reusability, inflexibility, and inability for use in different environments. Various embodiments of the present disclosure addresses the aforementioned limitations.

SUMMARY

In some embodiments, the present disclosure pertains to adhesive compositions that include a fluorinated molecule and a hydrogen-containing molecule that are non-covalently associated with one another. In some embodiments, the fluorinated molecule includes, without limitation, fluorinated polymers, fluorinated nanomaterials, fluorinated carbon nanomaterials, fluorinated ceramics, fluorocarbons, fluorinated polysaccharides, fluorinated carbohydrates, fluorinated proteins, cross-linked networks thereof, and combinations thereof. In some embodiments, the hydrogen-containing molecule includes, without limitation, hydrocarbon-based molecules, silicon-based molecules, polymers, nanomaterials, carbon nanomaterials, lard, ceramics, aromatic hydrocarbons, alkanes, alkenes, cycloalkanes, alkyne-based compounds, polysaccharides, carbohydrates, proteins, siloxanes, silicone oils, cross-linked networks thereof, and combinations thereof.

In some embodiments, the fluorinated molecule and the hydrogen-containing molecule are non-covalently associated with one another through at least one of non-covalent bonds, non-ionic bonds, reversible bonds, physical bonds, geometrical bonds, mechanical interactions, and combinations thereof. In some embodiments, the fluorinated molecule and the hydrogen-containing molecule are non-covalently associated with one another through at least one of dipole-dipole interactions, dipole-dipole-induced interactions, Van der Waals forces, hydrogen bonds, and combinations thereof.

In some embodiments, the fluorinated molecule and the hydrogen-containing molecule are non-covalently associated with one another through dipole-dipole interactions. In some embodiments, the dipole-dipole interactions create a fluorine-hydrogen electronegativity difference between at least some of the fluorine atoms of the fluorinated molecule and at least some of the hydrogen atoms of the hydrogen-containing molecule.

In some embodiments, the fluorinated molecule and the hydrogen-containing molecule are in different phases. For instance, in some embodiments, the fluorinated molecule is in a liquid phase and the hydrogen-containing molecule is in a solid phase. In some embodiments, the fluorinated molecule is in a solid phase and the hydrogen-containing molecule is in a liquid phase.

In some embodiments, the adhesive compositions of the present disclosure are associated with a surface. In some embodiments, the adhesive compositions of the present disclosure are associated with at least two surfaces such that the adhesive compositions adhere the surfaces to one another.

Additional embodiments of the present disclosure pertain to methods of enhancing an adhesiveness of a surface by applying an adhesive composition of the present disclosure to the surface. In some embodiments, such methods also include a step of adhering the surface to another surface such that the adhesive composition becomes positioned between the two surfaces.

Additional embodiments of the present disclosure pertain to methods of making the adhesive compositions of the present disclosure. In some embodiments, the methods include mixing a fluorinated molecule with a hydrogen-containing molecule such that the fluorinated molecule and the hydrogen-containing molecule become non-covalently associated with one another to form the adhesive composition.

DESCRIPTION OF THE FIGURES

FIG. 1 provides various illustrations and schemes related to adhesive compositions.

FIG. 4 illustrates the in situ characterization of PTFE-PDMS polymer blends. FIG. 4A shows in situ pulling of PTFE/PDMS. Upon zooming in, FIG. 4B shows a closer image of the glue during strain. Upon further zooming, FIG. 4C reveals the spherical PTFE embedded in the PDMS. FIGS. 4C-F show that, as the adhesive is pulled, strain lines begin to appear. These strain lines have been specifically highlighted in FIG. 4E and FIG. 4F and show reorientation discussed in Example 1 and serve as experimental proof for the proposed adhesion mechanism seen in FIG. 9F as well as the general tensile behavior of the adhesive proposed in FIG. 2B.

FIG. 10 provides additional data relating to the characterization of PTFE/PDMS polymer blends. FIGS. 10A-D show X-ray computerized tomography analyses of a PTFE/PDMS peak. The same 2D slice was re-colored to clearly show the PTFE concentrations near the peak. A 3D image of the PTFE/PDMS seen in FIGS. 10A-D shows the material as it is bisected (FIG. 10E) and after several slices (FIG. 10F). The data suggest that the PTFE particles tend to agglomerate near the peaks formed from separation.

FIG. 11 shows ADMET tensile test comparisons.

regions colored accordingly, whereas FIG. 12I only highlights the PTFE region.

FIG. 13 shows data relating to various ReaxFF Parameterizations.

FIG. 15 shows various theoretical model snapshots. FIG. 15A shows a final PDMS simulation model (left), PDMS/PTFE simulation units (middle), and a final PTFE/PDMS simulation model (right). Also shown are snapshots of simulation box for PDMS in uniaxial compressive loading and tensile unloading (FIG. 15B) and biaxial tensile loading (FIG. 15C).

DETAILED DESCRIPTION

Figure 1A:
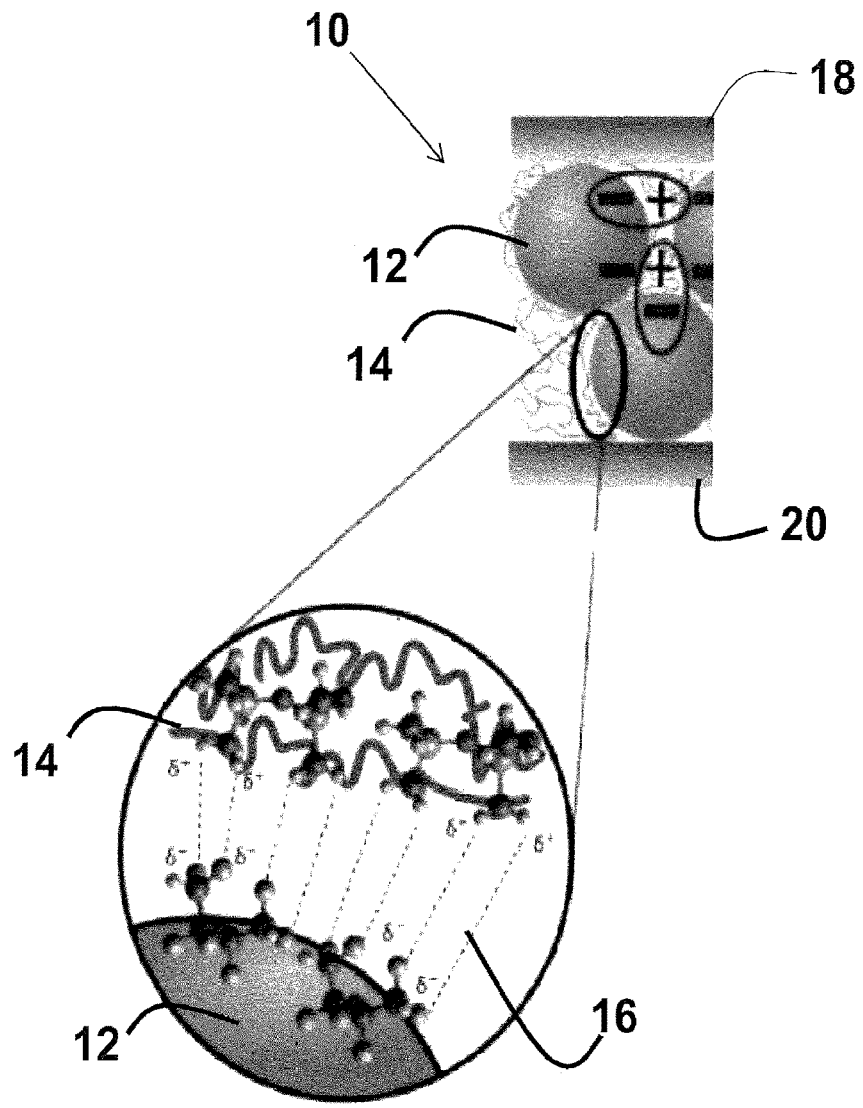
FIG. 1A is a depiction of an adhesive composition between two surfaces.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Methods of generating adhesion in various materials have been the subject of several recent studies. Several approaches have been used to achieve adhesion, including patterning, cross-linking, surface modification, and chemical synthesis. For instance, surface functionalized hydrogels have been utilized for adhesion to porous surfaces. Likewise, mussel-derived proteins and 3,4-dihydroxyphenylalanine (DOPA) cross-linkers have been used as water resistant adhesives.

Similarly, research focused on patterning materials to create strong adhesives have shown good results. However, such methods face scalability issues.

Moreover, many polymer-based adhesives rely on cross-linking or in-situ polymerization. However, such methods can lead to unexpected changes in material properties.

Furthermore, adhesives derived from the aforementioned methods can suffer from numerous limitations, including substrate limitations, environmental limitations, long curing times, toxicity, and lack of recyclability. Moreover, the search for a versatile biocompatible adhesive with the ability to work in any humidity level, show reversibility, and have a myriad of surface choices has been ongoing. Various embodiments of the present disclosure address the aforementioned needs.

In some embodiments, the present disclosure pertains to adhesive compositions that include a fluorinated molecule and a hydrogen-containing molecule. In some embodiments, the fluorinated molecule and the hydrogen-containing molecule are non-covalently associated with one another. A specific example of an adhesive composition is illustrated as adhesive composition 10 in FIG. 1A. In this example, adhesive composition 10 includes fluorinated molecule 12 in the form of solid particles, and hydrogen-containing molecule 14 in the form of liquid polymers. As illustrated in the inset in FIG. 1A, fluorinated molecule 12 is non-covalently associated with hydrogen-containing molecule 14 through dipole-dipole interactions 16. In addition, adhesive composition 10 is utilized to adhere surfaces 18 and 20 to one another.

In additional embodiments, the present disclosure pertains to methods of making the adhesive compositions of the present disclosure. In some embodiments illustrated in FIG. 1B, the methods include mixing a fluorinated molecule with a hydrogen-containing molecule (step 22) such that the fluorinated molecule and the hydrogen-containing molecule become non-covalently associated with one another (step 24) to form the adhesive composition (step 26).

In further embodiments, the present disclosure pertains to methods of enhancing the adhesiveness of a surface. In some embodiments illustrated in FIG. 1C, the method includes applying an adhesive composition of the present disclosure to the surface (step 30). In some embodiments, the applying covers the surface with the adhesive composition (step 32). In additional embodiments, the method also includes adhering the covered surface to another surface (step 34) such that the adhesive composition is placed between two surfaces.

As set forth in more detail herein, the adhesive compositions and methods of the present disclosure can have numerous embodiments. For instance, the adhesive compositions of the present disclosure may include numerous types of fluorinated molecules and hydrogen-containing molecules that are non-covalently associated with one another in various manners. Furthermore, the adhesive compositions of the present disclosure may become associated with various surfaces in various manners and in various environments.

Moreover, various methods may be utilized to mix fluorinated molecules and hydrogen-containing molecules to form the adhesive compositions of the present disclosure. In addition, various methods may be utilized to apply the adhesive compositions of the present disclosure to various surfaces.

Mixing of Molecules

The methods of the present disclosure may utilize various methods to mix fluorinated molecules with hydrogen-containing molecules. For instance, in some embodiments, mixing can occur by methods that include, without limitation, mechanical mixing, mechanical dispersion, mixing-evaporation processes, sonication, stirring, heating, and combinations thereof. In some embodiments, the mixing occurs by mechanical dispersion. Additional mixing methods can also be envisioned.

Fluorinated Molecules

The methods and compositions of the present disclosure may include various types of fluorinated molecules. Fluorinated molecules generally refer to molecules that include one or more fluorine atoms. In some embodiments, the fluorinated molecules are different from the hydrogen-containing molecules. In some embodiments, the fluorinated molecules of the present disclosure include at least 1 wt. % fluorine atoms. In some embodiments, the fluorinated molecules of the present disclosure include at least 5 wt. % fluorine atoms. In some embodiments, the fluorinated molecules of the present disclosure include at least 10 wt. % fluorine atoms. In some embodiments, the fluorinated molecules of the present disclosure include at least 25 wt. % fluorine atoms. In some embodiments, the fluorinated molecules of the present disclosure include at least 50 wt. % fluorine atoms.

In some embodiments, the fluorinated molecules of the present disclosure include, without limitation, fluorinated polymers, fluorinated nanomaterials, fluorinated carbon nanomaterials, fluorinated ceramics, fluorocarbons, fluorinated polysaccharides, fluorinated carbohydrates, fluorinated proteins, cross-linked networks thereof, and combinations thereof. The use of additional fluorinated molecules can also be envisioned.

In some embodiments, the fluorinated molecules of the present disclosure include fluorinated polymers. Various types of fluorinated polymers may be utilized. For instance, in some embodiments, the fluorinated polymers include, without limitation, polyvinylidene fluoride (PVDF), polytetrafluoroethylene (PTFE), polyfluorene (PFO), polyfluorophenyl (PFP), and combinations thereof. In some embodiments, the fluorinated polymers include polyvinylidene fluoride. In some embodiments, the fluorinated polymers include polytetrafluoroethylene.

In some embodiments, the fluorinated molecules of the present disclosure include fluorinated nanomaterials. Various types of fluorinated nanomaterials may be utilized. For instance, in some embodiments, the fluorinated nanomaterials include, without limitation, fluorinated graphenes, fluorinated graphene nanoribbons, fluorinated carbon nanotubes, fluorinated fullerenes, and combinations thereof.

The fluorinated molecules of the present disclosure can include various shapes and forms. For instance, in some embodiments, the fluorinated molecules of the present disclosure are in the form of macromolecules. In some embodiments, the fluorinated molecules of the present disclosure are in the form of particles. In some embodiments, the fluorinated molecules of the present disclosure are in the form of cross-linked networks.

In some embodiments, the fluorinated molecules of the present disclosure are in the form of nanoparticles. In some embodiments, the nanoparticles include sizes that range from about 10 nm to about 1 μm in diameter. In some embodiments, the nanoparticles include sizes that range from about 50 nm to about 500 nm in diameter. In some embodiments, the nanoparticles include sizes of at least about 100 nm in diameter. In some embodiments, the nanoparticles include sizes of at least about 200 nm in diameter.

The fluorinated molecules of the present disclosure may be in various phases. For instance, in some embodiments, the fluorinated molecules of the present disclosure are in at least one of a solid phase, a liquid phase, a gaseous phase, or combinations of such phases. In some embodiments, the fluorinated molecules of the present disclosure are in the form of a solid phase. In some embodiments, the fluorinated molecules of the present disclosure are in the form of a liquid phase. In some embodiments, the fluorinated molecules of the present disclosure are in the form of a gaseous phase.

Hydrogen-Containing Molecules

The methods and compositions of the present disclosure may also include various types of hydrogen-containing molecules. Hydrogen-containing molecules generally refer to molecules that include one or more hydrogen atoms. In some embodiments, the fluorinated molecules are separate and apart from the fluorinated molecules. In some embodiments, the hydrogen atoms of the hydrogen-containing molecules of the present disclosure include carbon-hydrogen bonds. In some embodiments, the hydrogen atoms of the hydrogen-containing molecules of the present disclosure include silicon-hydrogen bonds.

In some embodiments, the hydrogen-containing molecules of the present disclosure include at least 1 wt. % hydrogen atoms. In some embodiments, the hydrogen-containing molecules of the present disclosure include at least 5 wt. % hydrogen atoms. In some embodiments, the hydrogen-containing molecules of the present disclosure include at least 10 wt. % hydrogen atoms. In some embodiments, the hydrogen-containing molecules of the present disclosure include at least 25 wt. % hydrogen atoms. In some embodiments, the hydrogen-containing molecules of the present disclosure include at least 50 wt. % hydrogen atoms.

In some embodiments, the hydrogen-containing molecules of the present disclosure lack any fluorine atoms. In some embodiments, the hydrogen-containing molecules of the present disclosure include less than 1 wt. % fluorine atoms. In some embodiments, the hydrogen-containing molecules of the present disclosure include less than 0.5 wt. % fluorine atoms.

In some embodiments, the hydrogen-containing molecules of the present disclosure include, without limitation, hydrocarbon-based molecules, silicon-based molecules, polymers, silicon-containing polymers, nanomaterials, carbon nanomaterials, lard, ceramics, aromatic hydrocarbons, alkanes, alkenes, cycloalkanes, alkyne-based compounds, polysaccharides, carbohydrates, proteins, siloxanes, silicone oils, cross-linked networks thereof, and combinations thereof. The use of additional hydrogen-containing molecules can also be envisioned.

In some embodiments, the hydrogen-containing molecules of the present disclosure include hydrocarbon-based molecules. In some embodiments, the hydrogen-containing molecules of the present disclosure include a plurality of carbon-hydrogen bonds.

In some embodiments, the hydrogen-containing molecules of the present disclosure include silicon-based molecules. In some embodiments, the silicon-based molecules of the present disclosure include a plurality of silicon-hydrogen bonds. In some embodiments, the silicon-based molecules include, without limitation, siloxanes, polydimethylsiloxane, silicone oils, and combinations thereof.

In some embodiments, the hydrogen-containing molecules of the present disclosure include polymers. Various types of polymers may be utilized as hydrogen-containing molecules. For instance, in some embodiments, the polymers include, without limitation, silicon-containing polymers, siloxane-based polymers, polydimethylsiloxane (PDMS), polyisoprene, poly(methyl methacrylate)s, polystyrenes, polyacrylonitriles, polycarbonates, poly(phenylene ethynylene)s, cellulose, and combinations thereof. In some embodiments, the polymers include polydimethylsiloxane.

In some embodiments, the hydrogen-containing molecules of the present disclosure include nanomaterials. Various types of nanomaterials may be utilized as hydrogen-containing molecules. For instance, in some embodiments, the nanomaterials include, without limitation, graphenes, graphene nanoribbons, carbon nanotubes, fullerenes, and combinations thereof.

The hydrogen-containing molecules of the present disclosure can include various shapes and forms. For instance, in some embodiments, the hydrogen-containing molecules of the present disclosure are in the form of macromolecules. In some embodiments, the hydrogen-containing molecules of the present disclosure are in the form of particles. In some embodiments, the hydrogen-containing molecules of the present disclosure are in the form of cross-linked networks.

In some embodiments, the hydrogen-containing molecules of the present disclosure are in the form of a cross-linked network. In some embodiments, the cross-linked network enhances the non-covalent association of the hydrogen-containing molecules with the fluorinated molecules. For instance, in some embodiments, the hydrogen-containing molecules of the present disclosure include silicon-based materials (e.g., polydimethylsiloxane) with a cross-linked network that enhances the non-covalent association of the silicon-based material with the fluorinated molecule.

In some embodiments, the hydrogen-containing molecules of the present disclosure are in the form of nanoparticles. In some embodiments, the nanoparticles include sizes that range from about 10 nm to about 1 μm in diameter. In some embodiments, the nanoparticles include sizes that range from about 50 nm to about 500 nm in diameter. In some embodiments, the nanoparticles include sizes of at least about 100 nm in diameter. In some embodiments, the nanoparticles include sizes of at least about 200 nm in diameter.

The hydrogen-containing molecules of the present disclosure may be in various phases. For instance, in some embodiments, the hydrogen-containing molecules of the present disclosure are in at least one of a solid phase, a liquid phase, a gaseous phase, or combinations of such phases. In some embodiments, the hydrogen-containing molecules of the present disclosure are in the form of a solid phase. In some embodiments, the hydrogen-containing molecules of the present disclosure are in the form of a liquid phase. In some embodiments, the hydrogen-containing molecules of the present disclosure are in the form of a gaseous phase.

Amounts of Molecules in Adhesive Compositions

The adhesive compositions of the present disclosure may include various amounts of fluorinated molecules and hydrogen-containing molecules. For instance, in some embodiments, the fluorinated molecule in the adhesive composition includes from about 25 wt. % to about 75 wt. % of the composition. In some embodiments, the fluorinated molecule in the adhesive composition includes from about 25 wt. % to about 50 wt. % of the composition. In some embodiments, the fluorinated molecule in the adhesive composition includes about 50 wt. % of the composition.

In some embodiments, the hydrogen-containing molecule in the adhesive composition includes from about 25 wt. % to about 75 wt. % of the composition. In some embodiments, the hydrogen-containing molecule in the adhesive composition includes from about 25 wt. % to about 50 wt. % of the composition. In some embodiments, the hydrogen-containing molecule in the adhesive composition includes about 50 wt. % of the composition.

The adhesive compositions of the present disclosure may also include various ratios of fluorinated molecules and hydrogen-containing molecules. For instance, in some embodiments, the weight ratio of fluorinated molecules to hydrogen-containing molecules in the adhesive composition is about 1:1. In some embodiments, the weight ratio of fluorinated molecules to hydrogen-containing molecules in the adhesive composition is about 2:1. In some embodiments, the weight ratio of fluorinated molecules to hydrogen-containing molecules in the adhesive composition is about 3:4. Additional weight ratios can also be envisioned.

Phases of Molecules in Adhesive Compositions

The fluorinated molecules and hydrogen-containing molecules of the present disclosure may be present in adhesive compositions in different phases. For instance, in some embodiments, one molecule is in a liquid phase while the other molecule is in a solid phase. In some embodiments, the fluorinated molecule is in a solid phase while the hydrogen-containing molecule is in a liquid phase. In some embodiments, the fluorinated molecule may be in a liquid phase while the hydrogen-containing molecule is in a solid phase.

In some embodiments, the different phases of the fluorinated molecules and hydrogen-containing molecules enhances the strength of the non-covalent association between fluorinated molecules and hydrogen-containing molecules in adhesive compositions. For instance, in some embodiments, strong solid-liquid non-covalent association can exist between fluorinated molecules and hydrogen-containing molecules. This in turn can enhance the adhesiveness of the adhesive composition.

Non-Covalent Association Between Adhesive Composition Molecules

Various types of non-covalent associations may exist between fluorinated molecules and hydrogen-containing molecules of the present disclosure. In some embodiments, the non-covalent associations include associations that lack any covalent bonds between the fluorinated molecules and hydrogen-containing molecules. In some embodiments, the non-covalent associations include associations that lack any ionic or covalent bonds between the fluorinated molecules and hydrogen-containing molecules.

In some embodiments, the non-covalent associations include, without limitation, non-covalent bonds, non-ionic bonds, reversible bonds, physical bonds, geometrical bonds, mechanical interactions, and combinations thereof. In some embodiments, the non-covalent associations include, without limitation, dipole-dipole interactions, dipole-dipole-induced interactions, Van der Waals forces, hydrogen bonds, and combinations thereof.

In some embodiments, the non-covalent associations include hydrogen bonds. In some embodiments, the non-covalent associations include dipole-dipole interactions (e.g., dipole-dipole interactions 16 depicted in FIG. 1A).

In some embodiments, the non-covalent associations include mechanical interactions. In some embodiments, the mechanical interactions include, without limitation, jamming, entanglements, molecular interlocking, sintering, and combinations thereof. In some embodiments, the mechanical interactions enhance the adhesive properties of the adhesive compositions of the present disclosure.

Non-covalent associations between fluorinated molecules and hydrogen-containing molecules of the present disclosure can occur within various regions of the adhesive compositions of the present disclosure. For instance, in some embodiments, the non-covalent association occurs at interfaces between the fluorinated molecule and the hydrogen-containing molecule. In some embodiments, the non-covalent association is in the form of interfacial bonding between the fluorinated molecule and the hydrogen-containing molecule. In some embodiments, the interfacial bonding includes fluorine-hydrogen dipole interactions at the interface.

Non-covalent associations between fluorinated molecules and hydrogen-containing molecules of the present disclosure can have various effects on the adhesive compositions of the present disclosure. For instance, in some embodiments, the non-covalent association creates a fluorine-hydrogen electronegativity difference between at least some of the fluorine atoms of the fluorinated molecule and at least some of the hydrogen atoms of the hydrogen-containing molecule. The aforementioned electronegativity difference can in turn contribute to enhanced adhesive properties of the adhesive compositions of the present disclosure.

Association of Adhesive Compositions with Surfaces

Figure 1B:
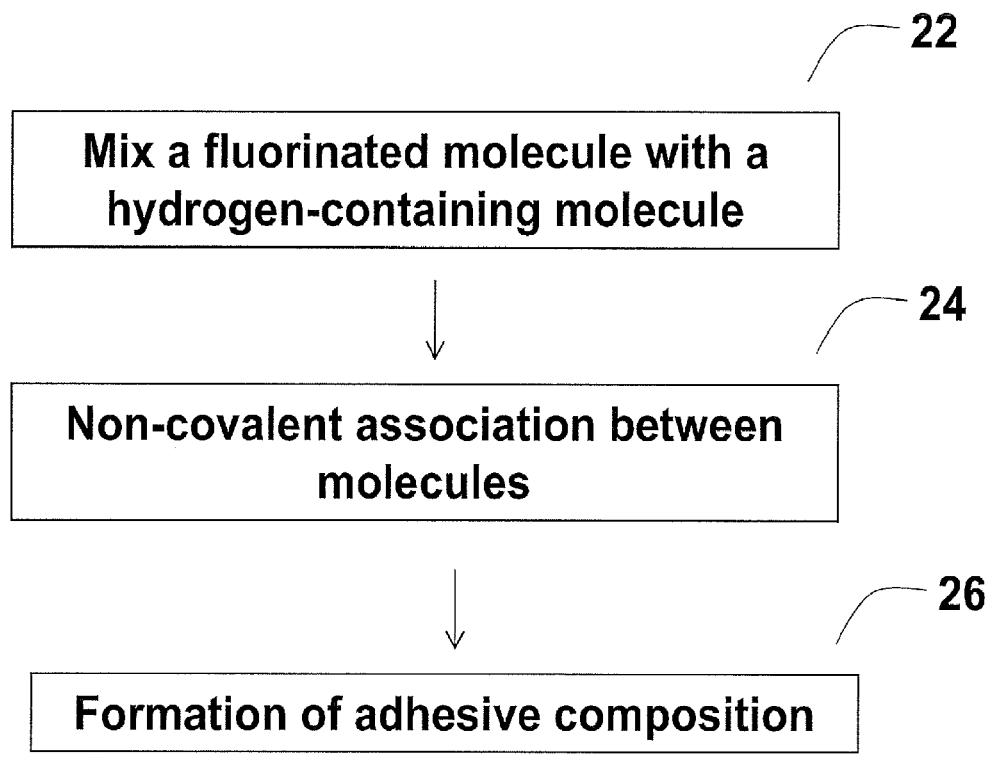
FIG. 1B illustrates a method of making an adhesive composition.
Figure 1C:
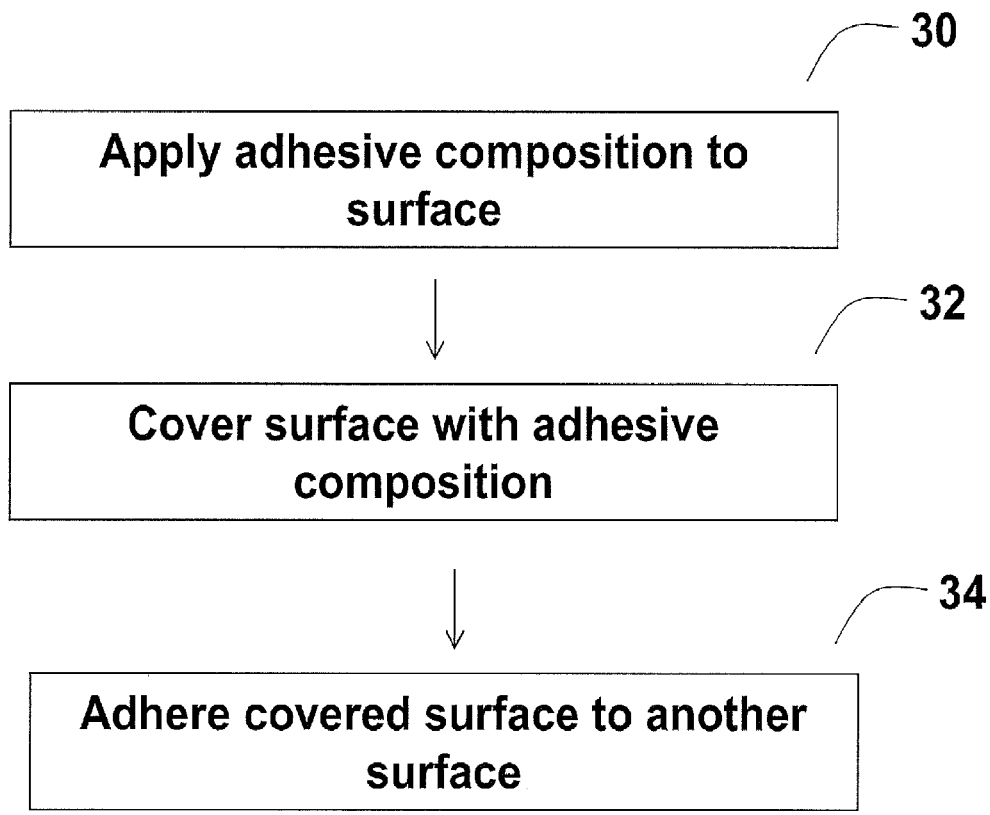
FIG. 1C illustrates a method of applying an adhesive composition to a surface.

In some embodiments, the adhesive compositions of the present disclosure may be associated with one or more surfaces (e.g., surfaces 18 and 20, as illustrated in FIG. 1A). In some embodiments, the adhesive compositions of the present disclosure may be between two surfaces (e.g., adhesive composition 10 between surfaces 18 and 20, as illustrated in FIG. 1A). In some embodiments, the adhesive compositions adhere the two surfaces to one another The adhesive compositions of the present disclosure may be associated with various surfaces. For instance, in some embodiments, the surfaces include, without limitation, papers, foils, ceramics, metals, copper-based surfaces, copper sheets, copper foils, aluminum-based surfaces, aluminum sheets, aluminum foil, glass, plastics, silicon wafers, bio-materials, skin surfaces, and combinations thereof. Adherence of adhesive compositions to additional surfaces can also be envisioned.

Surfaces may be covered with the adhesive compositions of the present disclosure in various manners. For instance, in some embodiments, an entire surface may be covered with the adhesive compositions of the present disclosure. In some embodiments, surface pores may be filled with the adhesive compositions of the present disclosure.

The adhesive compositions of the present disclosure may be applied to surfaces in various manners. For instance, in some embodiments, the application occurs by a method that includes, without limitation, spraying, spin-coating, drop-casting, spray coating, dip coating, physical application, vapor-coating, sublimation, blading, inkjet printing, screen printing, direct placement, thermal evaporation, and combinations thereof. In some embodiments, the application occurs by spraying. Additional application methods can also be envisioned.

In some embodiments, the adhesive compositions of the present disclosure are applied directly onto a surface. In some embodiments, the surface with the adhesive composition may then be adhered to another surface. In some embodiments, the adhesive compositions of the present disclosure are applied between two surfaces.

Applications and Advantages

The methods and adhesive compositions of the present disclosure can provide various advantageous properties. For instance, in some embodiments, the adhesive compositions of the present disclosure rely on electronegativity differences and mechanical interactions (e.g., jamming and entanglements) between the fluorinated molecules and hydrogen-containing molecules to achieve advantageous adhesive properties. In some embodiments, such advantageous adhesive properties include, without limitation, high adhesion under uniaxial as well as shear loading conditions, lack of any residual strain, recoverable cyclic behavior, and high adhesive strengths (e.g., 0.3 Mpa-1.1 Mpa at 0.1 N/min).

Furthermore, the adhesive compositions of the present disclosure can have advantageous physical properties, such as biocompatibility, non-toxicity, effective reusability without any significant adhesion loss over several cycle, hydrophobicity, amphibiousness, and a gel-like consistency that prevents crack formation. Moreover, the properties of the adhesive compositions of the present disclosure can be tunable.

For instance, in some embodiments, the properties of the adhesive compositions of the present disclosure can be tuned by selecting different types and ratios of fluorinated molecules with different fluorination levels and different types and ratios of hydrogen-containing molecules with different hydrocarbon content. In addition, due to the abundance of many fluorinated molecules and hydrogen-containing molecules, the adhesive compositions of the present disclosure can be created in bulk quantities in a cost effective manner.

As such, the adhesive compositions of the present disclosure can be used for various applications in various environments. For instance, in some embodiments, the adhesive compositions of the present disclosure can serve as universal adhesives. In some embodiments, the adhesive compositions of the present disclosure can be utilized as an adhesive in gaseous environments, such as air. In some embodiments, the adhesive compositions of the present disclosure can be utilized as an adhesive while submerged in a liquid, such as oil or water. In some embodiments, the adhesive compositions of the present disclosure can keep liquids from absorbing into a surface covered by the adhesive composition. In some embodiments, the adhesive compositions of the present disclosure can be utilized as skin adhesives for various biomedical applications, such as wound healing.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Amphibious Adhesives Using Solid-Liquid Polymer Mixes

In this Example, Applicants demonstrate the synthesis of an amphibious adhesive by mixing of solid polytetrafluoroethylene (PTFE) and liquid poly(dimethylsiloxane)(PDMS) polymers. The adhesive mechanism is enabled by molecular dipole interactions arising from electro-negativity differences, which repeat and give rise to macroscale adhesion. The two-phase solid-liquid polymer system gives rise to adhesive behavior applicable in air and water and results in high adhesion under uniaxial as well as shear loading conditions when joining a wide range of similar and dissimilar materials such as glass, metal, ceramic, paper, and biomaterials.

Validation of the atomic scale adhesive behavior of this system was performed using reactive force field models confirming the experimental results. These adhesives could fill the need for universal glues for bonding a wide variety of materials under a range of environments. The mixing of a solid and liquid polymer can result in the formation of a universal adhesive, which can work in air and water.

Without being bound by theory, adhesives disclosed in this Example operate based on a fluorine-hydrogen electronegativity difference and mechanical interactions between solid and liquid phases. As the polymers mix, the PDMS chains re-orient themselves and, due to the large electronegativity difference between fluorine atoms in PTFE and hydrogen atoms in PDMS, dipoles are induced between the two polymer chains, which give rise to adhesive properties.

To analyze the potential of dipole-induced adhesion, Applicants chose to synthesize a blend using hydroxyl terminated PDMS (polydimethylsiloxane, liquid phase) and PTFE (polytetrafluoroethylene, solid phase). The fluorine content in PTFE is capable of generating an induced dipole-moment in neighboring atoms. The solid spherical PTFE particles that were used (DuPont Zonyl 1000 MP) were about 100 nm in radius, with a large surface area.

Figure 2A:
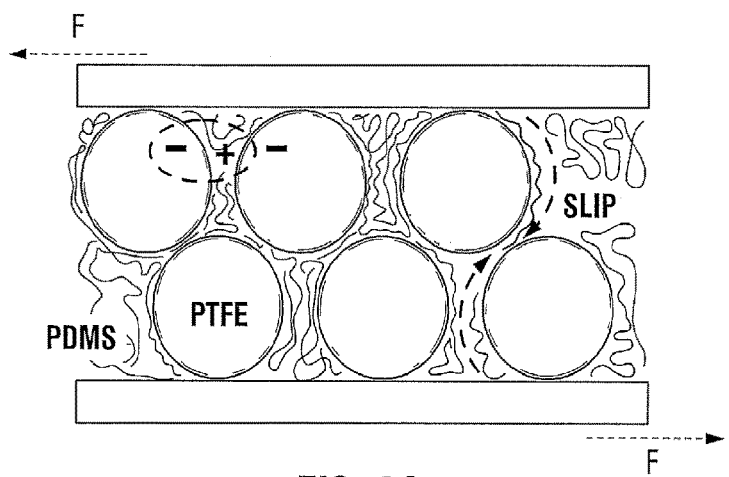
FIG. 2 provides images relating to the proposed mechanism and scanning electron microscopy (SEM) imaging of failure modes in polytetrafluoroethylene(PTFE)-polydimethyl siloxane (PDMS) polymer blends. The proposed failure mechanisms for shear (FIG. 2A) and tensile (FIG. 2B) modes show the interactions at play while failure is happening. The dipole interactions prevent initial failure and provide mechanical consistency to the PTFE-PDMS system via dipole-dipole and dipole-induced dipole. The mechanism is confirmed through SEM imaging where tensile failure (FIG. 2C) shows the stress lines due to pull out in the inset as well as the voids left from pulling out the PTFE. Additionally, the second inset in FIG. 2C shows the different polymer blends and the color change from clear PDMS to a white blend. The dipole interactions are schematically emphasized in FIG. 2D. The stress lines have also been highlighted in FIG. 2E and they can also be seen around all the PTFE, which act as anchoring points due to the strength of the dipole interactions. The in-situ testing images were set up to show the initial (FIG. 2F) and loaded (FIG. 2G) states of the PTFE/PDMS. The stress areas from the loading were clearly outlined in FIG. 2G and the stringing effect can be seen in FIG. 2H. Stress-strain curves showing the initial cycle (FIG. 2I) and multiple cycles (FIG. 2J) are present and have key features highlighted. The loading and unloading is clearly marked in FIG. 2J and the jamming can be seen in FIG. 2I. The dynamic mechanical analysis (DMA) testing (FIG. 2K) shows 0 wt. % PTFE in blue (iii), 25 wt. % PTFE in red (ii), and 50 wt. % PTFE in green (i). The inset in FIG. 2K shows the effect of rate on the adhesion of PDMS (navy blue) versus the PTFE/PDMS (4FPS) mix (grey). Tensile testing using an ADMET system (FIG. 2L) shows the difference between raw PDMS in adhesion between aluminum substrates and mismatched substrates (aluminum and plastic). The difference between PDMS and the PTFE/PDMS mix is emphasized in the figure and highlighted in the inset where black represents the PDMS and red represents the PTFE/PDMS mix. Specifically, (i) represents adhesion between aluminum and plastic using PDMS (green), whereas red (ii) represents adhesion between aluminum and plastic using the PTFE/PDMS mix. Meanwhile, iii (in purple) represents PDMS adhesion between aluminum substrates whereas iv (in blue) represents using the PTFE/PDMS mix with aluminum substrates.
Figure 2B:
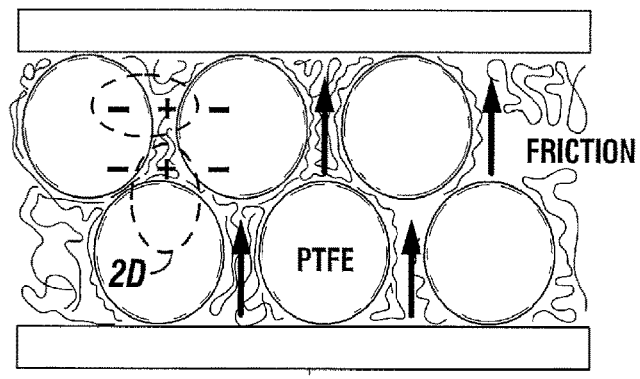
Figure 2D:
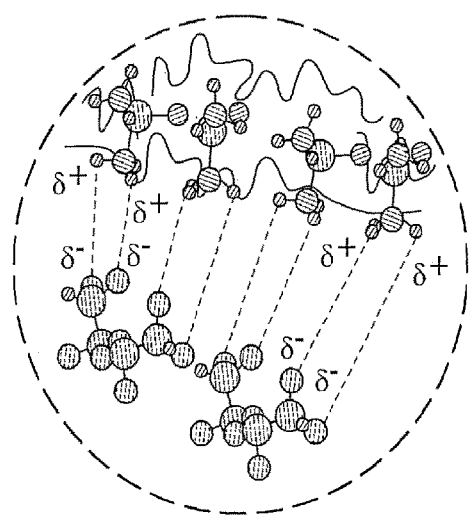

As mixing occurs, the PDMS organizes preferentially around the PTFE spheres (FIGS. 2A-B and 2D). The molecular-level dipole interactions repeat many times per polymer chain and give rise to macro-scale adhesive properties. During shear/torsion, the PTFE is attracted to the PDMS due to dipole interactions and resist deformation (FIG. 2A). Additionally, during tension, the dipole interactions attempt to hold the PTFE in place (FIG. 2B).

Figure 2C:
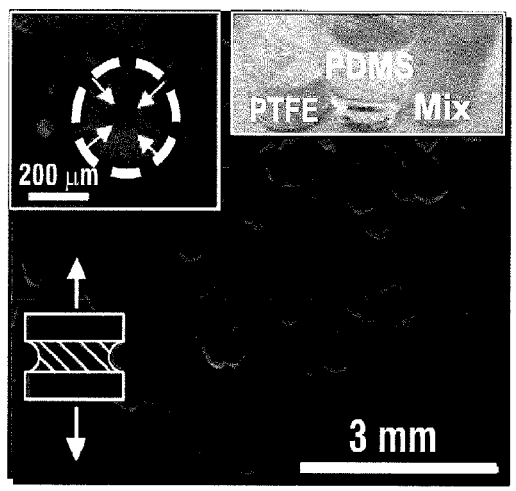
Figure 2F:
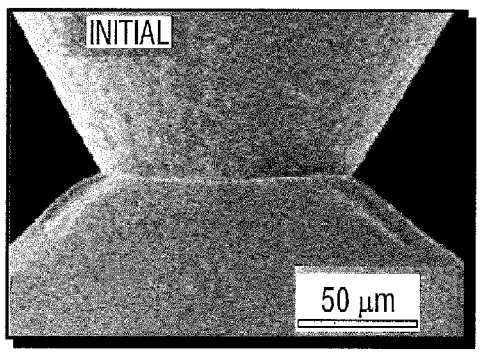
Figure 2E:
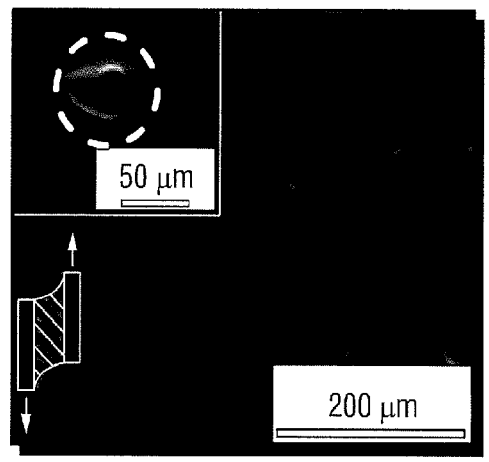
Figures 3A, 3B, 3C:
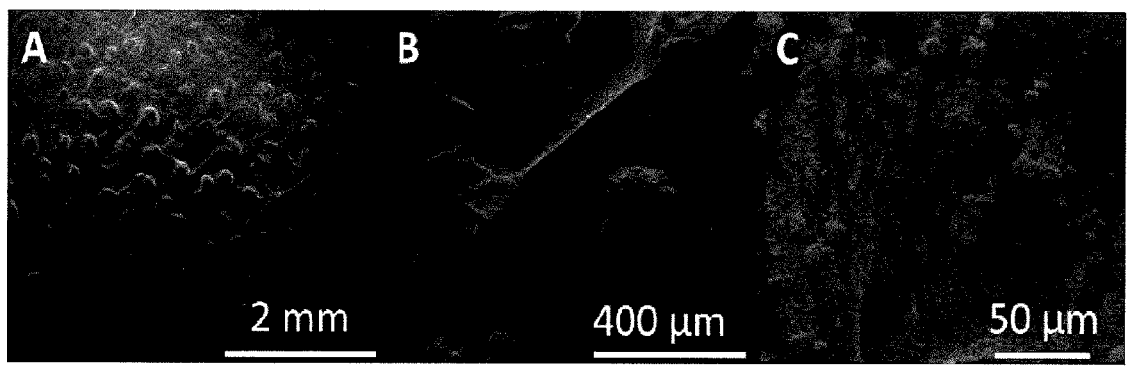
FIG. 3 shows SEM images of the PTFE-PDMS polymer blends at different magnifications. The different magnifications in FIGS. 3A-C emphasize the polka-dot like pattern and show the dispersion of the PTFE particles into the PDMS.

Under scanning electron microscopy (SEM), the 1:1 PTFE/PDMS blend showed a homogenous polka-dot pattern (FIGS. 3A-C). To the naked eye, the material looks like a white gel, whereas, PDMS is clear and PTFE is a white powder (inset in FIG. 2C). SEM images after tensile failure (FIG. 2C) show that PTFE tends to pull out of the PDMS matrix. This is further supported by the stress lines that can be seen around the pullout area (see inset in FIG. 2C). In comparison, shear failure (shown in FIG. 2E) shows stress lines developing around the PTFE particle, which indicates that the PTFE spheres act as areas of concentrated stress (as indicated by the strain lines in the inset in FIG. 2E and FIG. 4).

In-situ mechanical measurements attached to SEM show stringing within the PTFE/PDMS blend. Stringing is a characteristic of adhesives, appearing as the adhesive attempts to keep both substrates adhered (FIGS. 2F-H). The in-situ tensile test is shown in a series of SEM images that correspond to compressive pre-loading, loading (in tension), and unloading (FIGS. 2F, 2G, and 2H, respectively). The in-situ load-displacement curve shows full recovery after each cycle, even though some distinct abnormalities are present in the first cycle (FIG. 2I).

Generally, the aforementioned load drops represent sudden changes in behavior such as loss of contact area. Although the loss of contact is a possibility, it cannot be seen in either of the images in FIGS. 2F-H. The material does not exhibit residual strain and shows recoverable cyclic behavior, which indicates no loss of adhesion over several cycles. The recoverability is complemented by the liquid phase, which prevents crack formation and propagation.

Figure 5A:
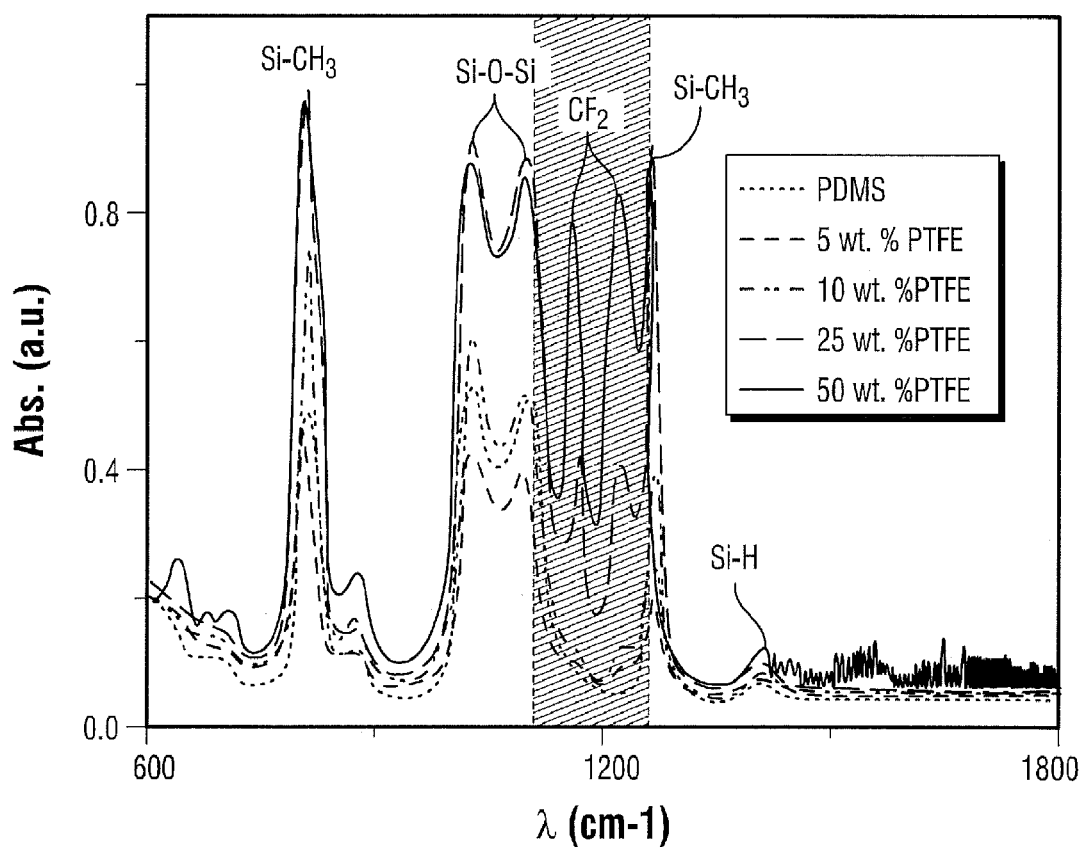
FIG. 5 shows Fourier Transform Infrared (FTIR) and thermogravimetric (TGA) analyses of the PTFE-PDMS polymer blends. The material's characterization through FTIR (FIG. 5A) shows the diminished peaks of the Si—O—Si vibrations and the increasing $CF_2$ vibrations arising from higher PTFE content. TGA studies (FIG. 5B) show the degradation of the material. The highlighted areas represent similar slopes between the mixture and either the PTFE or PDMS (blue represents a similar slope to PDMS whereas green represents a similar slope to PTFE).

The chemical structure of the material was analyzed using FTIR spectroscopy, as seen in FIG. 5A. The analysis confirms the absence of any new chemical bonds, thus eliminating the possibility of covalent bonding within the blend. As Applicants changed the concentration of PTFE, $CF_2$ peaks appeared and the relative intensity of PDMS decreased (FIG. 5A).

Figure 5B:
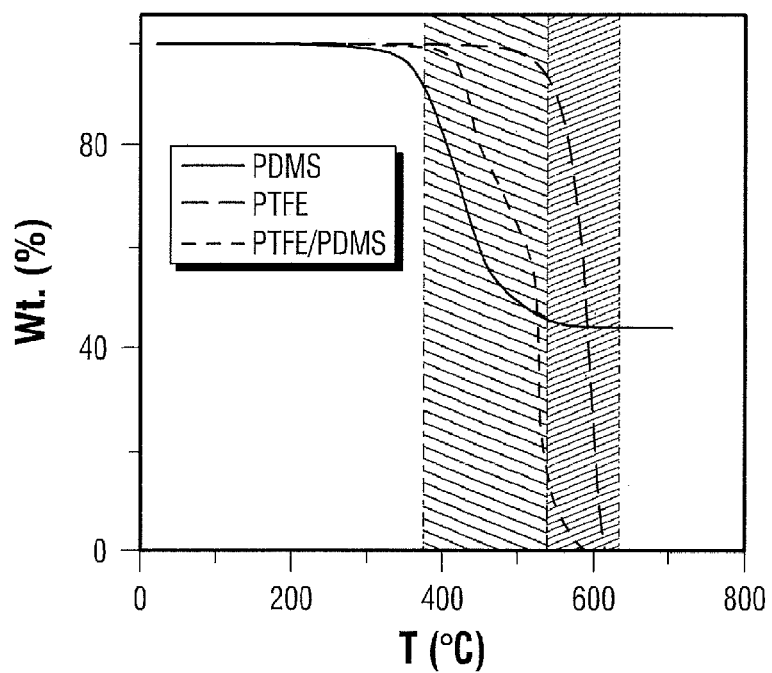

Thermogravimetric analysis (TGA), performed in air at 10° C./min, supports the spectroscopy data (FIG. 5B). Additionally, the TGA data indicates the presence of molecular interactions, as exhibited by the shift in degradation temperature by ~80° C., relative to pure PDMS. The two highlighted regions in FIG. 5B correspond to regions with the same degradation slopes (i.e. the blue region represents the region where the mixtures' degradation slope is the same as that of PDMS, while the green region represents the region where the degradation slope matches the PTFE slope), thus revealing the composite to have the same behavior as individual components.

Figure 2G:
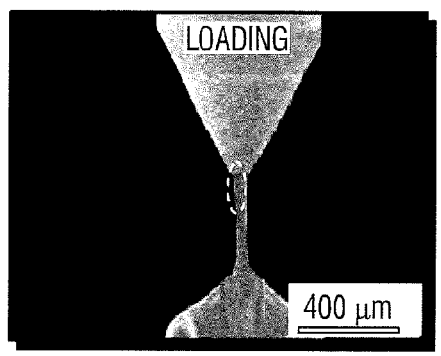
Figure 2H:
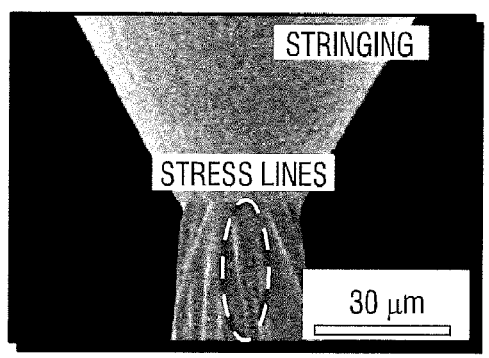
Figure 2I:
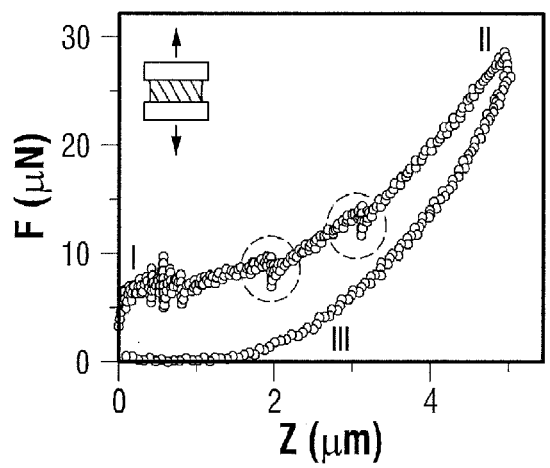
Figure 2J:
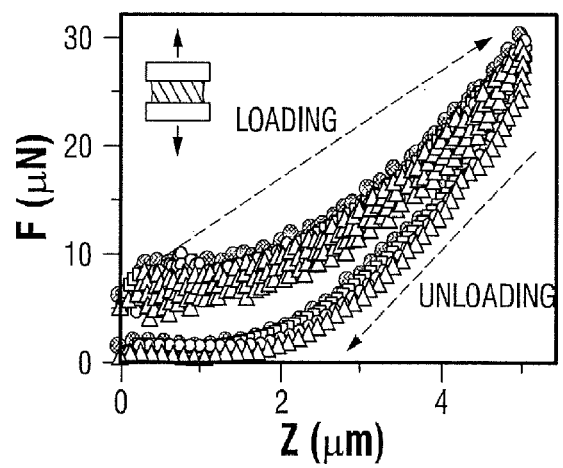
Figure 2K:
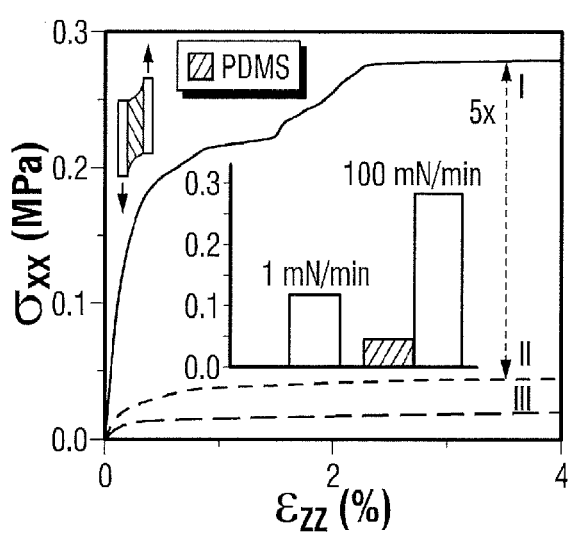
Figure 2L:
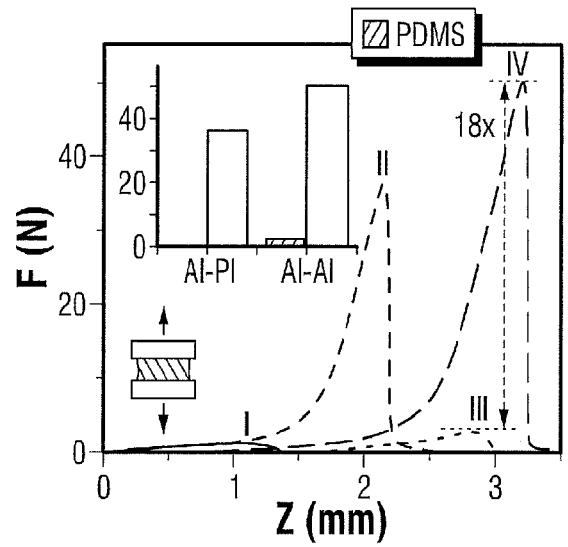

To quantify the strength of the adhesive bonds, Applicants utilized DMA for shear measurements (FIG. 2K), in tandem with tensile testing (FIG. 2L). Shear testing was performed using a force-controlled method at a rate of 0.1 N/min and 0.001 N/min. The rate plays a very important role in the apparent strength of the material, as lower rates will exhibit lower strength. At 0.1 N/min, the adhesive showed a maximum strength of ~0.3 MPa (FIG. 2K). The adhered substrates experienced cohesive failure at 0.3 MPa. This is an increase of up to 548% over pure PDMS, which was also tested at 0.1 N/min (FIG. 2K and the corresponding inset).

Figure 6:
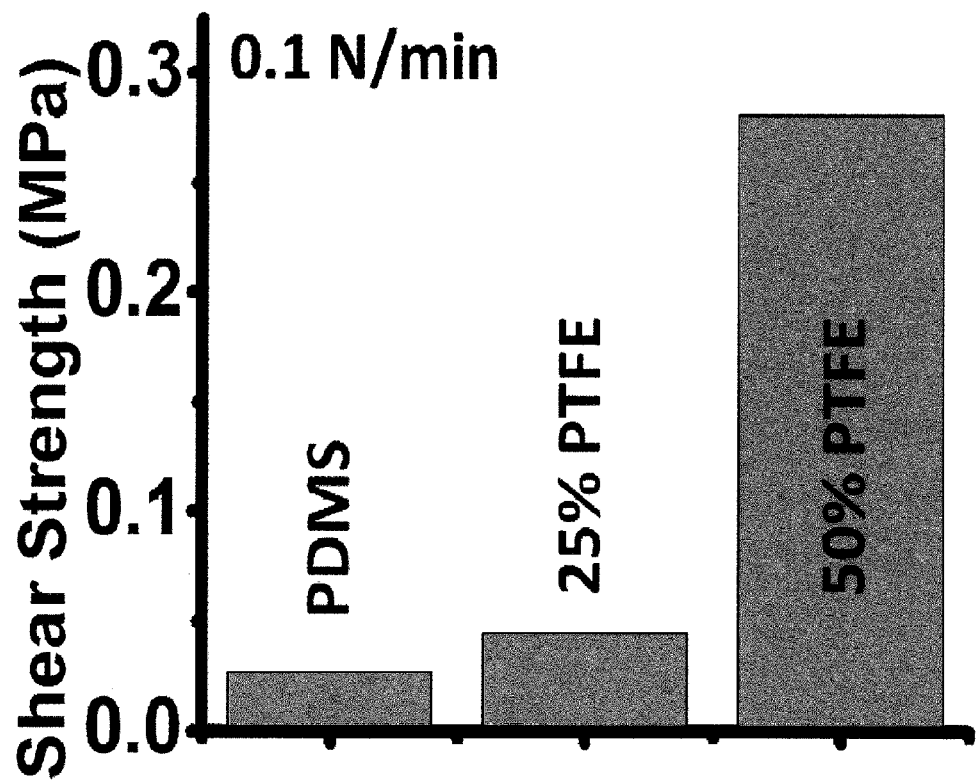
FIG. 6 shows the effects of PTFE concentration on lap shear. The chart shows the difference between PTFE content from DMA tests at the rate of 0.1 N/min.

Under a slower rate (0.001 N/min), the adhesive showed a 5,800% increase over pure PDMS that was tested at the same rate (see inset in FIG. 2K). As the loading rate increases, the strength also increases (shown in the inset in FIG. 2K). DMA results also showed a stark difference between having 25 wt. % PTFE and 50 wt. % PTFE in the sample (FIG. 6).

Figure 7:
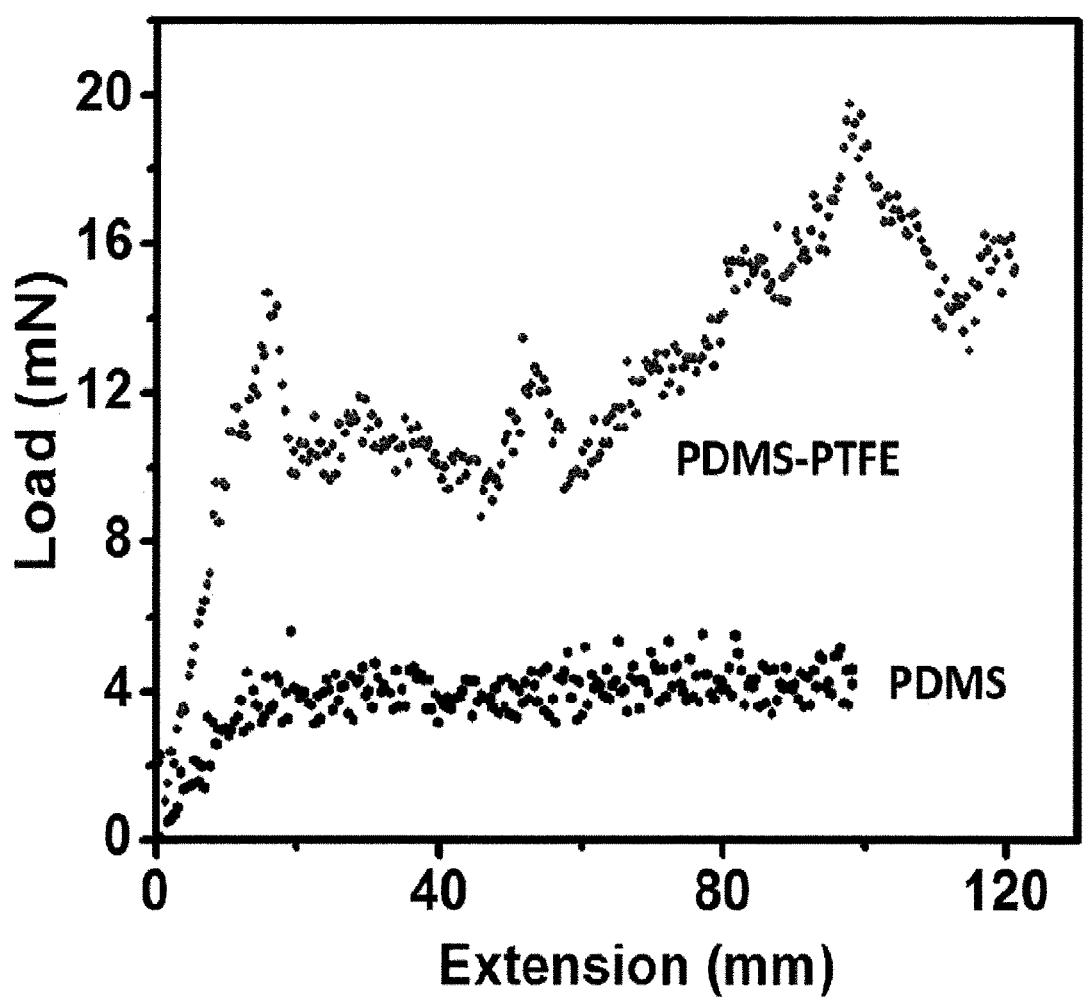
FIG. 7 shows a comparison of T-peel test of PDMS and PDMS with PTFE. The chart shows the T-peel test of the PDMS and PTFE/PDMS blends using an Instron frame.
Figure 8:
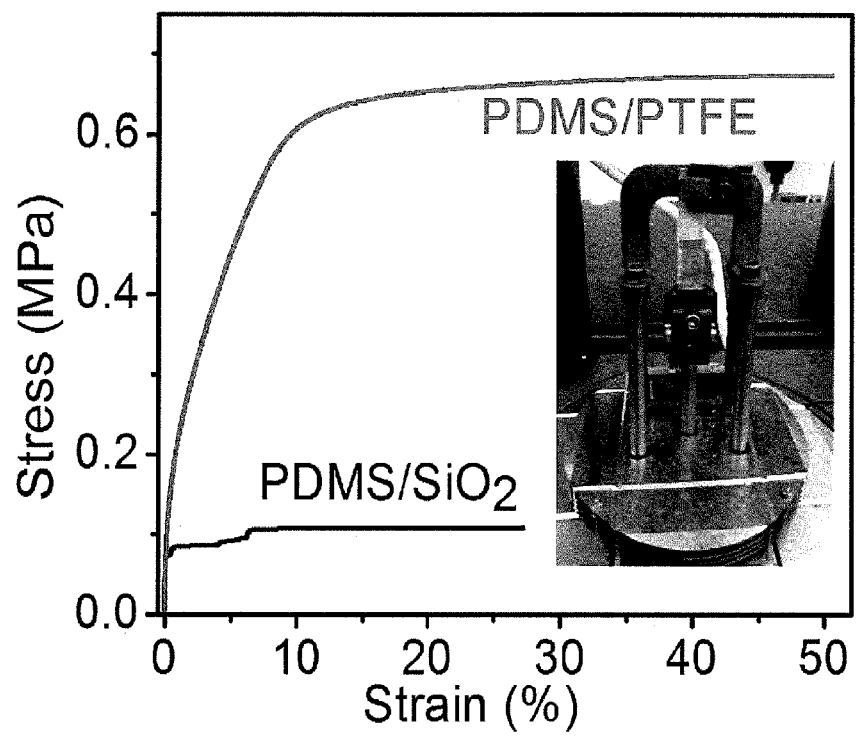
FIG. 8 shows comparative DMA testing between PTFE/PDMS and PDMS/$SiO_2$. The testing was done using a DMA Q800 and copper foil, which was wiped down with a paper towel prior to testing. The testing used a force ramp of 0.1 N/min and an equal weight ratio (1:1 (by weight)) and an adhesion area of 20 mm² for both $SiO_2$ and PTFE.

The data shows that even a 25% PTFE content leads to a nominal increase in adhesion compared to PDMS (also shown in peel testing in FIG. 7). However, a 50% content of PTFE leads to a 524% increase (in relation to a 25% PTFE/75% PDMS blend). This implies that fluorine atoms in PTFE play a large role in the adhesive behavior. While filler geometry plays a role in the adhesion properties of PDMS, a comparative test using similar sized particles and similar concentrations of $SiO_2$/PDMS and PTFE/PDMS shows that $SiO_2$ does not enhance the adhesion as much as PTFE (FIG. 8). This implies that the adhesion mechanism is a mixture of both chemical and mechanical effects but is more reliant on chemical interactions.

The shear strength of the material matches the adhesion of shellfish-based adhesives onto aluminum, which boasts a strength of 0.3 MPa. After testing, the failure pattern could be seen on the substrate surface (FIG. 9A). The pattern shows aggregations in the direction of failure (also seen in FIGS. 10A-F). In the case of shear failure, the surface pattern (FIG. 9A) and SEM images (FIG. 2E) indicate that failure most likely occurred due to PTFE spheres slipping past each other in the PDMS matrix (cohesive failure).

To complement the DMA shear testing, tensile testing was performed using an ADMET testing system. The testing was performed by adhering a 25.5 mm aluminum disk onto an aluminum block (using the PTFE/PDMS blend) and pulling at a rate of 5 mm/min (see FIG. 2L and FIG. 11).

Figure 12A:
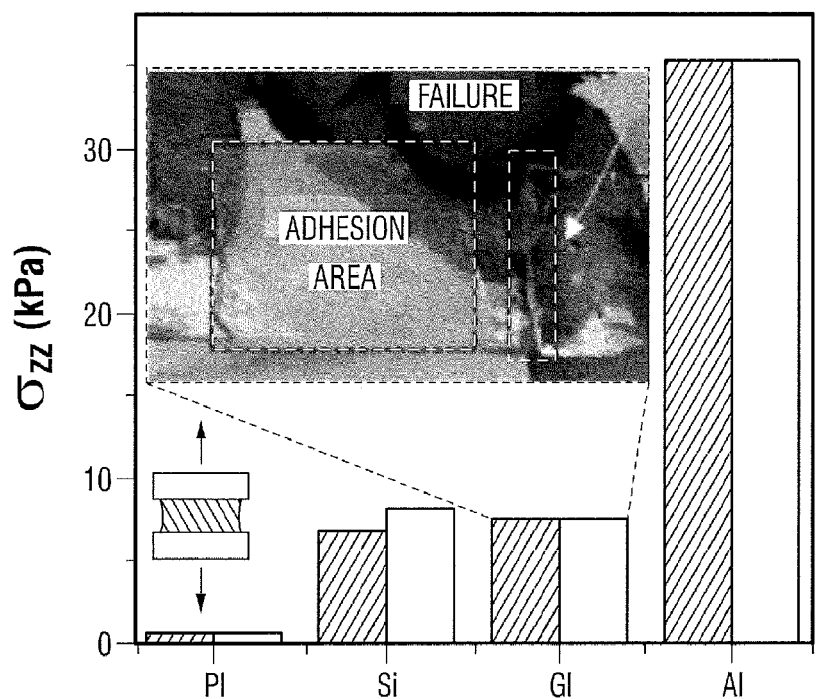
FIG. 12 shows qualitative testing and behavior of PDMS/PTFE polymer blends. Qualitative tensile (FIG. 12A), and shear (FIG. 12B) testing using standard weights showing the adhesive strength both in air and in water were performed. The loading can be clearly identified by the schematics in each figure. The inset in FIG. 12A shows the tensile failure of glass before the failure of the adhesive after being submerged and exerted to a 500 g load. The inset in FIG. 12B shows the sample sizes and adhesion areas used in shear and tensile. X-ray computerized tomography (CT) of an overall mass of the PTFE/PDMS blend is shown in FIG. 12C and then bisected in FIG. 12D to reveal the inner structure of the blend. In these images, blue shows the PDMS regions whereas the yellow marks the PTFE regions. Further zooming in on the inner structure shows strain/flow lines, emphasized by red arrows, in both (FIG. 12E) and (FIG. 12F). A recolor (FIG. 12F) of the same image shows the agglomeration and initiation of jamming of PTFE particles in line with the direction of the stress/flow. By zooming in on the interface (FIG. 12G), the PTFE particles can be seen arranging near the substrate in both 2D slices (FIGS. 12H-J) but also in the 3D side view (FIG. 12K). The dashed red line marks the end of the substrate in both the 2D slices (FIGS. 12H-J) and 3D side view (FIG. 12L). The 2D slice (FIG. 12H) shows both the PDMS (blue) and PTFE (yellow)
FIG. 12J shows the raw grayscale slice. A 3D overview with both colored and grayscale versions of the image is shown in FIG. 12K, whereas a side view is shown in FIG. 12L. In the 3D side view, the PTFE is arranging along the interfaces with the substrate, which has been highlighted using a dashed red line.
Figure 12B:
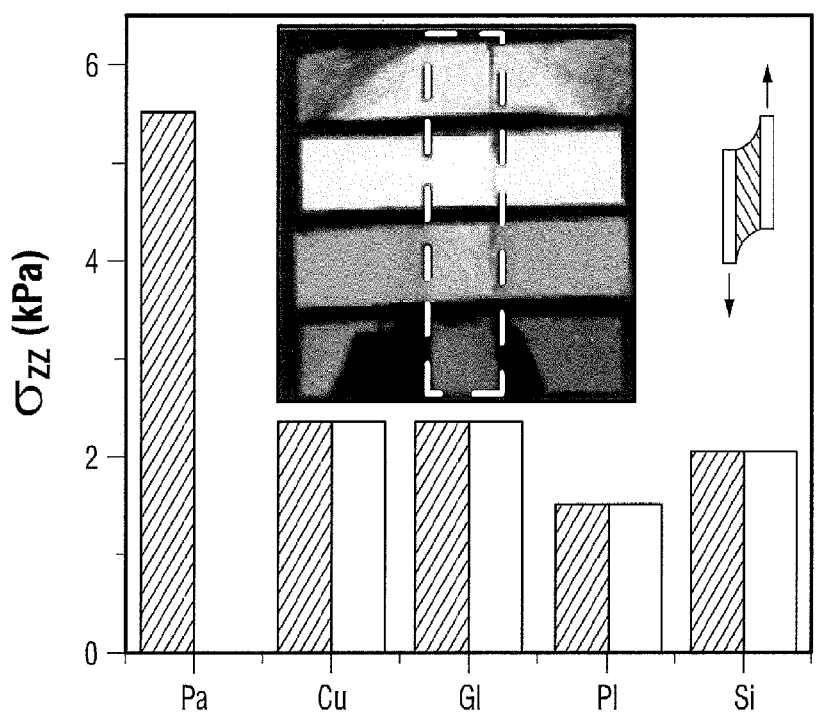
Figures 12C, 12D:
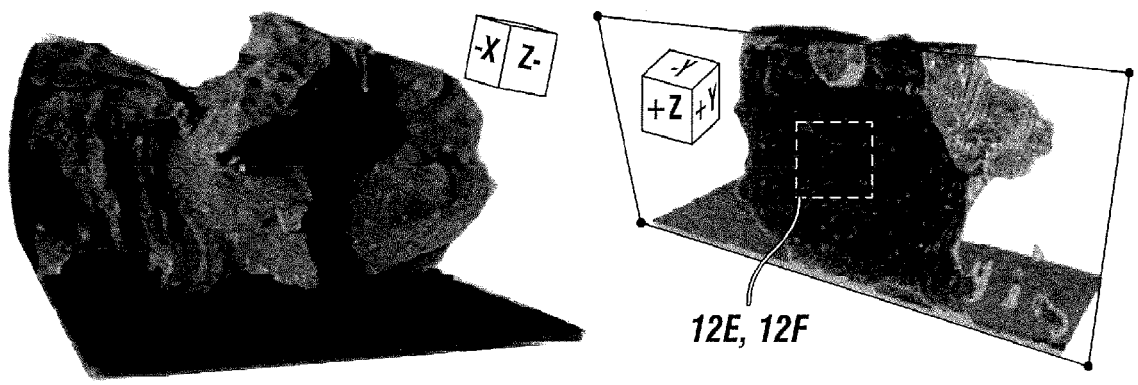
Figure 12E:
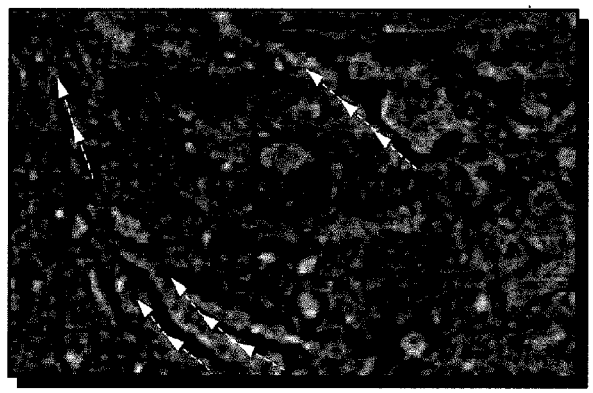
Figure 12F:
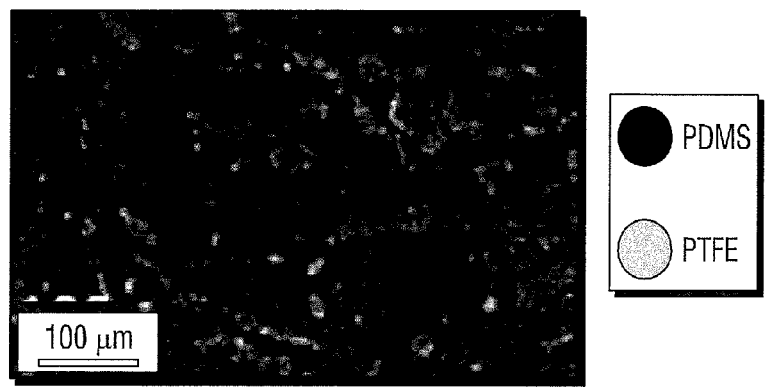
Figure 12G:
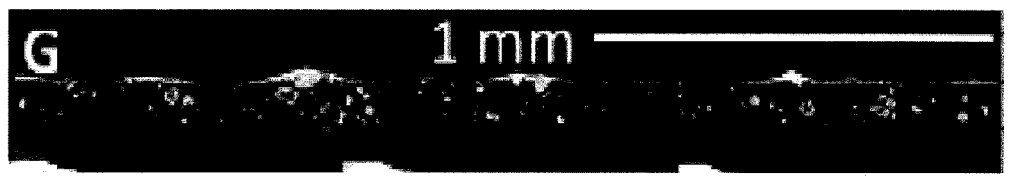
Figures 12H, 12I, 12J:
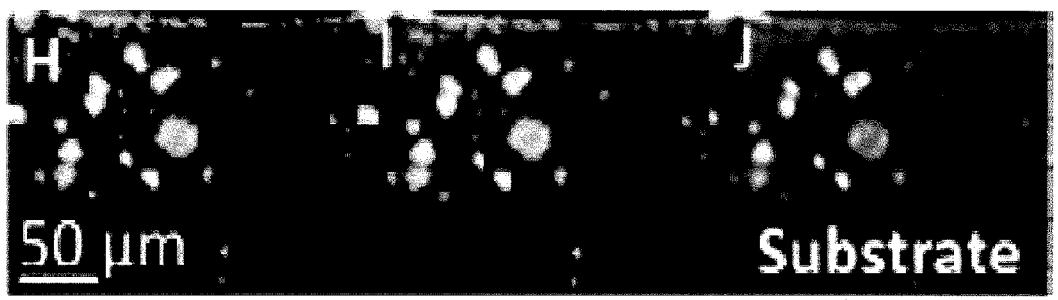
Figure 12K:
Figure 12L:
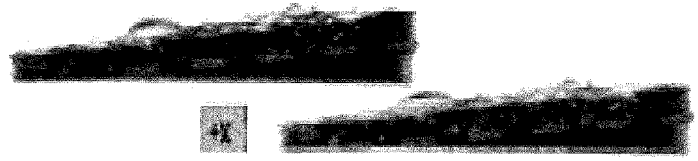
Figure 13A:
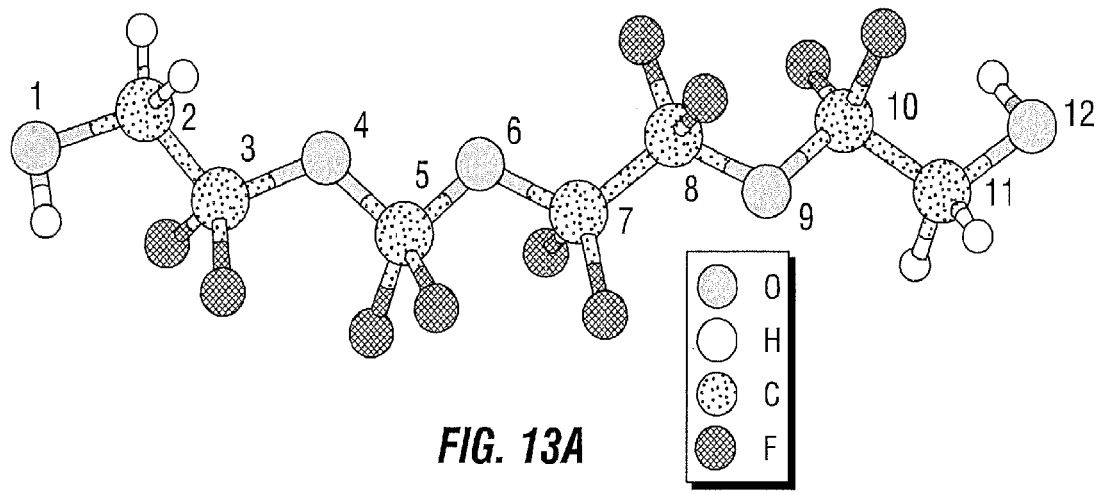
FIG. 13A shows Zdol monomer structure with backbone numbering as used in the ReaxFF force field development.
Figure 13B:
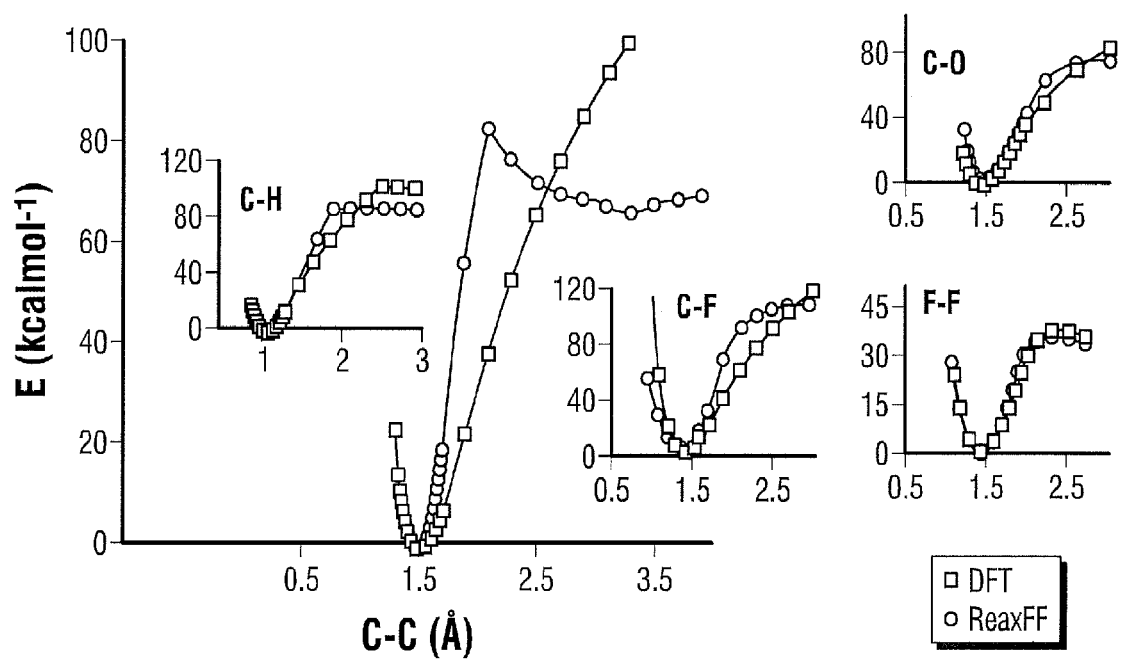
FIG. 13B shows ReaxFF and DFT energies for bond compression/extension energies in Zdol $(H_3C)_2CF_2$ and in $F_2$ molecules for F—F bond. The C—C bond data (see related inset) is for the $C_2$—C3 bond (see numbering in FIG. 3A), the C—O bond data (see related inset) is for the $C_3$—$O_4$ bond, the C—H bond data (see related inset) is for the $C_2$—H bond, the C—F bond data (see related inset) is for the C—F bond in $(H_3C)_2CF_2$, and the F—F bond data (see related inset) is for the F—F bond in $F_2$.
Figure 13C:
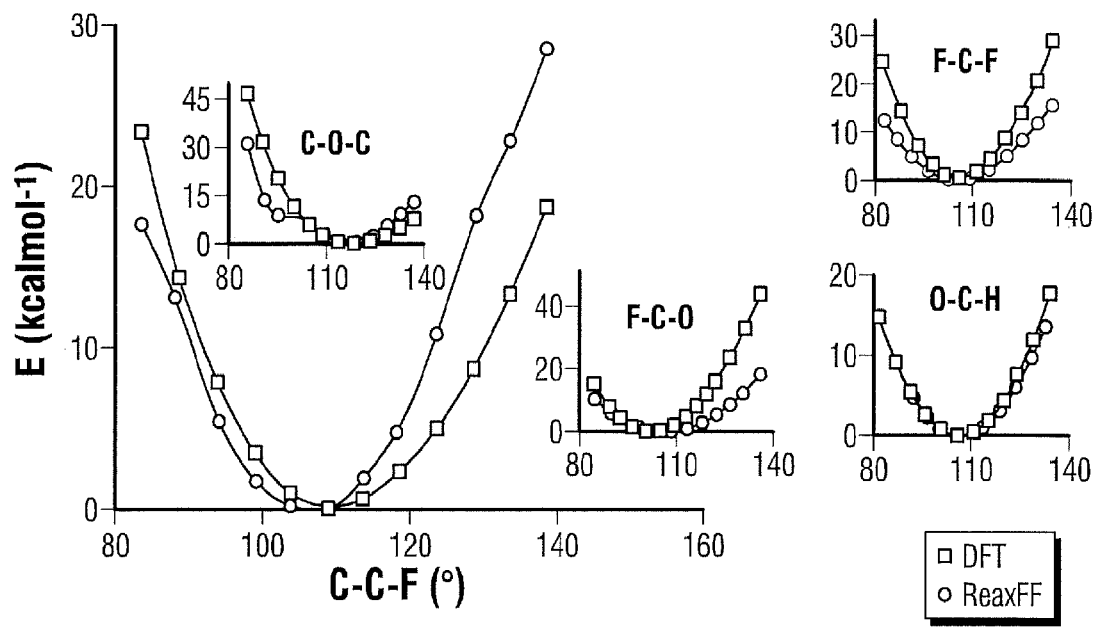
FIG. 13C shows ReaxFF and DFT energies for valence angle opening/closing energies in Zdol. The C—C—F angle data (see related inset) is for the $C_2$—$C_3$—F angle (see numbering in FIG. 3A), the C—O—C angle data (see related inset) is for the $C_3$—$O_4$—angle, the F—C—O angle data (see related inset) is for the F—$C_3$—$O_4$ angle, the F—C—F angle data (see related inset) the F—$C_3$—F angle, and the OC—H angle data (see related inset) is for the $O_1$—$C_2$—H angle.
Figure 13D:
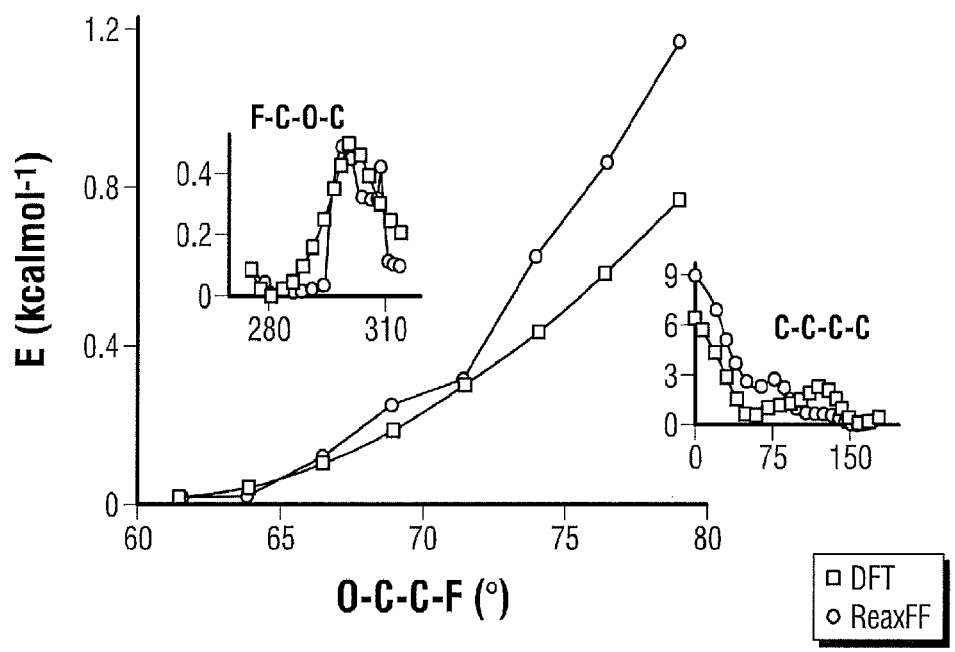
FIG. 13D shows the ReaxFF and DFT energies for dihedral angles in Zdol (O—C—C—F and F—C—O—C) and in $F_3C$—$CF_2$—$CF_2$—$CF_3$ (C—C—C—C). The O—CC—F dihedral data (see related inset) is for the $C_5$—$O_6$—$C_7$—F dihedral angle (see numbering in FIG. 3A) and the F—C—O—C dihedral angle data (see related inset) is for the $FC_5$—$O_4$—$C_3$ dihedral angle.

The test was repeated for PDMS, and with mismatched substrates (aluminum and plastic, with more substrates shown in FIGS. 12A-B). The blend showed a 3408% increase over PDMS in loading mismatched materials and an 1814% increase in loading aluminum samples (highlighted in the inset in FIG. 2L). The strongest adhesion was seen using aluminum substrates and the failure mode can be seen in FIG. 9B.

The ridges on the metal disk are apparent because of the mixture being pulled upwards by the tensile force and are characteristic of cohesive failure (which is supported by the SEM images seen in FIG. 2C). The tensile failure mode is in clear contrast with the shear failure where slip played the largest part.

One of the most important properties of an adhesive or adhesive-like materials is its or their ability to adhere multiple types of substrates under varying environments. The ability to adhere multiple substrates underwater is very important (FIGS. 9C-D). However, to understand this behavior, it is desirable to perform relevant tests such as contact angle and SEM measurements.

Applicants' observations show that once a drop of PTFE/PDMS is put on the surface of a copper sheet it spreads out over time, thus causing the contact angle to change (FIGS. 9E-G). This is a specific advantage of the liquid phase of the mixture. Due to the high mobility of the PDMS chains, the material can freely enter pores and fill them, thus allowing it to fully wet surfaces and enable good adhesion (FIGS. 12G-L).

Moreover, this material exhibits hydrophobic properties (FIG. 9G), which allows it to function underwater while still being able to wet many different types of surfaces. The wettability of the material was probed using SEM to image the interface between the PTFE/PDMS materials and copper/paper. SEM images showed that the PTFE/PDMS material fully coats both copper (FIG. 9H) and paper (FIG. 9I), thus eliminating surface features and fully covering the substrate surface and pores.

This process is schematically explained in FIG. 9J. As gravitational forces press down onto the PTFE/PDMS droplet, capillary forces work together to allow it to fill the pores and spread. Without being bound by theory, it is envisioned that the multifold improvement in the adhesive behavior of PDMS is due to molecular interactions between solid and liquid phases.

Figure 9K:
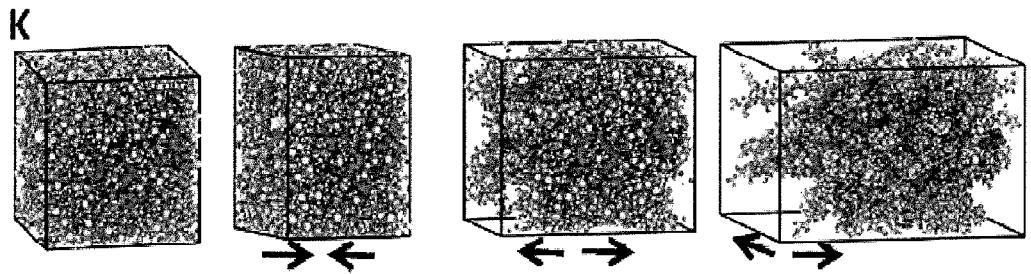
FIG. 9 shows data relating to the mechanical properties of PTFE/PDMS blends. The shear (FIG. 9A) and tensile failure (FIG. 9B) images exhibit expected patterns for slip and pull out cohesive failure, respectively. Approximately 2 kg of weights were adhered using the PTFE/PDMS blend using a hooked weight (25.5 mm in diameter) and an aluminum plate (FIG. 9C). The adhered materials with the accompanying weights were also submerged in water (FIG. 9D). The contact angle of the PTFE/PDMS onto a piece of copper substrate is shown in FIG. 9E. After about 5 seconds, the glue spreads out and wets the whole surface, as seen in FIG. 9F. The hydrophobicity of the material on copper is shown in FIG. 9G by placing a drop of water onto a copper substrate that had PTFE/PDMS on it. To clarify the wetting effect seen in the contact angle, a copper surface was covered with PTFE/PDMS and then imaged using SEM (FIG. 9H). The copper surface was fully coated by the PTFE/PDMS material. Additionally, PTFE/PDMS was placed on paper and examined under SEM (FIG. 9I). By imaging an area that had no PTFE/PDMS (left of the dashed red line) and comparing with an area that has PTFE/PDMS (right of the dashed red line), the mixture fully fills the empty space at the interface, thus leading to stronger adhesion. This mechanism is schematically shown in FIG. 9J. As time passes, the liquid polymer phase can relax and spread across the surface, thus filling all the available cracks and pores and promoting better adhesion and allowing it to work with a myriad of surfaces. Snapshots of simulation box in biaxial, compressive, and tensile loading for PTFE/PDMS can be seen at the bottom (FIG. 9K). Also shown are uniaxial stress-strain curves for compressive loading and tensile unloading in the x-direction (FIG. 9L), y-direction (FIG. 9M), z-direction (FIG. 9N), and xy direction (FIG. 9O).
Figure 9L:
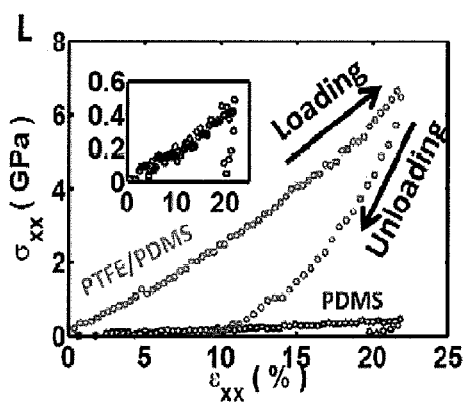
Figure 9M:
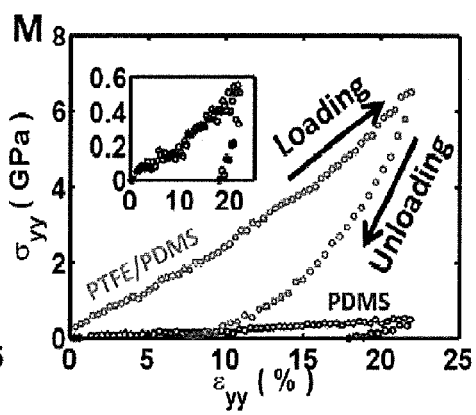
Figure 9N:
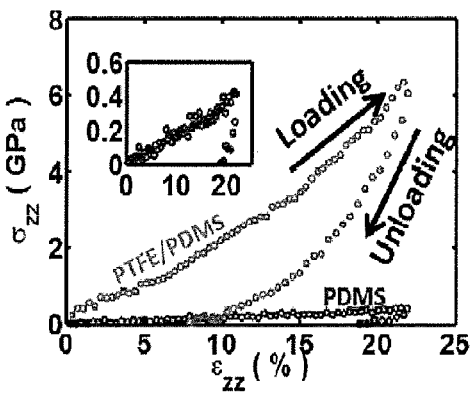
Figure 9O:
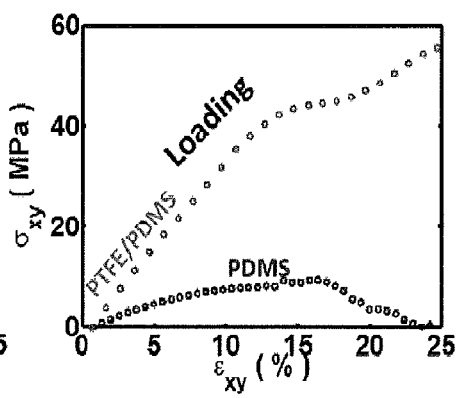
Figure 11A:
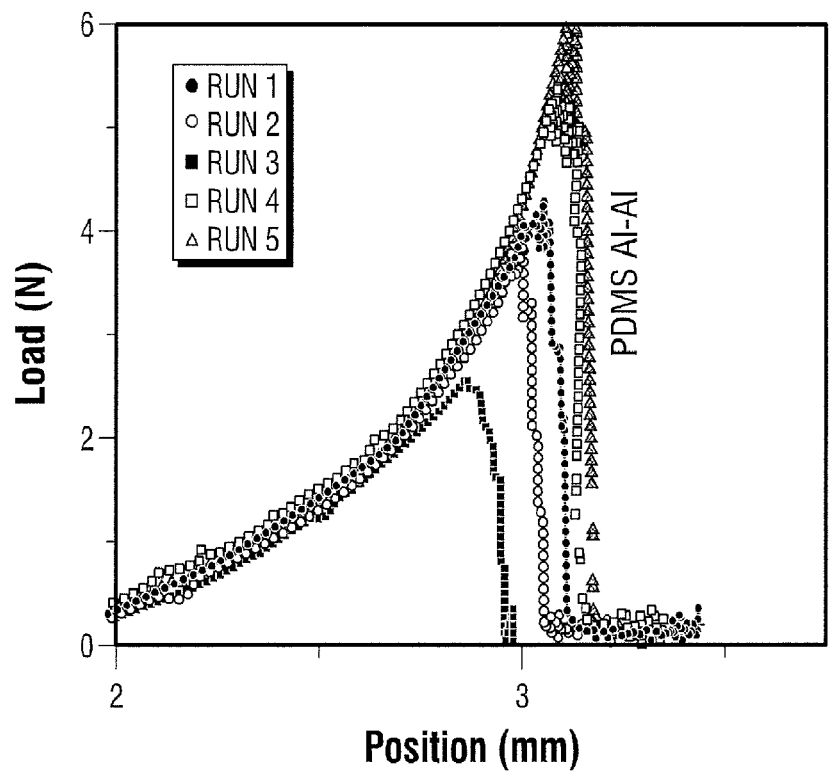
FIG. 11A shows tensile tests of adhesion of PDMS between two aluminum substrates.
Figure 11B:
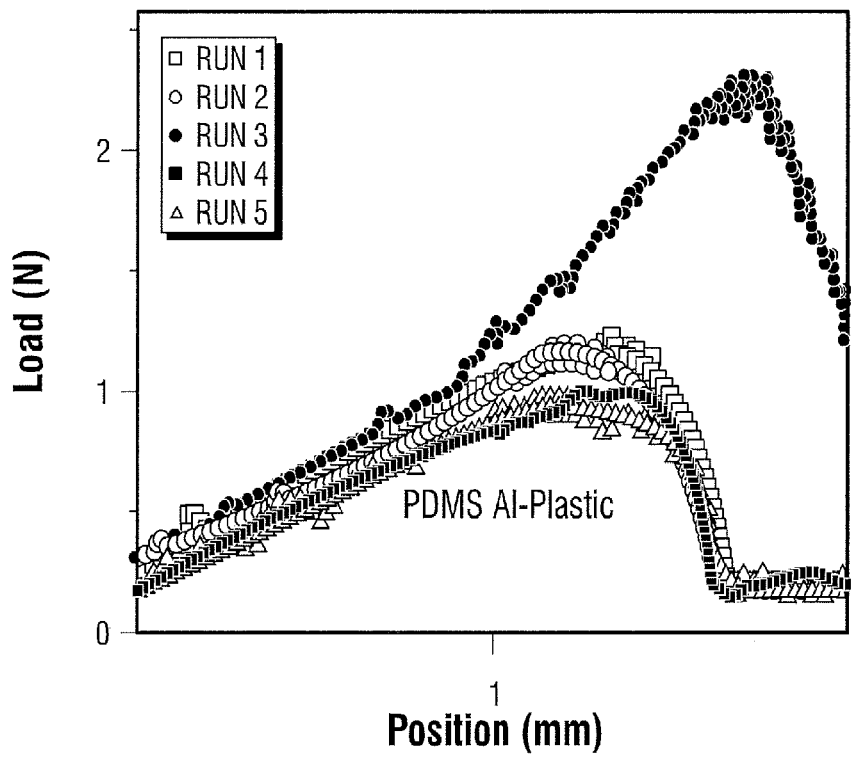
FIG. 11B shows PDMS adhesion between mismatched substrates (Aluminum-Plastic).
Figure 11C:
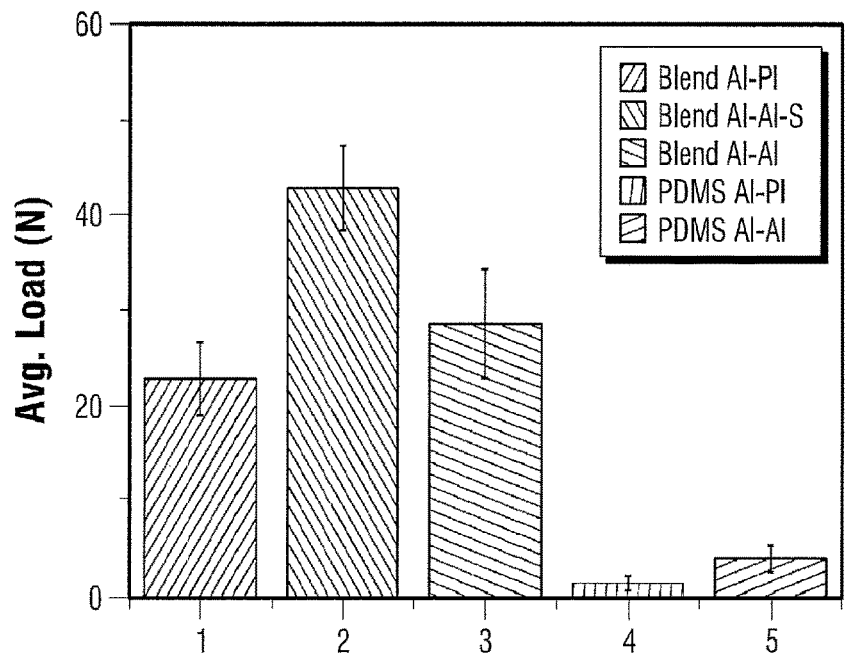
FIG. 11C shows adhesion using PDMS and the effect of smooth surfaces on adhesion (e.g., Aluminum vs. Aluminum-Smoothened vs. Aluminum-Aluminum).
Figure 11D:
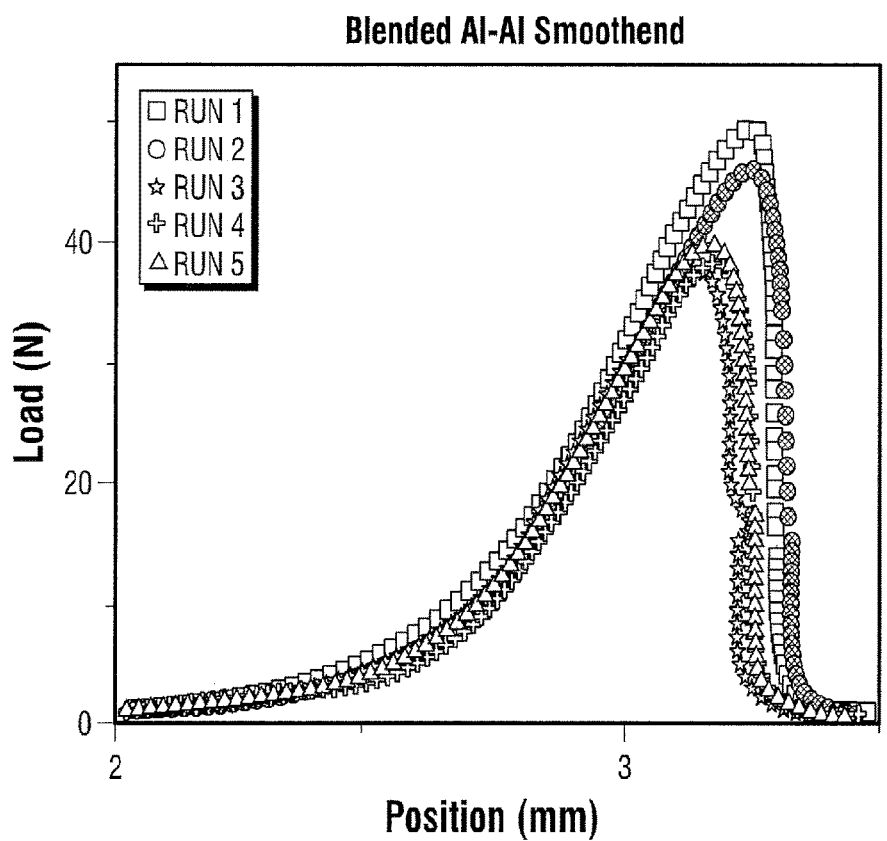
FIG. 11D shows adhesion between metals with the surface of the adhesive being smoothened out in between runs.
Figure 11E:
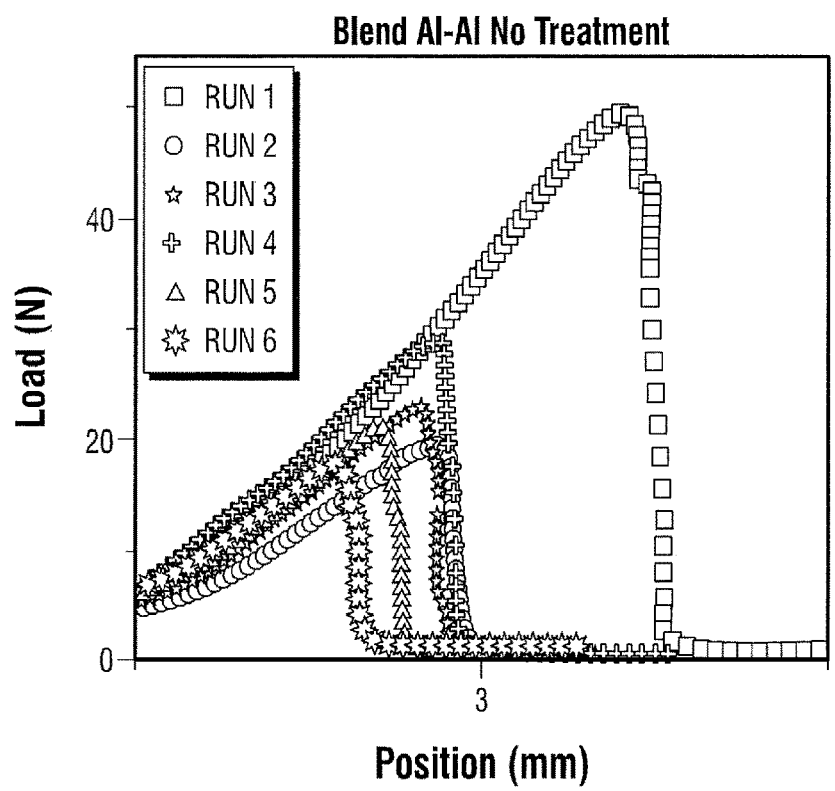
FIG. 11E shows adhesion between mismatched materials.
Figure 11F:
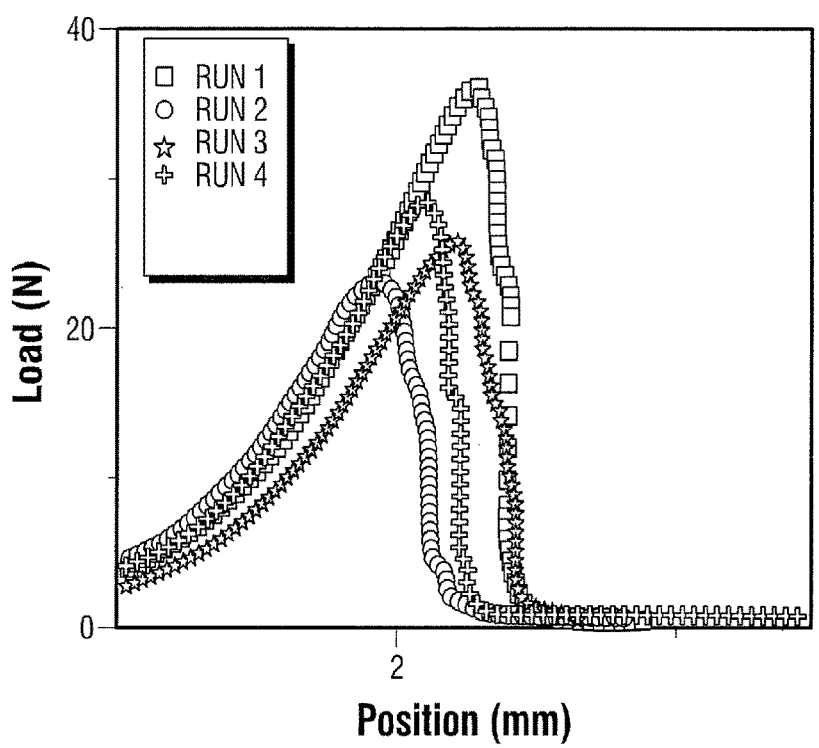
FIG. 11F shows adhesion between aluminum substrates without smoothing.

In order to verify Applicants' hypothesis, Applicants employed molecular dynamics simulations with ReaxFF (force field parameters described in the computational details and FIG. 13). Uniaxial loading and unloading are schematically shown in FIG. 9K for PDMS and PTFE/PDMS.

The corresponding stress-strain relationships, depicted in FIGS. 9L-O and FIG. 14, are quantitatively and qualitatively indicative of the adhesive tendencies of both PDMS and PTFE, which have also been shown experimentally. Besides the fact that a 20% compressed PDMS does not recover under uniaxial tension (see insets in FIGS. 9L-O), as opposed to the combination of PDMS and PTFE that does recover, the blend's maximum stress at 20% compression is roughly 10 times PDMS' maximum stress at 20% compression.

The aforementioned observations demonstrate the optimal adhesion of PTFE/PDMS and corroborate the in-situ mechanical testing attached to SEM (FIGS. 2I-J). Such a conclusion can also be drawn from the molecular perspective in FIGS. 15B-C, where the unloading phase after compression breaks PDMS atomic bonds, thus creating voids in the structure.

In the case of the combination of PDMS and PTFE, the unloading phase displays very strong interfacial bonding between PDMS and PTFE. Without being bound by theory, it is envisioned that the interfacial bonding contributes to the adhesion of the polymers to one another, even after 25% unloading tension.

The optimal adhesion of the combination of PDMS and PTFE is confirmed by the biaxial shear stress-strain results in FIG. 9K. The blend's stress at 17% strain is roughly 5 times the PDMS stress at 17% strain. This implies that PDMS units stick to PTFE units more than PDMS units stick to one another.

The voids in the final PDMS strain structure (FIG. 15C) and the PDMS units sticking to the central PTFE (FIG. 9K) are illustrative of the aforementioned observation. In as much as the simulation processes described above do not involve any premade PTFE/PDMS crosslinks, the simultaneously strong and flexible PTFE/PDMS interfacial bonding is unlikely to come from non-polar covalent electron sharing between PTFE fluorine atoms and PDMS hydrogen atoms but rather from the very polar nature of the fluorine-hydrogen dipole interaction at the interface.

In fact, the very high F—H electronegativity difference (1.9) creates a strong dipole interaction at the interface between PDMS and PTFE. Moreover, since fluorine is one the most electronegative elements and hydrogen is one of the most electropositive elements found in polymers, the chemical attraction between the two elements inevitably leans more towards PTFE fluorine atoms than towards PDMS hydrogen atoms.

Interfacial PTFE fluorine atoms are therefore expected to attract interfacial PDMS hydrogen atoms, thereby forming flexible, but strong PTFE-PDMS interfacial glue responsible for the high adhesive properties of the mixture. The aforementioned expectation is also consistent with Applicants' FTIR results. Although no chemical bond formation is observed, Applicants still observe adhesive behavior.

The direction of the polarization, from PDMS to PTFE, is confirmed in the PTFE/PDMS uniaxial and biaxial tensile stresses in FIG. 9K where, while PTFE interfacial atoms tend to keep their equilibrium positions, PDMS interfacial atoms tend to stick to PTFE interfacial atoms, despite the increasing amount of load in the opposite direction. Through uniaxial and shear mechanical testing, both simulations (FIGS. 9L-O) and experiments (FIGS. 2I-L) quantitatively and qualitatively show an optimal adhesive nature of the mix of PDMS and PTFE over PDMS alone. The very high electronegativity difference is deemed the primary cause of the aforementioned reformable and strong interfacial bonding, as evidenced by the shear mechanical testing (FIG. 9 for simulations and FIGS. 2I-K for experiments), the lack of evidence for covalent bonding in STM data, and the diametrically opposed polar nature of fluorine and hydrogen atoms.

Figure 14:
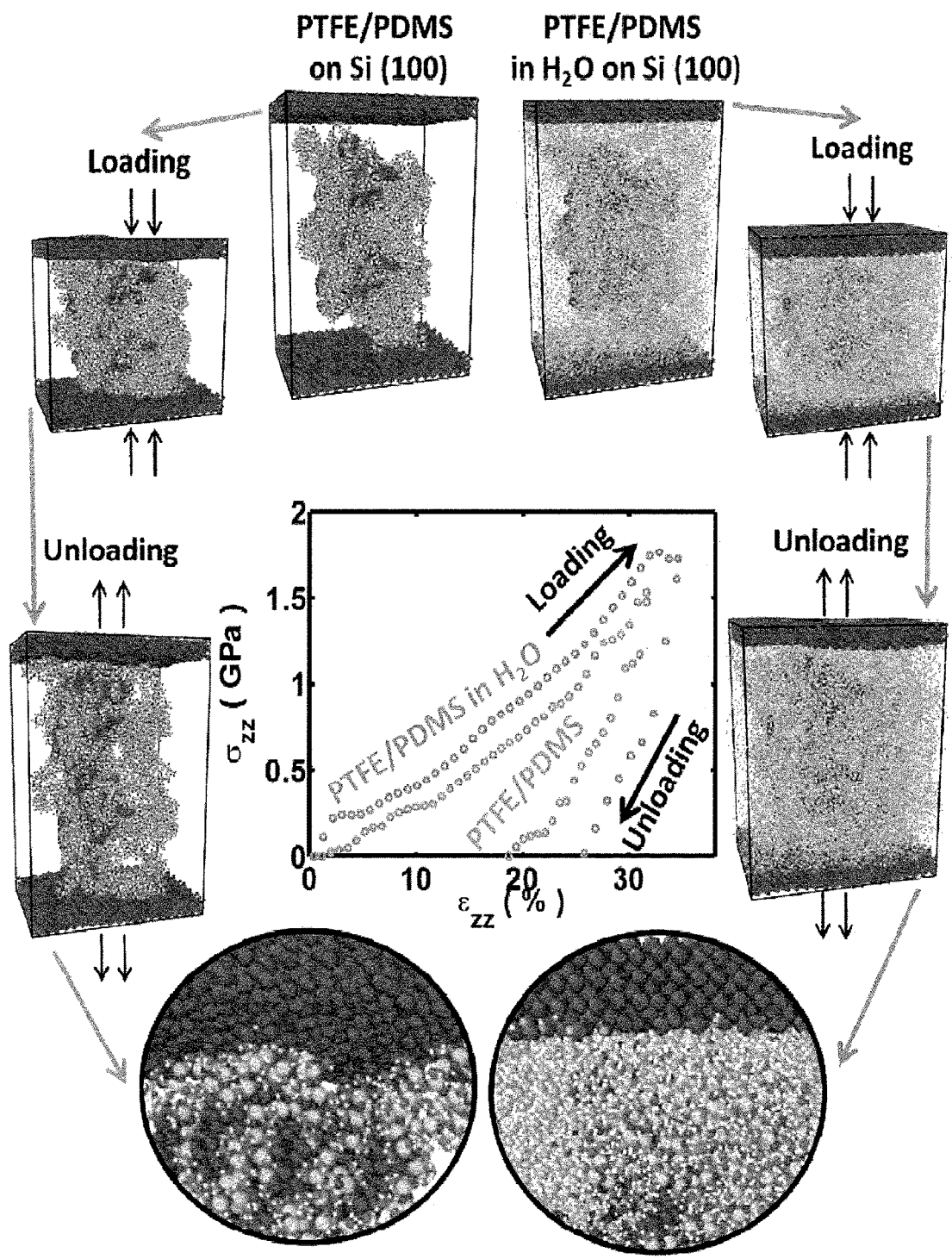
FIG. 14 shows molecular dynamics simulations of a PTFE/PDMS blend on a Si (100) substrate in the presence (right) and absence of water (left). With respect to initial stages, respective unloading stages show the PTFE/PDMS mixture sticking to Si (100). Stress-strain curves ($\alpha zz/\varepsilon zz$) in the z-direction (center) confirm the gluing capability of the mixture to Si (100) in the presence and absence of water. The interfaces between Si (100) substrate and the PTFE/PDMS blend in the presence (bottom right) and absence (bottom left) of water are zoomed in to further elucidate the adhesive properties of the mixture.

To highlight the fact that the gluing mechanism proposed above does not just work within the components of the mixture, but also between the mixture and an external material in presence and absence of water, a comparable stress-strain relationship was computed on two structures obtained by sandwiching a chunk of the PTFE/PDMS mixture between two Si (100) substrates in the absence and presence of water (FIG. 14). In fact, from initial stages where the PTFE/PDMS mixtures are respectively lying on the surface Si (100) and ~5 Å away from it, the loading stages are undertaken to ensure enough adhesion between the substrates and the PTFE/PDMS mixture (FIG. 14). The subsequent unloading stages both in presence (right side of FIG. 14) and in absence of water (left side of FIG. 14) show that the adherence between the Si(100) substrates and the PTFE/PDMS mixture remains throughout the unloading process, thereby testifying to the gluing capability of the PTFE/PDMS mixture to the external material herewith examined.

The Si(100) and PTFE/PDMS adhesive interfaces at the end of the unloading stage, zoomed in at the bottom of FIG. 14, are indicative of the lingering interfacial bonding (between PDMS and PTFE chains) described above both in the presence and absence of water. Moreover, the stress-strain curve (central part of FIG. 14) quantifying the unloading and loading stages in the direction of the substrates (z-direction) does not show an appreciable difference between the PTFE/PDMS mixture alone and the mixture immersed in water.

In sum, this Example reports the synthesis and main physical properties of a PTFE/PDMS reusable adhesive. The reversibility of the adhesion mechanism resides in the exploitation of physical and geometrical adhesion, an unexplored approach different from purely chemical adhesion.

The proposed adhesive defines a unique category of reversible, instant adhesives that work in both humid and dry environments, a combination of properties that Applicants have not observed before. The adhesive, a mixture of one of the most flexible macromolecular chains (PDMS) with a rather rigid macromolecular chain (PTFE) has a strength that most likely arises from the dipole dipole induced interactions present due to the presence of electronegative fluorine atoms (PTFE).

Thus, the current adhesion mechanism is characterized by strong dipole-dipole induced interaction between the two polymeric components of the adhesive. The PTFE/PDMS mixture consisting of two biocompatible polymer constituents can be a useful adhesive for instant adhesion of injured parts (consisting of liquid) or devices (need multiple uses).

The use of liquid polymers allows the polymer chains to easily re-arrange and create the strongest adhesive configuration while aiding in the contact between substrates. This methodology promotes adhesion through molecular-level dipole interactions, which are repeated throughout the polymer chains. The methodology requires that one component have a highly electronegative element and the other to have a weaker electronegative element.

Simulations show that pure PDMS cannot withstand uniaxial forces, whereas PTFE creates strong interfacial dipole interactions that solidify the mixture. Based on theoretical and experimental pieces of evidence, these adhesives should be categorized as interfacial adhesives (i.e., adhesives that rely on interfacial interactions to stick).

Example 1.1. Materials and Methods

An equal weight of hydroxyl terminated PDMS (Sigma Aldrich 18,000-22,000 cSt) and PTFE (DuPont Zonyl 1000 MP submicron particles) were measured out using a digital scale and then mixed with a metal spatula (by hand) until a homogenous mixture was obtained.

PTFEZonyl MP 1000 is a powder comprising of average 100 nm sized particles. 90% of particles are found to be 100 nm. Additionally, they have a specific surface area of 5-10 m²/g.

Example 1.2. Qualitative Mechanical Tests

Qualitative tests were performed using standardized weights. The substrates were all cut to the same size, except for the Si wafer. The adhered area was 25 mm by 25 mm for all samples apart from Si (which was 12.94 mm by 10.84 mm).

All calculations for stress were done using $\sigma=F/A$. The materials all had a glue thickness of 0.1 mm. All size measurements were done with digital calipers. The materials were not polished but were cleaned in between each test that did not test re-usability.

Each material was cleaned using an IPA wipe and the glue was applied using a metal spatula. The materials were tested by taping weights to the bottom of the substrates after adhesion and holding at 90° for several minutes. The submersed tests were done by sticking already glued materials underwater.

The tests were separately verified by taking two pieces of copper with glue on them and pressing them together underwater, which also led to adhesion. The raw weights that each sample could hold were 350 g, 150 g, 150 g, 100 g, and 30 g for paper, Cu foil, glass, plastic, and Si wafer, respectively.

Example 1.3. Dynamic Mechanical Analysis Testing

DMA testing was performed at 0.1 N/min and 0.001 N/min for pure PDMS, 25% PTFE/PDMS and 50% PTFE/PDMS. The testing was performed in force-controlled mode in tensile using samples made of copper foil (overall size ~18 mm×6 mm, length×width). The testing was performed at standard room temperature and pressure.

Example 1.4. Quantitative Mechanical Tensile Test

The tensile testing was performed using an ADMET eXpert 7600 setup with a steel wire to pull at 90°. The steel wire was attached to a hook that was directly welded into the upper metal substrate used in the adhesion. The pulling was performed at a rate of 5 mm/min.

Applicants tested both adhesion between two metal substrates and adhesion between a plastic and aluminum substrate. For the adhesion between mismatched substrates, Applicants replaced the bottom aluminum piece with a piece of plastic and repeated the same procedure. The procedure was repeated several times without re-application of the adhesives and without touching the adhesive surface. The procedure was also repeated after smoothing out the adhesive surface in between runs, but after failure.

Example 1.5. In Situ SEM Testing

In situ testing was performed at Hysitron, Inc. A PI85 indenter was attached inside a 3D VERSA. A field emission gun was used.

Example 1.6. FTIR and TGA Thermal Characterization

FTIR was performed at the Army Research Laboratory (Thermo Nicolet Nexus 670) using an averaging of 16 scans per spectrum with a resolution of 4 cm⁻¹. The material was spread between salt crystal wafers and scanned with varying PTFE:PDMS ratios. TGA was performed using a TGA 500. The procedure was performed in air up to 800° C. at a rate of 10° C./min.

Example 1.7. X-Ray CT Measurements

When trying to produce high quality CT scans, the sample was mixed and applied onto a 25 mm by 25 mm glass slide. Next, an identical slide was pressed against the sample and then pulled apart, taking care to not add any sliding or rotation to this process. The glass slide was then mounted into the Zeiss Xradia 510 Versa so that at 0° the source and detector would be at a normal to the plane of the glass slide.

To enhance phase contrast for edge detection, the source and detector were brought in as close to the sample as possible, without collision during its rotation from 0-360°. The recipe was set to 80 kV, 7W, 4× objective, no filter, and 0.5 second exposure with 8601 projections and multiple references. All CT measurements and analyses were done at the Adelphi Laboratory Center (ALC).

Example 1.8. Peel Test

The T-peel test was performed on an Instron 5500R test frame with a 50 lb load cell at the Army Research Lab in Aberdeen Proving Ground (ARL-APG). The testing used tensile grips. The adhesion substrates were cut into 1 inch by 4 inch sizes from a new sheet of Dura-Lar Grafix polyester. The samples were manually cleaned using wipes to remove any particulates from the surface.

The substrate thickness was measured using calipers and found to be 0.004 inches. Applicants had to change the ratios for the SiO₂ samples since the saturation limit for them was much lower compared to PTFE. The material was smeared onto a 3 inch by 1 inch adhesion area (leaving 1 inch as the gripping region). Afterwards, a second sample was placed on top and Applicants rolled a steel cylinder over the top of the sample to apply uniform pressure to the substrates and adhere them.

There were 5 T-peel test samples made for each composition and control. The adhesive thickness (Adhesive thickness=Sample thickness−2(polyester sheet thickness)) was measured for each sample and noted. The samples were then mounted into the grips by placing the unadhered area into the grip jaws and tightly gripping them. The samples were then separated at a rate of 254 mm/min (1 in/min). The extension and force were measured directly through the built-in software. The sample then underwent the same testing method as the other adhesive samples. The average adhesive thickness was ~0.003 in/0.0762 mm. All samples exhibited cohesive failure after being peeled apart.

Example 1.9. Computational Details

All mechanical properties were computed using classical molecular dynamics (MD) with its numerical implementation in the large-scale atomic/molecular massively parallel simulator (28) (LAMMPS), using: 1) the parameterizations of the Reactive Force Field (ReaxFF) described herein, 2) a timestep of 0.25 femtoseconds, and the 3) Nose-Hoover thermostat at room temperature.

The ReaxFF C/O/H/Si/F force field parameters used in this Example are a combination of the carbon-parameters which were extended to C/H/O interactions by training against the DFT-data described previously. The Si/C interaction parameters were trained against the DFT-training set described in a prior PDMS/ReaxFF work. The new C—F bond and affiliated angle and dihedral terms were trained against DFT-data derived from a Zdol-monomer (FIG. 3A) and from $(H_3C)_{2n}CF_2$, $C_4F_{10}$ and $F_2$ molecules.

All DFT calculations were performed at the $B_3LYP/6-311G^{**}$ level. FIGS. 3B-D compare the ReaxFF and DFT results for the bond, angle and dihedral scans for the training set molecules. Overall, the ReaxFF performance is a good match to the DFT-data. The ReaxFF bond energies are typically a little lower than the DFT-numbers—but as such provide a better match to experimental bond energies.

For the C—O—C angle in Zdol, ReaxFF obtains a shallow secondary minimum at around 90 degrees—this is probably due to the formation of a weak C—C bond across the C—O—C angle, which could potentially be repaired by increasing the C—C—O angle parameter force constants.

However, the aforementioned secondary minimum is quite shallow (about 1 kcal/mol) and as such is not expected to significantly affect C—O—C angle behavior during MD-simulations. In FIG. 3D, Applicants only show the dihedral angle cases with meaningful rotational barriers.

Applicants also performed DFT analyses for the C—O—C—O and C—C—O—C dihedrals in Zdol and found very small rotational barriers (<0.5 kcal/mol), which were reproduced by ReaxFF. Single units of hydroxyl-terminated PDMS, OH—[Si(CH$_3$)$_2$O]n-H, and PTFE, $(C_2F_4)_m$, with n=410 and m=512, were prepared using the molecule editor Avogadro, equilibrated in a canonical ensemble (NVT), in a 150 Å×150 Å×150 Å simulation box with fixed boundary conditions, for 40 picoseconds. The equilibrated PDMS and PTFE units (FIGS. 15A-B) were inserted into two 100 Å×100 Å×100 Å simulation boxes with periodic boundary conditions.

The PDMS+PTFE box contained three PDMS units and one PTFE unit while the PDMS box contained three PDMS units. Both boxes were squeezed by roughly 20% in a microcanonical ensemble (NVE) for 5 picoseconds and equilibrated first in a canonical ensemble (NVT) for 5 picoseconds to ensure an even distribution of particles in the box and then in an isothermalisobaric ensemble (NPT) for 5 picoseconds to relax the simulation box.

This series of equilibration processes resulted in a 51 Å×51 Å×51 Å PTFE/PDMS simulation box with a mass density of ~1.8 g/cc and a 20 Å×20 Å×20 Å PDMS simulation box with a mass density of ~0.97 g/cc (see FIG. 15A). Further, a 1×1×2 PTFE/PDMS supercell was then sandwiched between two identical 76 Å×108 Å×11 Å bulk Si(100) substrates into two configurations: A configuration (Si/Blend/Si) with the PTFE/PDMS supercell lying on the surface of the substrate and a configuration (Si/Blend+H$_2$O/Si) with the PTFE/PDMS supercell ~5 Å away from the surface of the substrate (FIG. 14). Water molecules were added into the second configuration in the space between the substrates and the PTFE/PDMS supercell as well as all around the PTFE/PDMS supercell until they reached the density of ~1 g/cc. They were then equilibrated in a canonical ensemble (NVT) for 30 picoseconds (with periodic boundary conditions) to ensure proper chemical interactions with the substrate and the mixture.

The computation of the stress-strain relationships on the above PTFE/PDMS, PDMS, Si/Blend/Si, and Si/Blend+H$_2$O/Si models proceeded by: 1) further equilibrating the respective structures in an isothermal-isobaric ensemble (NPT) while compressing them by 22%, 22%, 30%, and 33% respectively for 5 picoseconds; and 2) stretching them back by 25%, 25%, 33%, and 35% respectively for 5 picoseconds. As the box compression/tension or loading/unloading occurred uni-axially (in the x, y, and z direction) and bi-axially (in both x and y directions), the respective stresses and strains at every step were computed.

Example 1.10. Supplementary Materials

The test shown in FIG. 7 was done using an ADMET tensile tester at a rate of 5 mm/min. These tests show that PDMS alone does not have significant adhesion. However, adding PTFE changes the adhesion properties significantly.

The test shown in FIGS. 7D and 7F was done consecutively and without changing the blend. First, the adhesive was placed on both sides of the aluminum substrates. The substrates were then pulled until failure. The first run (shown in black) showed a strength of almost 50N. However, on the second run after just re-adhering the materials without smoothening the adhesive surface, the strength fell. The strength stayed at this lowered level for 6 runs.

By smoothening out the adhesive surface after each failure, it is possible to preserve the strength of the first run indefinitely. This shows that the material keeps its adhesive properties over several runs and that when smoothened it can maintain its maximum adhesion. This can be attributed to the increased interaction area created by smoothening out the adhesive.

X-Ray CT (FIGS. 10 and 12C-L) data shows that the material does not leave a gap at the interface between the gel and the substrate (FIGS. 12C-L). This is also emphasized by the SEM images in FIGS. 9H-I. Additional X-ray CT data shows the PTFE particles flowing along strain lines and agglomerating near peaks (FIG. 10).

The tests shown in FIGS. 12A-B were done using standardized weights and the results are highlighted in the bar graphs. The graphs tend to look similar due to the low divisions in standardized weights that were available. The materials qualitatively held the same weights in air as in water. Adhesion was done under the same conditions and the area was accounted for in each instance.

To calculate the stress values, Applicants used F/A and ignored the role of buoyancy in submerged situations. Due to the hydrophobic nature of the material, the material tends to push out all water in the way and can adhere while fully submerged.

To ascertain the material's strength on different unpolished and uncleaned substrates, with different loading types, and in different environments, Applicants performed qualitative tests using standard weights. These tests showed that the PTFE/PDMS blend exhibits high strength in tensile loading. The material exhibited adhesion with a variety of substrates, including: plastic, metal (Cu foil), paper, Si wafers, and glass.

Applicants also tested shear loads (similar to zero adhesion) (in air and under water) as seen in FIG. 12B (the different materials and their adhesion areas can be seen in the inset in FIG. 12B). The adhesive strength was the same in air and under water for all materials. Furthermore, in the case of glass and aluminum, the glass broke while the bond remained intact (inset in FIG. 9A).

The new material, a blend of PTFE and PDMS, can be seen easily holding 2 kg mass in tensile mode on a 25.5 mm diameter adhered area both in air and under water (FIGS. 9C-D). Moreover, the thickness of the applied adhesive is on the order of 0.01 mm, which makes holding this amount of weight more remarkable. The ability of the material to hold weight underwater is not surprising since both polymers are hydrophobic. As water comes into contact, it is repelled by hydrophobic forces and if water is in the way of the adhesive bond, it will be pushed out as the substrates are adhered.

Moreover, the PTFE/PDMS blend was able to glue flat silicon wafers, which imply that the material adheres regardless of surface roughness. Based on the testing in FIG. 8, Applicants can distinguish the role of geometry/mechanical and chemical interactions of the constituents (PTFE and $SiO_2$) in the ensuing adhesive behavior.

Although the $SiO_2$ has a similar size (~40 nm in size) and volume fraction compared to the PTFE/PDMS mix, the presence of PTFE enhances the adhesive properties of PDMS much more than $SiO_2$. The results indicate that the chemical interaction between the two phases (PDMS and PTFE) has a significant role to play in increasing adhesion.

As such, it is envisioned that the combination of mechanical and chemical interactions results in the adhesive behavior observed in this Example. However, the latter interactions may have a more significant role to play.

All samples tended to exhibit cohesive failure. The T-peel test plot in FIG. 10 shows little to no peel resistance for PDMS after initial loading, whereas the PTFE/PDMS sample shows increased resistance to separation on polyester.

Example 2. Nature Inspired Solid-Liquid Phase Amphibious Adhesives

In this Example, Applicants report a new class of bio-inspired solid-liquid adhesives, obtained by facile mechanical dispersion of PVDF solid spheres into PDMS liquids. The adhesive behavior arises from strong solid-liquid interactions. This is a chemical reaction free adhesive (no curing time) that can be repeatedly used and capable of instantaneously joining a large number of diverse materials (metals, ceramics, and polymers) in air and under water.

The adhesive behavior in this Example is demonstrated using different materials (polymers, metals, glasses and biomaterials) in air as well under water, making it one of the very few amphibious adhesives reported to date. The DFT and MD simulations have been used to explain the underlying mechanism of the adhesive behavior of this composite adhesive.

Figure 16A:
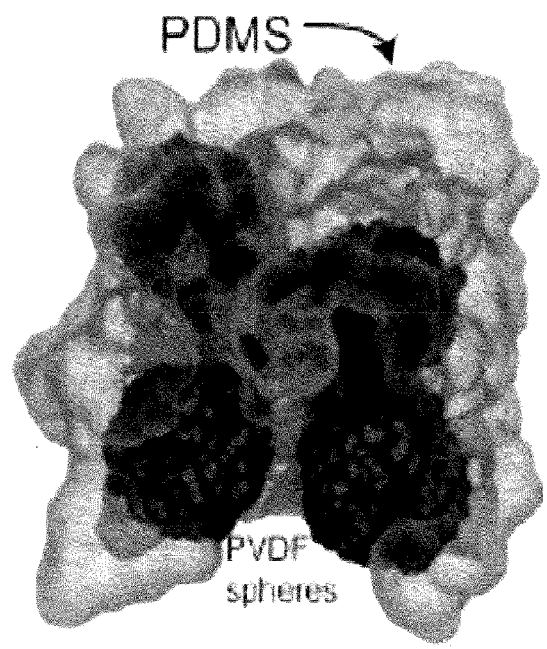
FIG. 16A shows a molecular model composed of PVDF rigid spheres (in red) embedded into the liquid PDMS phase (in yellow).
Figure 16B:
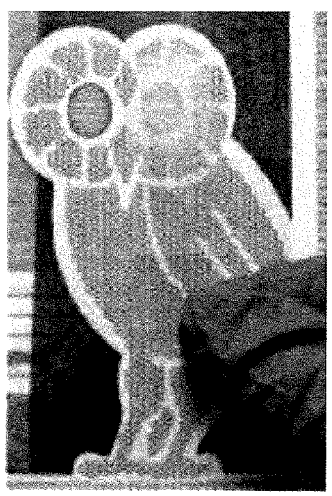
FIG. 16B shows a digital image of a glass sheet coated with the adhesive showing the translucent material.
Figure 16C:
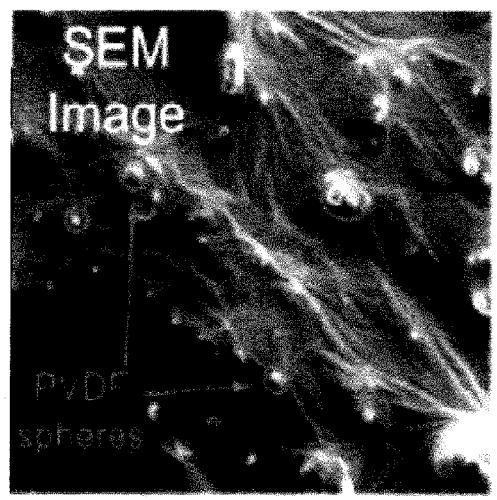
FIG. 16C shows an SEM image showing the PVDF spheres immersed into the PDMS medium. Also shown are a side view (FIG. 16D) and a top view (FIG. 16E) of the processed adhesive.
Figure 16D:
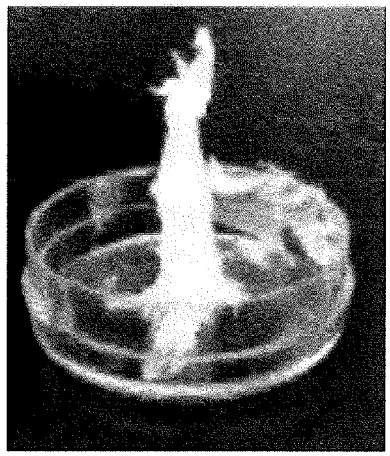
FIG. 16 shows the structural characterization of an adhesive material resulting from combining (mechanical dispersion) polyvinylidene fluoride (PVDF) and PDMS.
FIG. 16F shows an optical image of the adhesive depicting the uniform dispersion of solid PVDF (black) into liquid PDMS (white).
Figure 16E:
Figure 16F:
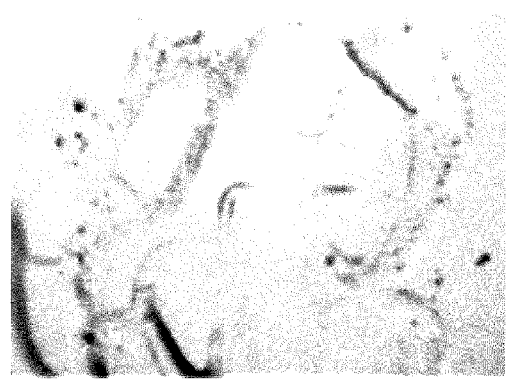

At the macroscopic level, isolated PDMS is a transparent liquid, whereas PVDF is a white powder. The solid-liquid composite results from the mechanical dispersion of the PVDF into PDMS, as shown in FIG. 16A. By combining these two polymers, the resulting material is no longer solid or liquid but has a gel-like consistency and a translucent color (shown in FIG. 16B, where the coating of adhesive is on glass covering the right owl eye). FIGS. 16D-E illustrate the gel consistency.

The structural characterization at the microscopic level and subsequent proof of the PVDF dispersion into PDMS was obtained by optical microscopy and SEM (FIGS. 16C-F). The images show well dispersed blister-like appearance of solid PVDF spheres (~200 nm diameter) embedded into liquid PDMS. The material also shows structural and chemical stability over long periods of time (no segregation or degradation were observed in samples aged up to several months).

Diversified spectroscopy analyses (Raman, Fourier Transform Infrared (FT-IR) and X-Ray Diffraction (XRD)) reveal that the signatures belonging to isolated PVDF and PDMS are preserved after combination. Thermogravimetric Analysis (TGA) of the adhesive shows degradation occurred at (461±1) ° C. and a small broad peak can be observed at (439±1) ° C. The onset of degradation was shifted in relation to neat PVDF, which can be attributed to the interactions between the two polymers.

Figure 17A:
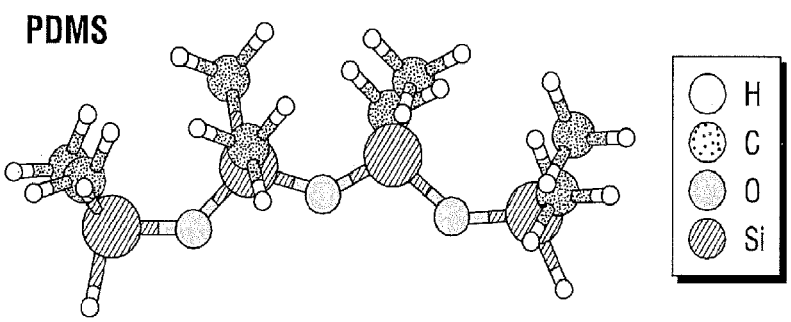
FIG. 17 depicts dipole interactions between PVDF and PDMS polymers. Shown are PDMS (FIG. 17A) and PVDF (FIG. 17B) chains considered in the DFT calculations. Taking the chain length as reference (x-direction), the upper region is formed mostly by hydrogen, while the bottom one is formed by oxygen (fluorine) for PDMS (PVDF).
FIGS. 17C-E show the electronic density for the three most stable configurations.
FIG. 17F show interaction energy (in eV) for all the considered configurations. To allow a direct comparison between the electronic densities, all of the data were plotted with the same isosurface value.
Figure 17B:
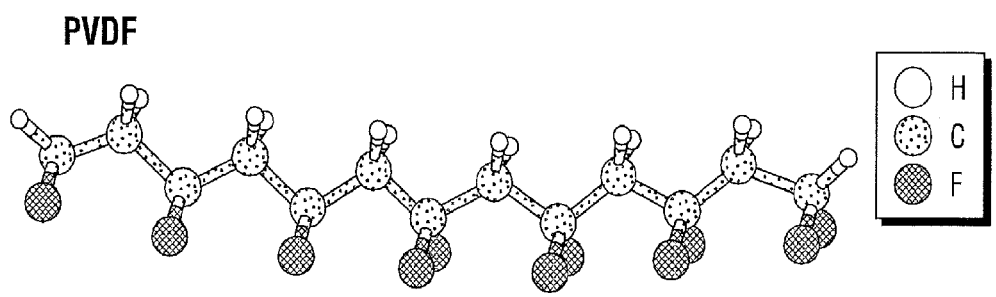

The aforementioned results indicate that no chemical reaction between the polymers occurred during the process (two phase system remains and no new phases form). In order to gain insight about the PDMS/PVDF interface, Applicants carried out Density Functional Theory (DFT) calculations. DFT was used to analyze how the relative orientation between PDMS and PVDF chains affect the adhesive stability. The DFT study was carried out considering PDMS and PVDF short chains (FIGS. 17A-B).

Figure 17C:
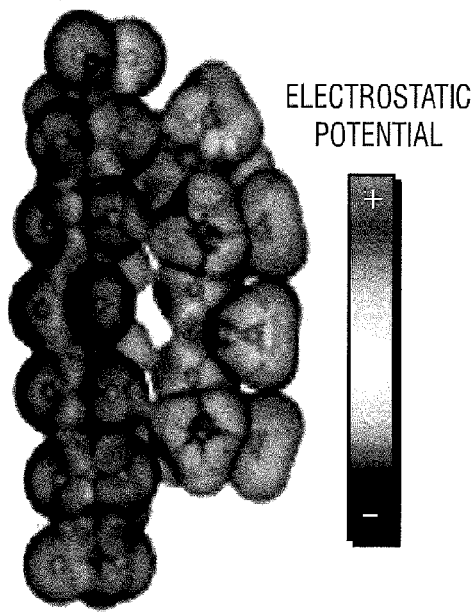
Figure 17D:
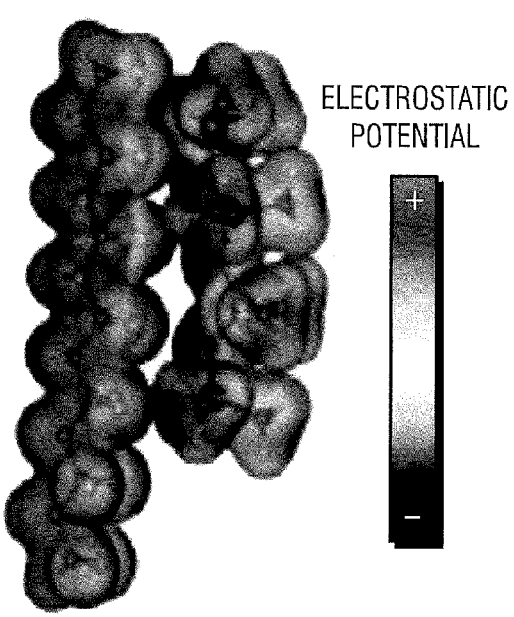
Figure 17E:
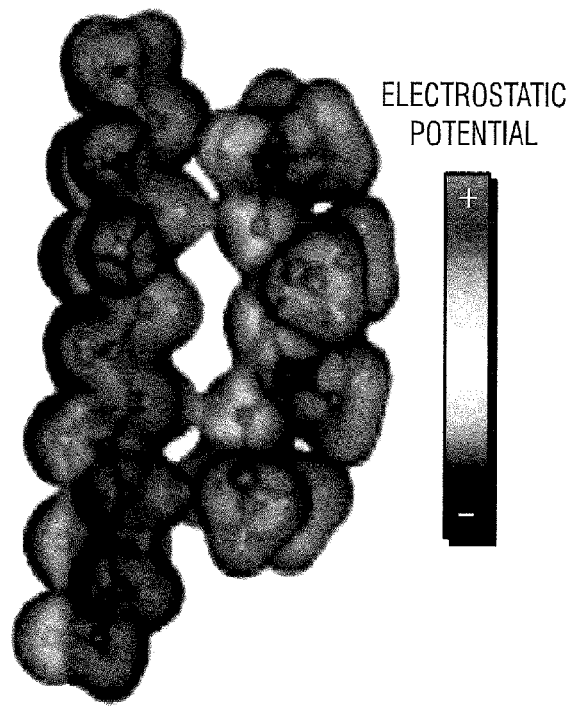
Figure 17F:
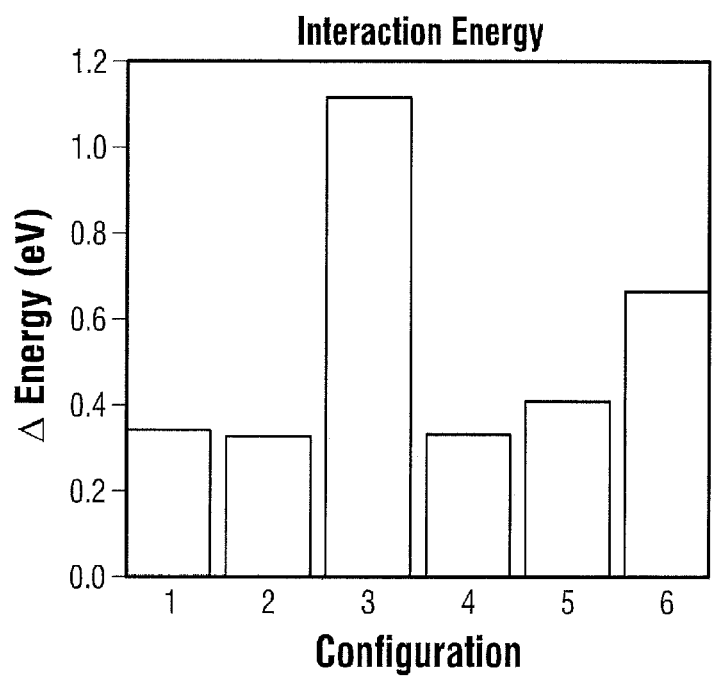

The interaction energy is calculated for different configurations. The interaction energy is defined as the difference between the total energy of the interacting chains and the total energy for the isolated ones (i.e., $E_{TOT}=E_{PVDF+PDMS}-(E_{PDMS}+E_{PVDF})$). In FIGS. 17C-E, Applicants show the three most stable configurations, in terms of interaction energies (FIG. 17F). These large differences can be explained by the electronic cloud chain anisotropy. The results show that the interaction energy is strongly dependent on the relative orientation between the chains, which resembles the lock and key effect present in similar molecular systems.

The electronic density for configuration 3 (FIG. 17C) shows a substantial overlap between the chains, when compared with other considered configurations (e.g. configurations 5 and 6, FIGS. 17D-F). Electronic density overlap is evidence of strong interactions (e.g. hydrogen bonding) between PDMS and PVDF, especially in configuration 3. For the other configurations, the overlap is less pronounced and indicates a weaker interaction, such as adsorption.

Energetic comparison for all the considered configurations showed a preferential orientation and the strength of the interaction (~1.0 eV) comparable to the ones encountered in ion HF system. These results have important implications to explain the adhesive properties, as discussed herein.

Figure 18A:
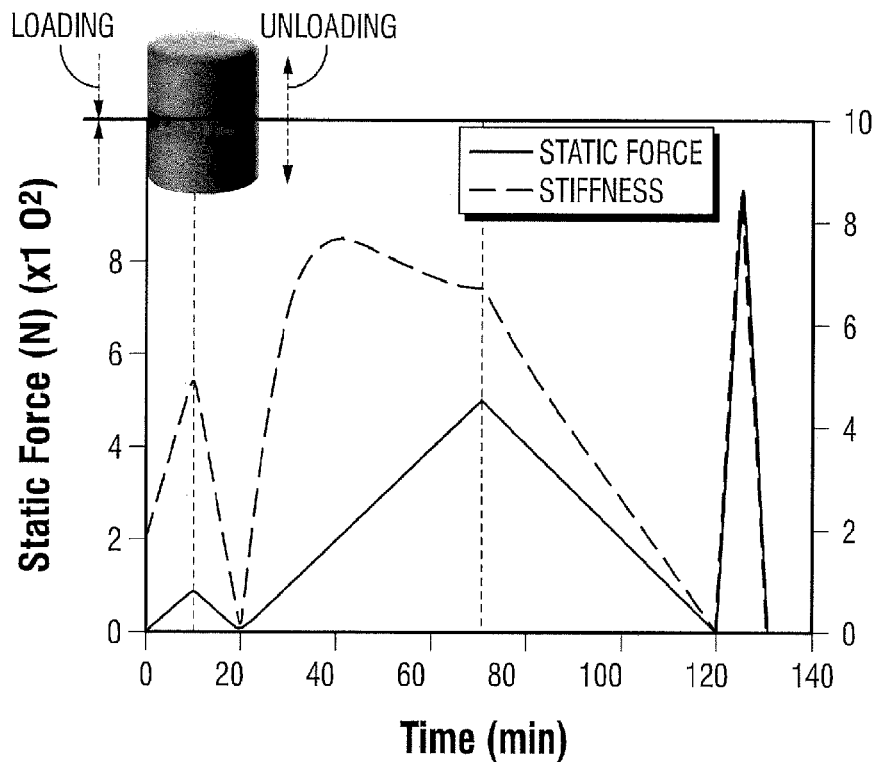
FIG. 18A shows cyclic test of compression (loading) and tensile (unloading). The loading/unloading stages are indicated by dotted red lines. The black solid and dotted blue curves indicate the load and stiffness variation in time, respectively. Inset shows schematic of the loading setup.

In order to characterize the adhesive properties, cyclic compressive measurements (loading-unloading) with 0.01, 0.05 and 0.10 N were performed (FIG. 18A). During adhesive loading (compression), the stiffness increases. During unloading (release), the stiffness does not drop, which is a signature of adhesion. Similar behavior is also reflected in strain.

Figure 18B:
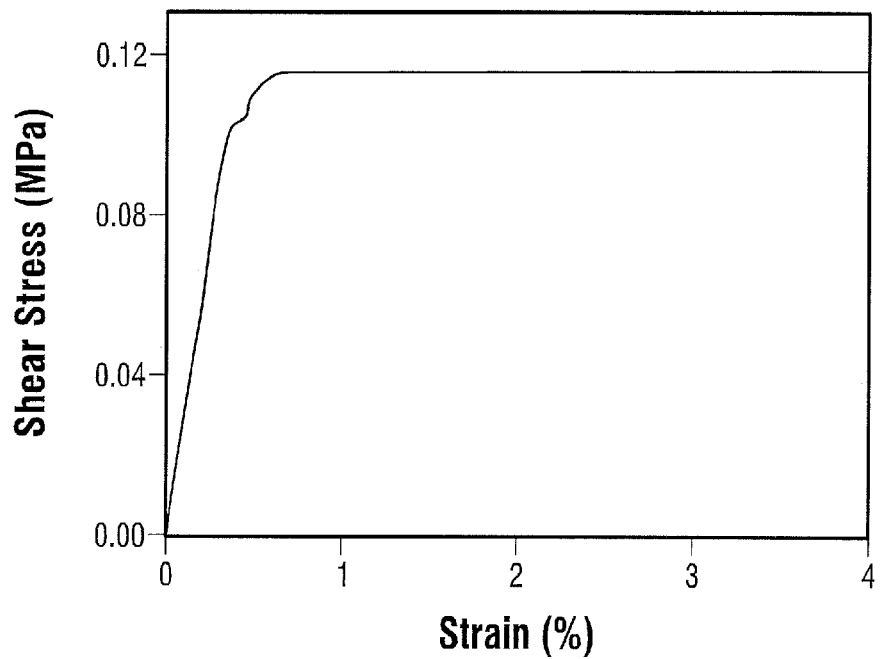
FIG. 18B shows an adhesive shear test (180-degree peel test) of two copper samples put into contact using the adhesive. The inset shows a schematic of the loading conditions.

The adhesion behavior can be repeated for more than 20 cycles and Applicants do not observe any change in stiffness. In order to quantify the strength of the adhesive, a 180 degree peeling test (as schematically shown in the inset of FIG. 18B) was performed using two copper sheets. The shear stress versus strain plot (FIG. 18B) shows linear stress region until 2% strain and reaches a maximum value (ultimate strength) around 1.1 MPa (FIG. 18B-point A). Increasing the strain further from 2 to 10%, Applicants observed that the stress decreases (region between points A and S, FIG. 18B), characteristic of general adhesive behavior under shear loading.

Figure 18C:
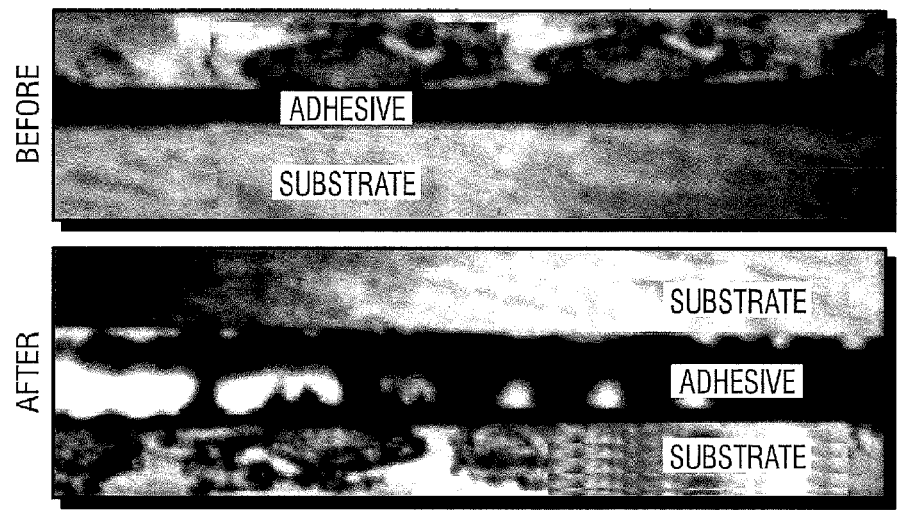
FIG. 18C is an optical image showing two glass sheets sticking together by the adhesive (before) and the formation of strings during separation (after).

In order to understand the morphology changes during adhesion, two glass sheets were joined together (containing adhesive in between-before stage in FIG. 18C). The glass sheets are then separated and the process is monitored using an optical microscope.

As the sheets are pulled, the adhesive exhibits severe plastic extensions and formation of strings (FIG. 18C-after). This behavior is observed in most adhesives. The SEM image of the separated sheets (FIG. 18D) also confirms the presence of strings. A higher magnification image (FIG.

18E) shows the presence of strain lines running across the surfaces of the strings. These strain lines indicate adhesive stress accommodation, which is a consequence of PVDF spheres acting as anchor points in PDMS.

The same behavior cannot be seen in isolated PDMS. Further evidence of anchoring effect was obtained through Atomic Force Microscopy (AFM). AFM height profile (FIG. 18F) revealed a peak of 200 nm (corresponds to PVDF size) followed by steps around it. The steps correspond to strain lines due to anchoring of PVDF.

DFT results showed that there are significant interaction energy differences, which could be in the origin of the anchoring effect. To address this issue with DFT methods is computer prohibitive (size system and simulation time). One possibility is to use classical Molecular Dynamics (MD) for large enough systems to mimic the PDMS/PVDF structures. Using this approach, it is possible to address the adhesive behavior from atomistic level. Applicants have carried out MD simulation using classical force field.

Figure 18D:
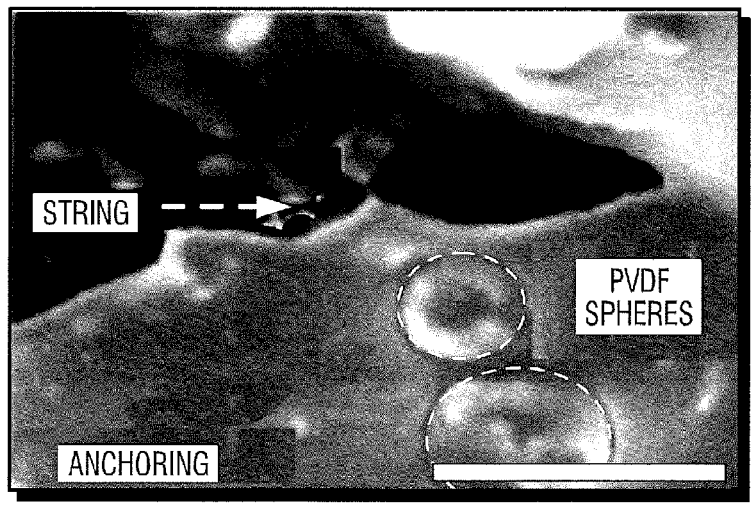
FIG. 18D is an SEM image after separation highlighting a single string.
Figure 18E:
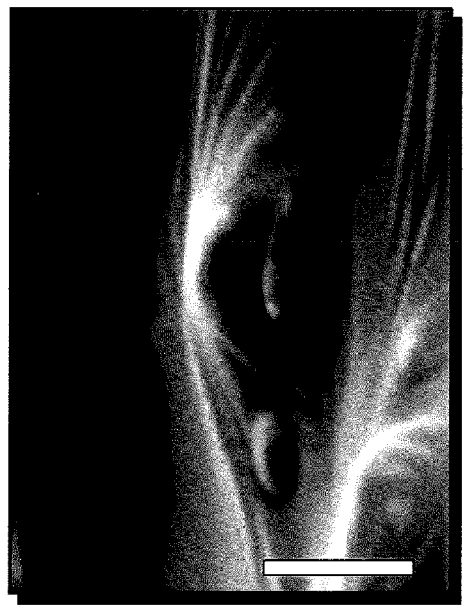
FIGS. 18E-G show snapshots from MD simulation mimicking the loading/unloading adhesive cycle during an initial stage (FIG. 18E), a maximum loading stage (FIG. 18F), and an intermediate unloading stage (FIG. 18G), showing the string formation.
Figure 18F:
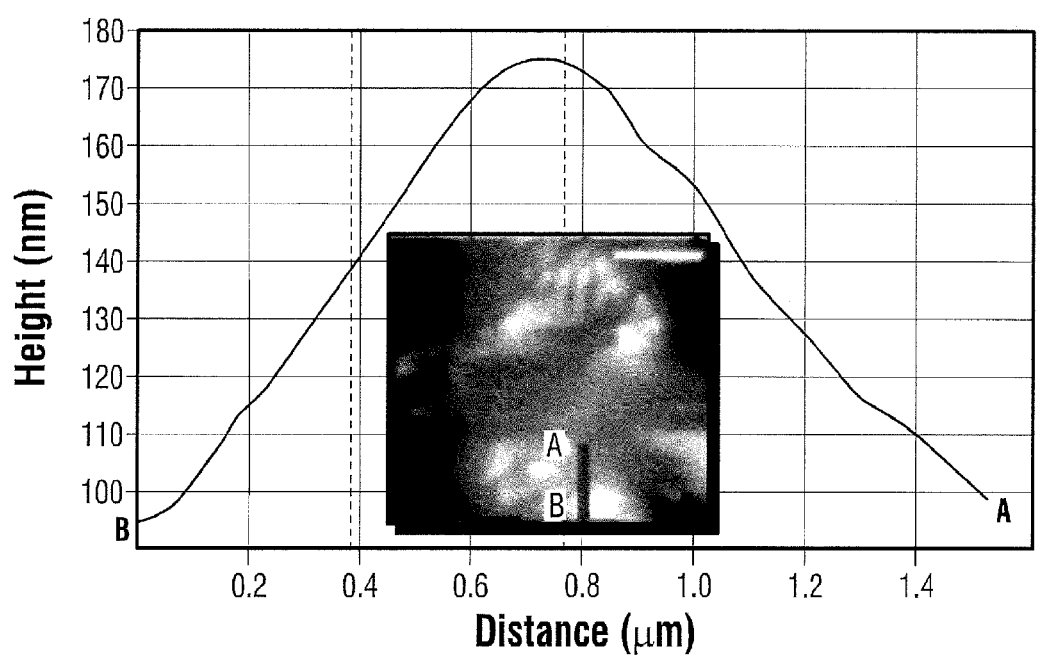
Figure 18G:
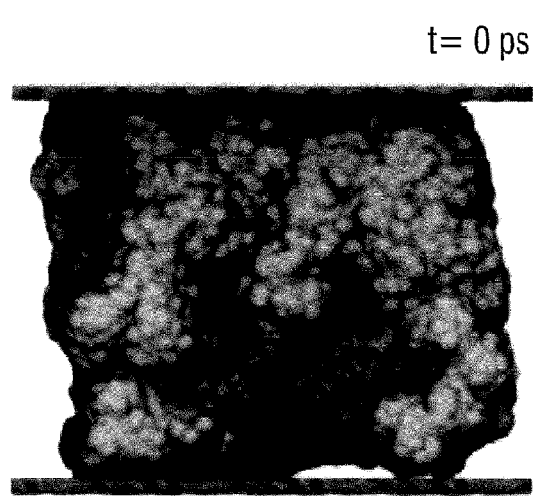
Figure 18H:
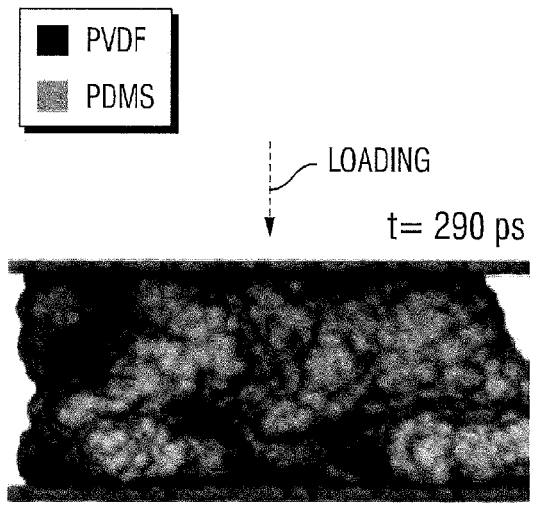
FIG. 18H shows the force profile experienced by the adhesive during the load (positive force) and unload (negative force). The red points indicate the force at specific time of the simulation and the blue curve show the fit of these points. Also shown are the high magnification SEM image (FIG. 18I), and AFM image (FIG. 18J) with line profile of strings after adhesive detachment.

The used model system (FIG. 18G) consists of PVDF spheres (in red) embedded into the PDMS medium (in yellow) placed in between two slabs of amorphous silicon oxide ($SiO_2$). To simulate the load stage, the distance between the slabs is decreased by a constant rate until to attain a significant deformation (54%) (FIG. 18H). During the adhesive compression, the liquid phase allows the solid spheres to easily flow towards the slabs, thus increasing the contact area.

Figure 18I:
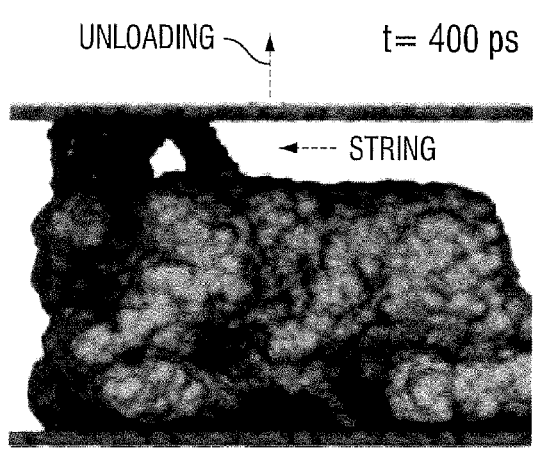
FIG. 18 shows data relating to the mechanical testing of PVDF/PDMS adhesives.
Figure 18J:
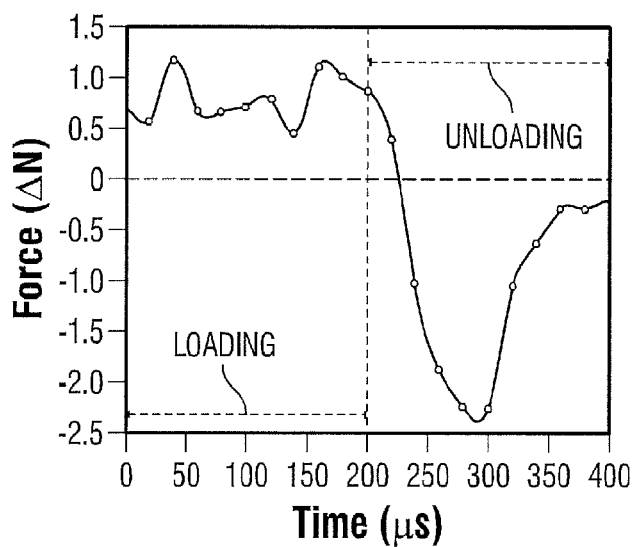

The unload stage is performed using the same loading rate but along the opposite direction (FIG. 18I). In this stage, it is possible to observe the onset of string formation between the slabs, which are very similar to experimental observations (FIG. 18D). The net force along the direction of the sheet displacement is recorded during the load/unload cycle. Applicants can identify an asymmetric behavior (FIG. 18J), with maximum force for the loading stage (corresponding the instant from 0 to 200 ps) ~12 nN and for the unloading stage (corresponding the instant from 200 to 400 ps) ~25 nN. The force experienced during the unloading stage is around two times higher than the maximum force in the loading stage, which characterizes an adhesive regime.

The combined analysis of experiments and simulations allow Applicants to have a clear understanding of the adhesive mechanism. Individually, PDMS and PVDF do not present adhesive behavior. However, after mechanical dispersion, the product exhibits adhesive behavior. During the loading, PVDF interacts stronger than PDMS with the contact surface. During the unloading, due to the strong interaction between the PDMS and PVDF, Applicants have an anchor effect that is the origin of the adhesive behavior and string formation.

Applicants' adhesive can work on a broad range of different materials (and also a combination of them), such as, organic, inorganic, metal and oxide (FIGS. 19A-D). For all cases, standard weights were used to determine the maximum shear strength required for separation.

Figures 19A, 19B, 19C, 19D:
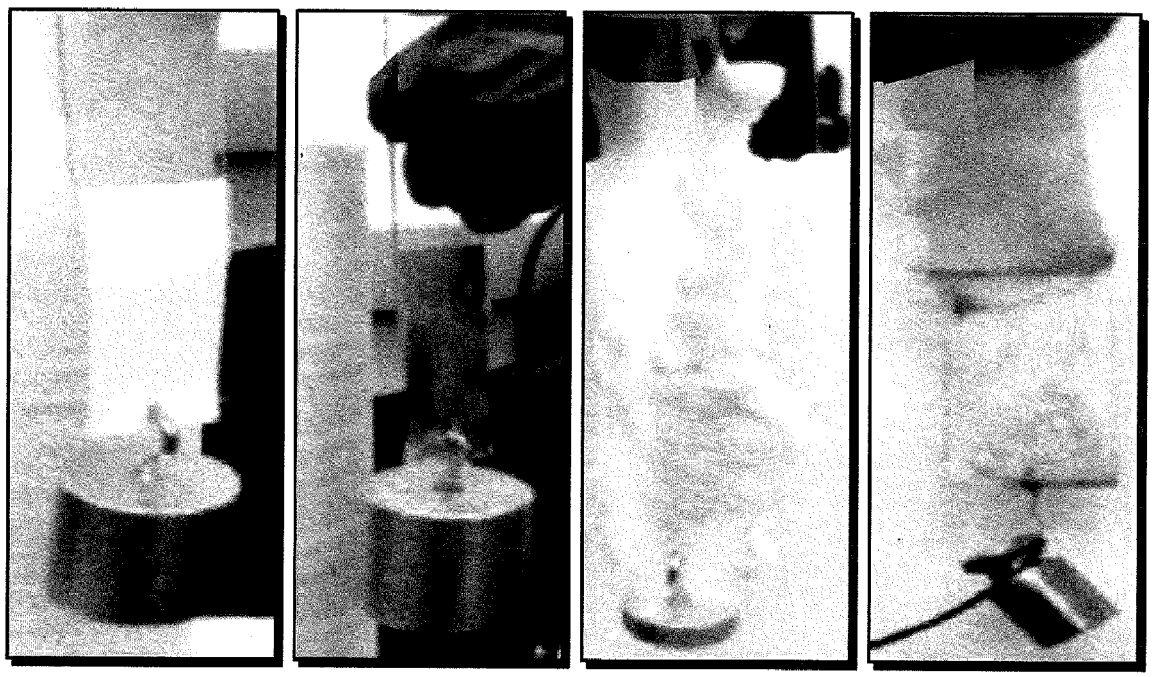
FIG. 19 shows adhesion of PVDF/PDMS adhesives on different materials and in different environments. Representative examples of adhesion on different substrates include glass/paper (FIG. 19A), metal/glass (FIG. 19B), chicken skin (FIG. 19C), and pig skin (FIG. 19D).
FIG. 19E shows adhesive shear strength for different materials interfaces.
FIG. 19F shows contact angle values of water droplets on glass, paper, aluminum and plastic coated with adhesives.
FIG. 19G shows stiffness versus time under loading and unloading cycles of adhesives submerged with different fractions of water in a submerged clamp (shown in the inset).
FIG. 19H shows a demonstration of adhesion behavior of two transparent glass sheets inside water at the initial state of two separated glass sheets.
FIGS. 19I-J show adhered glass sheets viewed from different directions.
Figure 19E:
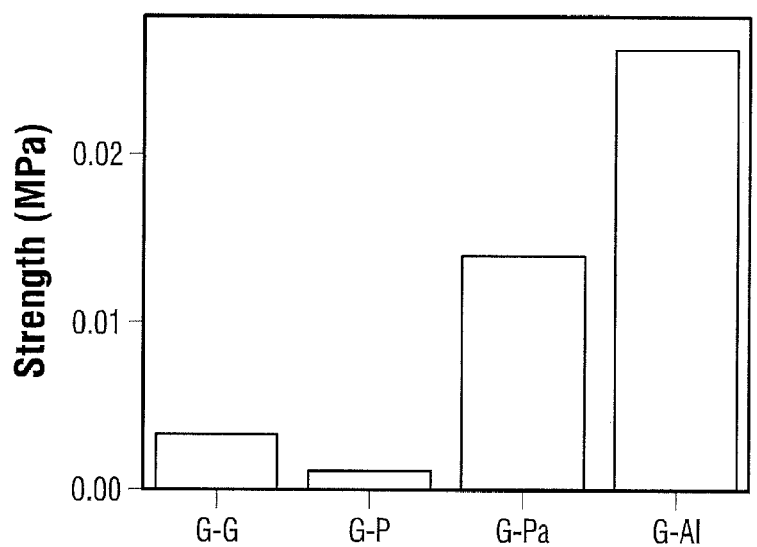

Applicants have explored the application of the adhesive in sticking bio-materials, such as, chicken and pig skins (FIGS. 19C-D). The measured adhesive shear stresses of few of these materials are also shown in FIG. 19E.

The aforementioned universal-like adhesion can be explained by the coexistence of liquid and solid dynamics. For instance, the liquid can take the shape (roughness of the surface) of the interface, thereby creating an almost perfect interface. Likewise, the size of the nano particles allows an almost homogeneous distribution, creating a strong interface interaction.

Figure 19F:
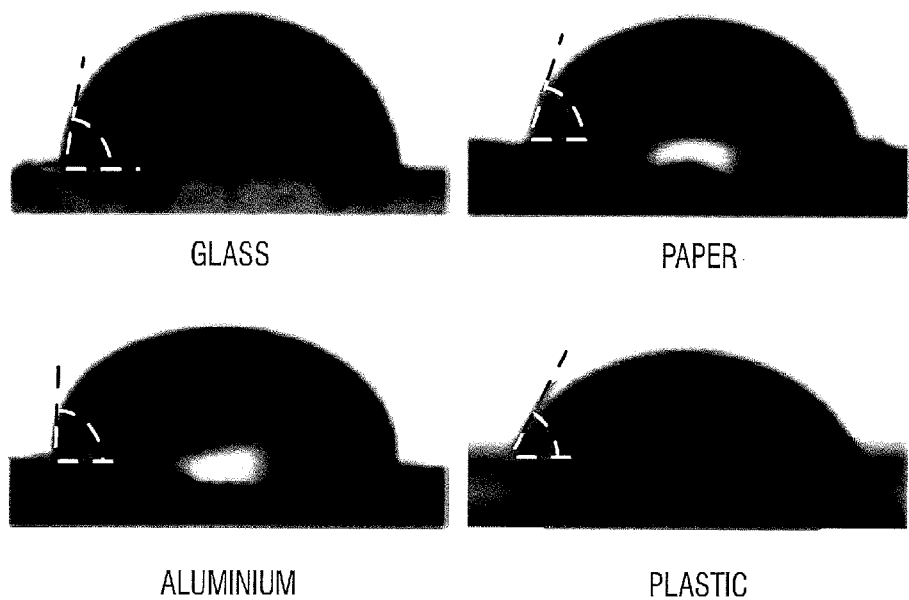
Figure 19G:
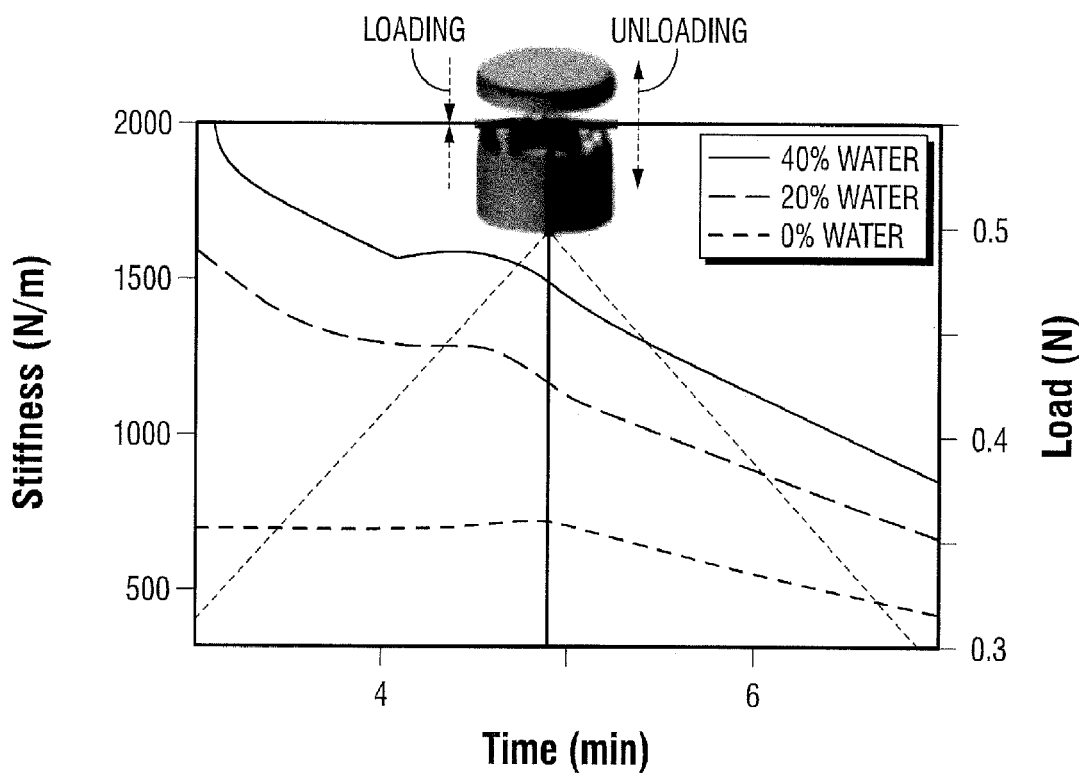

To evaluate the adhesion behavior of the composite in liquid media (water and oil), a cyclic loading and unloading test in submerged condition was performed (FIG. 19G). The submerged clamp volume is filled with different fractions of water, compressed and then pulled. The adhesive behavior is similar in both wet and dry conditions (water and oil, as well).

Figure 19H:
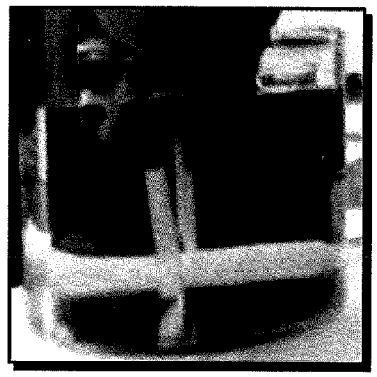
Figure 19I:
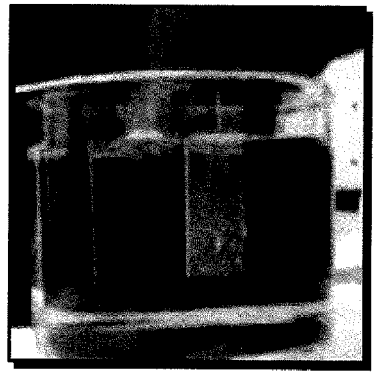
Figure 19J:
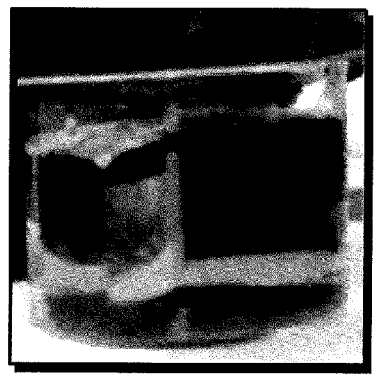

PDMS and PVDF are both hydrophobic materials. Applicants tested the adhesive wettability to see if the mechanical dispersion changes this characteristic. The results (standard contact angle measurements) showed that the adhesive is still hydrophobic (FIG. 19F). The adhesive can even work under water, as illustrated in FIGS. 19H-I.

In summary, Applicants report in this Example a bio-inspired, chemical free (with no curing time required), easily scalable, new class of adhesive, made by mechanical dispersion of PVDF (solid) into PDMS (liquid). The material can be utilized universally and repeatable under different ambient conditions, even under liquids. These results represent a significant advance in achieving amphibious adhesives and can lead to new pathways for designing new universal adhesives, similar to the ones exhibited by some of the biological systems in nature.

Example 2.1. Materials and Methods

One possible way to synthesize a PVDF-PDMS solid liquid composite material is by using a rigorous mixing-evaporation process. Although the basic constituents of this material is similar to what is reported here, the phase composition, distribution and morphology of the two materials are distinctly different due to the different processing used to distribute the phases in the material. The obtained material using the mixing-evaporation process is a white solid powder (unlike the gel-like material obtained here) and shows a self-stiffening behavior during loading.

In this Example, the PVDF-PDMS mixture was made through mechanical dispersion of 50 wt. % PDMS and 50 wt. % PVDF, done under ambient conditions. The constant addition of PVDF into the system showed an optical shift from the clear nature of PDMS to an opaque white gel. The blend exhibited a markedly different consistency than the PDMS, indicating a change in the system. The properties and structure of the blend were analyzed using microscopy (SEM and Optical), spectroscopy (Raman and FTIR), as well as mechanical (load-unload compressive DMA test) and thermal testing (TGA).

To characterize the existing bonds and the interactions within the blend, Applicants used Raman and Fourier Transform Infrared (FTIR) spectroscopy. Raman measurements were carried out using a Bruker Senterra confocal microscope operating at 785 nm.

Example 2.2. Characterization

Imaging was done using scanning electron microscopy (SEM) (FEI Quanta ESEM FEG) and a goniometer (Rime-Hart). Raman was done using a Bruker Senterra Raman at 785 nm in ambient conditions. Thermal measurements were done using a TA Instruments Q500 TGA. FTIR was done using a Bruker. XPS was done using a PHI Quantera XPS. XRD was done using a Discovery 8 Bruker XRD.

For the mechanical tests, Applicants used Dynamic Mechanical Analysis (DMA). For the load-unload procedure in compression, Applicants considered three cycles with a maximum force of 0.01 N, 0.05 N, and 0.1 N respectively. Using a blend made of PVDF and PDMS, which has a gel-like consistency, Applicants created a thick layer and performed the load-unload testing. This kind of test allowed Applicants to understand how adhesion behaves both when adhering and upon separation from a surface.

Example 2.3. Simulations Details

Applicants carried out Density Functional Theory (DFT) within the Generalized Gradient Approximation (GGA) and Perdew-Burke-Ernzenhof (PBE) for exchange-correlation functional in the calculations of the electronic properties of PDMS and PVDF. The calculations were carried out using the code OpenMX, which employs a formalism based in pseudo-atomic orbitals (PAO) and norm-conserving pseudopotentials.

For the elements carbon, oxygen and silicon, Applicants considered two s-orbitals, two p-orbitals and one d-orbital (s2p2d1) as a PAO basis set to expand the electronic wave function. For hydrogen and fluorine, Applicants considered s2p1 and s4p4d4f3, respectively. For energy cut-off and energy convergence tolerances, Applicants used 125 and $1.0 \times 10^{-6}$ Hartree, respectively.

Applicants also carried out geometry optimization. The final geometry was considered optimized when the maximum force in the system was below $1.0 \times 10^{-4}$ Ha/Bohr. The MD calculations were carried out using the LAMMPS software. The bonded interactions (bond, angle and dihedral terms) were described by COMPASS force field. The parameters were optimized to describe the PDMS and PDVF structures.

The atoms belonging to the $SiO_2$ slabs were kept frozen during the simulations. To simulate the loading procedure, a mixture of PDVF and PDMS was placed in between two $SiO_2$ slabs. The bottom slab was kept fixed and the upper one had all atoms displaced by a constant rate of $1.5 \times 10^{-4}$ Ang/fs, approximating to the bottom one. The unloading procedure was performed using the same rate, but in the opposite direction.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. An adhesive composition comprising:
a fluorinated polymer; and
a silicon-containing polymer comprising hydrogen atoms,
wherein the silicon-containing polymer comprises a plurality of silicon-hydrogen bonds,
wherein the fluorinated polymer is in the form of particles,
wherein the fluorinated polymer and the silicon-containing polymer are non-covalently associated with one another, and
wherein the non-covalent association comprises non-covalent interactions between an outer surface of the particles and the hydrogen atoms of the silicon-containing polymer.

2. The adhesive composition of claim 1, wherein the fluorinated polymer includes at least 5 wt. % fluorine atoms.

3. The adhesive composition of claim 1, wherein the particles comprise spherical shapes.

4. The adhesive composition of claim 1, wherein the particles comprise sizes that range from about 10 nm to about 1 µm in diameter.

5. The adhesive composition of claim 1, wherein the particles comprise sizes of at least 200 nm in diameter.

6. The adhesive composition of claim 1, wherein the fluorinated polymer is selected from the group consisting of polyvinylidene fluoride, polytetrafluoroethylene, polyfluorene, polyfluorophenyl, and combinations thereof.

7. The adhesive composition of claim 1, wherein the silicon-containing polymer lacks any fluorine atoms.

8. The adhesive composition of claim 1, wherein the silicon-containing polymer comprises a plurality of carbon-hydrogen bonds.

9. The adhesive composition of claim 1, wherein the silicon-containing polymer is selected from the group consisting of siloxane-based polymers, polydimethylsiloxane, copolymers thereof, block copolymers thereof, and combinations thereof.

10. The adhesive composition of claim 1, wherein the fluorinated polymer and the silicon-containing polymer are non-covalently associated with one another through at least one of non-covalent bonds, non-ionic bonds, reversible bonds, physical bonds, dipole-dipole interactions, Van der Waals interactions, geometrical bonds, mechanical interactions, and combinations thereof.

11. The adhesive composition of claim 1, wherein the non-covalent interactions between an outer surface of the particles and the hydrogen atoms of the silicon-containing polymer are selected from the group consisting of dipole-dipole interactions, dipole-dipole-induced interactions, Van der Waals forces, hydrogen bonds, and combinations thereof.

12. The adhesive composition of claim 1, wherein the non-covalent interactions between an outer surface of the particles and the hydrogen atoms of the silicon-containing polymer comprise dipole-dipole interactions.

13. The adhesive composition of claim 12, wherein the dipole-dipole interactions create a fluorine-hydrogen electronegativity difference on the outer surface of the particles between at least some of the fluorine atoms of the fluorinated polymer and at least some of the hydrogen atoms of the silicon-containing polymer.

14. The adhesive composition of claim 1, wherein the fluorinated polymer and the silicon-containing polymer are in different phases.

15. The adhesive composition of claim 14, wherein the fluorinated polymer is in a liquid phase, and wherein the silicon-containing polymer is in a solid phase.

16. The adhesive composition of claim 1, wherein the fluorinated polymer is in a solid phase, and wherein the silicon-containing polymer is in a liquid phase.

17. The adhesive composition of claim 1, wherein the adhesive composition is associated with a surface.

18. The adhesive composition of claim 17, wherein the surface is selected from the group consisting of papers, foils, ceramics, metals, copper-based surfaces, copper sheets, copper foils, aluminum-based surfaces, aluminum sheets, aluminum foil, glass, plastics, silicon wafers, bio-materials, skin surfaces, and combinations thereof.

19. The adhesive composition of claim 17, wherein the adhesive composition is associated with at least two surfaces, and wherein the adhesive composition adheres the two surfaces to one another.

\* \* \* \* \*